US008284218B2

(12) United States Patent
Yoshida

(10) Patent No.: US 8,284,218 B2
(45) Date of Patent: Oct. 9, 2012

(54) DISPLAY DEVICE CONTROLLING LUMINANCE

(75) Inventor: Yasunori Yoshida, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 690 days.

(21) Appl. No.: 12/468,171

(22) Filed: May 19, 2009

(65) Prior Publication Data

US 2009/0289968 A1 Nov. 26, 2009

(30) Foreign Application Priority Data

May 23, 2008 (JP) ................................ 2008-135320

(51) Int. Cl.
*G09G 5/10* (2006.01)
*G09G 3/28* (2006.01)
*G06F 3/038* (2006.01)

(52) U.S. Cl. ........... 345/691; 345/204; 345/690; 345/60

(58) Field of Classification Search ........................ None
See application file for complete search history.

(56) References Cited

U.S. PATENT DOCUMENTS

| | | | | |
|---|---|---|---|---|
| 7,053,881 | B2 | 5/2006 | Itoh | |
| 7,129,918 | B2 | 10/2006 | Kimura | |
| 7,800,561 | B2 | 9/2010 | Asano | |
| 2002/0000967 | A1* | 1/2002 | Huston et al. | 345/88 |
| 2005/0104812 | A1* | 5/2005 | Ohshima | 345/60 |
| 2005/0162360 | A1 | 7/2005 | Ishihara et al. | |
| 2006/0125775 | A1 | 6/2006 | Itoh | |
| 2006/0221260 | A1* | 10/2006 | Fujine et al. | 348/790 |
| 2006/0262066 | A1 | 11/2006 | Yamazaki et al. | |
| 2007/0242031 | A1 | 10/2007 | Kimura et al. | |
| 2007/0279359 | A1* | 12/2007 | Yoshida et al. | 345/89 |
| 2008/0068359 | A1 | 3/2008 | Yoshida et al. | |
| 2008/0180385 | A1 | 7/2008 | Yoshida et al. | |
| 2008/0231581 | A1 | 9/2008 | Fujine et al. | |
| 2008/0284719 | A1 | 11/2008 | Yoshida | |
| 2008/0284768 | A1 | 11/2008 | Yoshida et al. | |
| 2009/0009464 | A1 | 1/2009 | Kohashikawa et al. | |
| 2009/0174636 | A1 | 7/2009 | Kohashikawa et al. | |
| 2009/0262063 | A1 | 10/2009 | Fujine et al. | |
| 2009/0268105 | A1 | 10/2009 | Kohashikawa et al. | |

FOREIGN PATENT DOCUMENTS

| | | |
|---|---|---|
| JP | 08201812 A * | 8/1996 |
| JP | 2003-295837 | 10/2003 |
| JP | 2004/062134 | 2/2004 |
| JP | 2004-258669 | 9/2004 |
| JP | 2007-025317 | 2/2007 |
| JP | 2007-279395 | 10/2007 |

* cited by examiner

*Primary Examiner* — Alexander S Beck
*Assistant Examiner* — Kirk Hermann
(74) *Attorney, Agent, or Firm* — Nixon Peabody LLP; Jeffrey L. Costellia

(57) ABSTRACT

A display device in which the image quality is improved by control of the peak luminance. A plurality of instantaneous luminances are expressed by performing signal writing to each pixel plural times within one frame period. The gray level is expressed by controlling time integration levels of the plurality of instantaneous luminances. Moreover, the time integration level is increased as the level of gray level data of the pixel is higher, and the time integration level is increased as the average value of gray level data of an image to be displayed is smaller.

16 Claims, 18 Drawing Sheets

FIG. 9A K=0.5
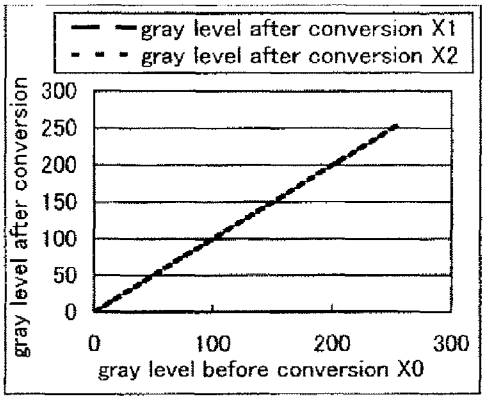
FIG. 9B K=0.75
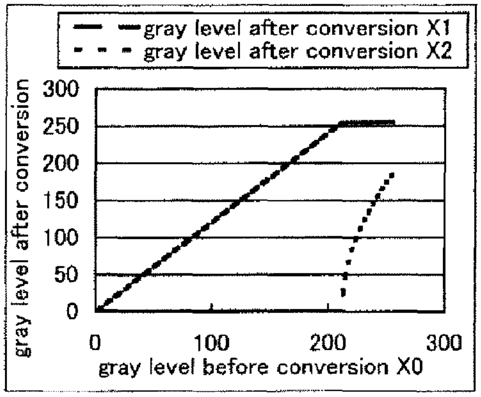
FIG. 9C K=1
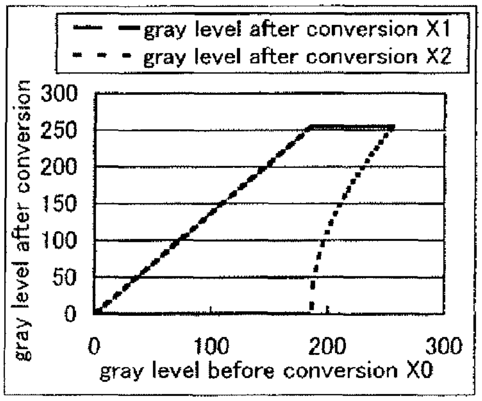
FIG. 9D K=0.5
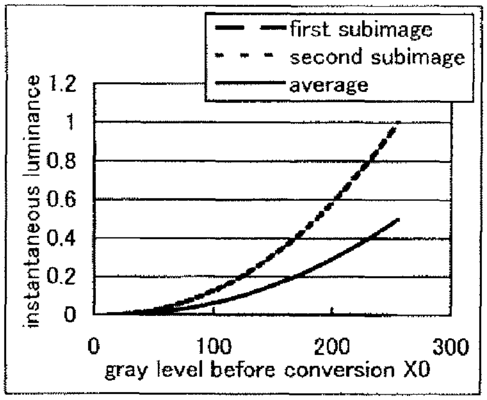
FIG. 9E K=0.75
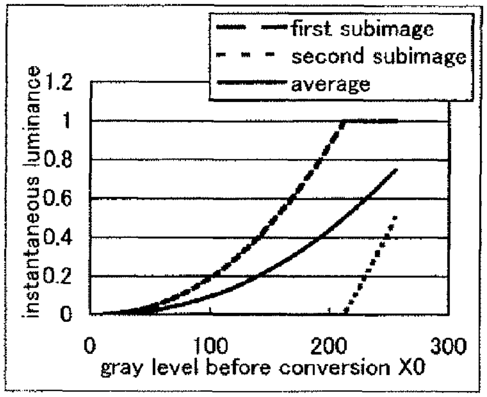
FIG. 9F K=1
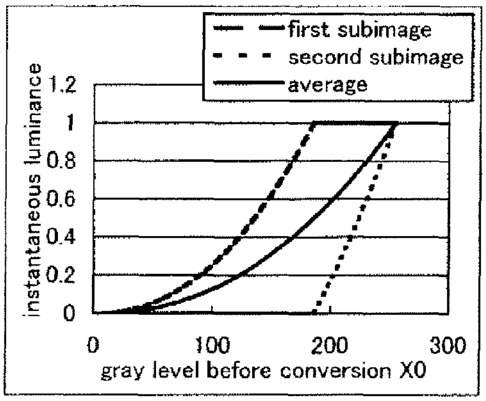

FIG. 10A K=0.5
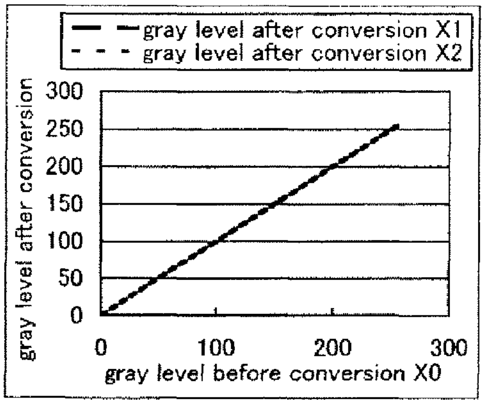
FIG. 10D K=0.5
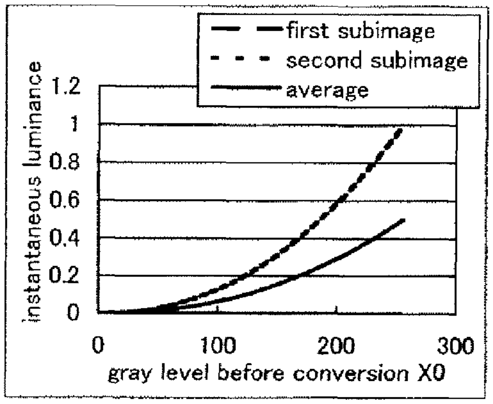
FIG. 10B K=0.75
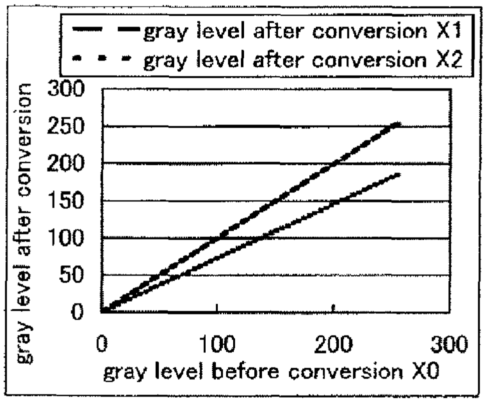
FIG. 10E K=0.75
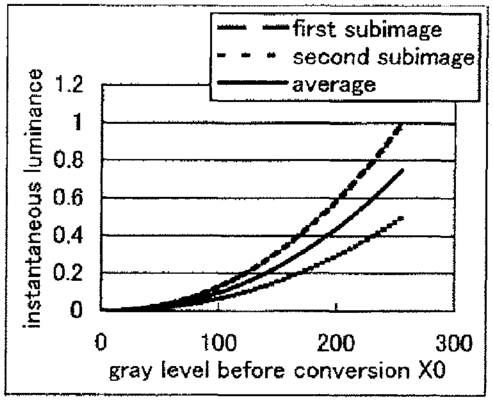
FIG. 10C K=1
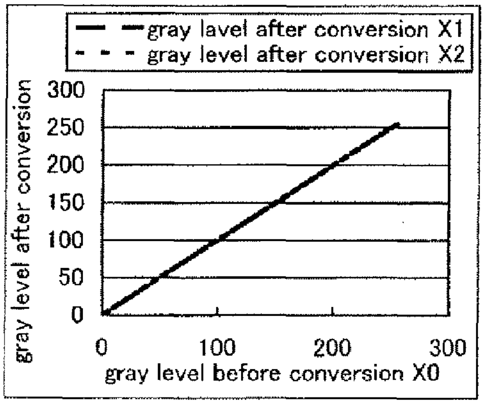
FIG. 10F K=1
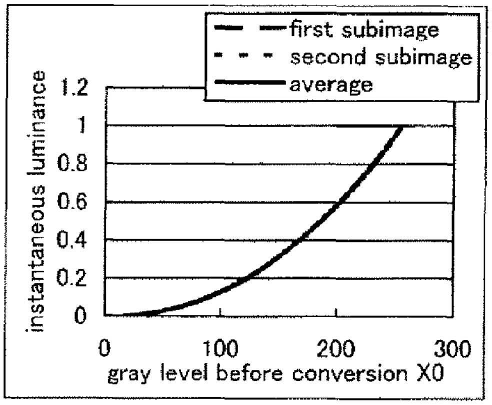

FIG. 11A K=0.5
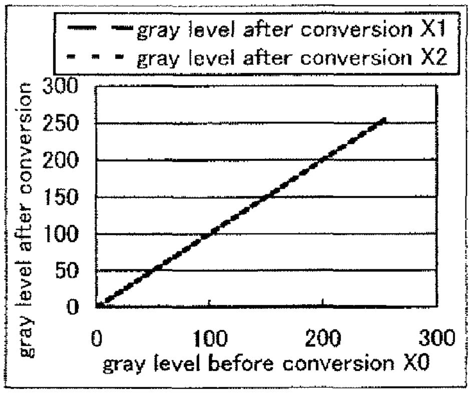
FIG. 11D K=0.5
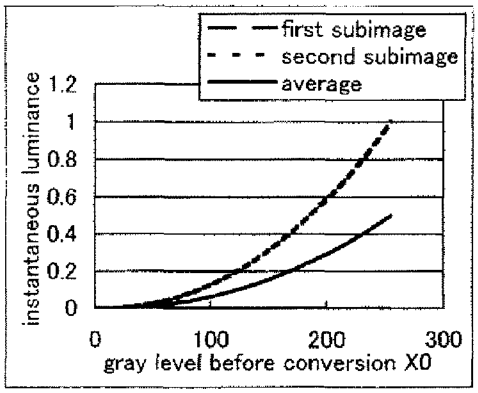
FIG. 11B K=0.75
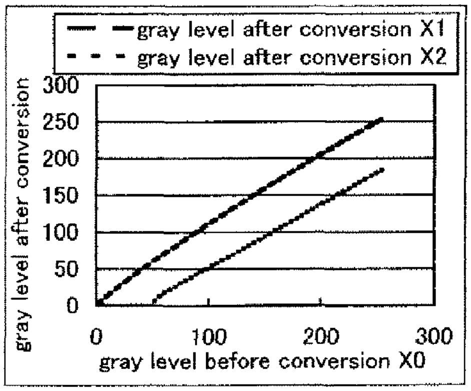
FIG. 11E K=0.75
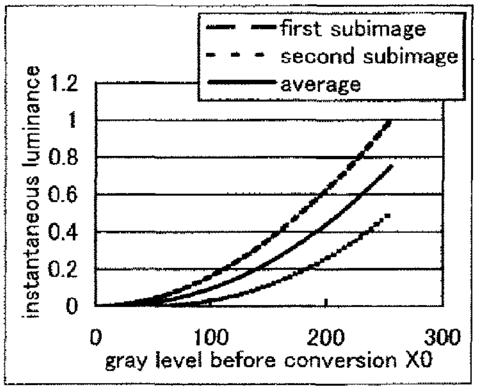
FIG. 11C K=1
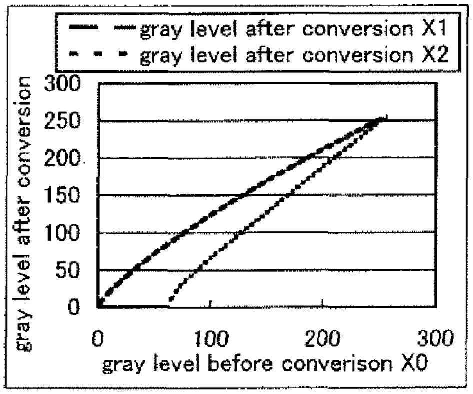
FIG. 11F K=1
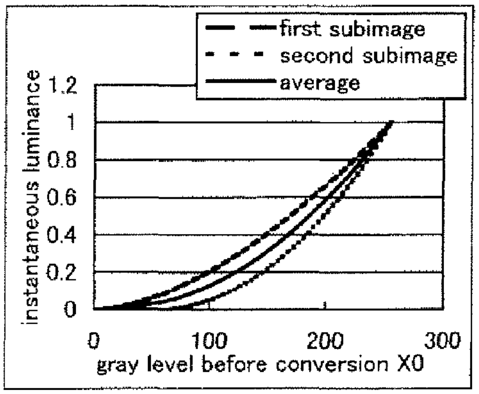

DISPLAY DEVICE CONTROLLING LUMINANCE

BACKGROUND OF THE INVENTION

1. Field of the Invention

The present invention relates to a display device and a semiconductor device, and more particularly to a hold-type display device such as a liquid crystal display device. The present invention especially relates to a method for driving a liquid crystal display device in which peak luminance is controlled. Further, the present invention relates to an electronic device including such a display device for a display portion.

2. Description of the Related Art

A liquid crystal display device has advantages such as small thickness, lightness in weight, and low power consumption as compared to a display device using a cathode-ray tube (CRT). Further, since a liquid crystal display device can be applied to a wide range of display devices from a small display device including a display portion with a few inches diagonal to a large display device including one with a diagonal of more than 100 inches, the liquid crystal display device is widely used as a display device of a variety of electronic devices such as a mobile phone, a still camera, a video camera, and a television receiver.

Although thin display devices including liquid crystal display devices are starting to widely spread in recent years, measures to improve the image quality still have been taken because the image quality is not always satisfactory. For example, as problems of the image quality of the liquid crystal display device, the contrast ratio is reduced by faint light emission at the time of black display, and a hold-type display device (or a hold-driving display device) causes afterimages and thus the moving image quality is reduced, for example. Note that a hold-type display device is a display device in which luminance is kept for one frame period with little change. A display device such as a CRT, in which display is performed by light emission that lasts only for an extremely short time in one frame period, is referred to as an impulse-type display device (or an impulse-driving display device) in contrast to the hold-type display device.

It has been found that a peak luminance control method is one technical factor in improving the quality of images displayed on a display device. The peak luminance is luminance in a region (a high gray level region) which is part of a screen when an image having high gray level data only for the part of the screen (an image with high peak gray level) is displayed. By increasing the peak luminance depending on the area of a high gray level region or the like, the capability of expressing brightness of night view, sparks, luster of metal, and the like can be greatly improved, and the quality of images to be displayed can be improved.

In a display device using a CRT, luminance of only part of an image can be easily made higher, and thus, the capability of expressing an image with high peak gray level is high. Techniques to realize such display in a liquid crystal display device are disclosed in Patent Documents 1 and 2, for example.

REFERENCES

[Patent Document 1] Japanese Published Patent Application No. 2004-062134

[Patent Document 2] Japanese Published Patent Application No. 2004-258669

SUMMARY OF THE INVENTION

Patent Document 1 discloses that improvement in image quality due to peak luminance modulation is realized by controlling intermittent driving of a backlight source in accordance with average picture level (APL) of an image, and reduction in quality of moving images by hold driving is suppressed. Here, control of intermittent driving is specifically change of the time for displaying a black image in accordance with APL. That is, the time for displaying a black image is made longer as an image has higher APL (as the general brightness of an image is increased), whereby the luminance (the peak luminance) is lower. In contrast, the time for displaying a black image is made shorter as an image has lower APL (as the general brightness of an image is decreased), whereby the luminance (the peak luminance) is higher. In the technique disclosed in Patent Document 1, the time for displaying a black image is short when an image is generally dark; thus, an afterimage due to hold driving occurs, which leads to a problem with the quality of moving images.

Patent Document 2 discloses that the peak luminance is increased while faint light emission at the time of black display is suppressed by controlling the luminance of a backlight as appropriate based on APL and the maximum gray level of an image to be displayed, which are detected. In the technique disclosed in Patent Document 2, control of faint light emission at the time of black display and increase in peak luminance cannot be realized at the same time. If the luminance of the backlight is increased in order to increase the peak luminance, faint light emission at the time of black display is also increased at the same time. That is, since the luminance of the backlight is controlled only in accordance with an image as appropriate, the contrast of still images cannot be improved. Further, Patent Document 2 does not disclose any solution for improving quality of moving images, which is one of major problems that liquid crystal display devices have.

In view of the foregoing problems, an object of an embodiment of the present invention is to improve the image quality when still images and moving images are displayed. Another object of an embodiment of the present invention is to improve the contrast ratio when still images and moving images are displayed. Another object of an embodiment of the present invention is to increase the viewing angle when still images and moving images are displayed. Still another object of an embodiment of the present invention is to increase the response speed when still images and moving images are displayed. Another object of an embodiment of the present invention is to reduce power consumption when still images and moving images are displayed. Another object of an embodiment of the present invention is to reduce manufacturing costs.

One embodiment of the present invention is a display device including a plurality of pixels. In each pixel, a plurality of subframe periods are provided in one frame period, and gray level of the pixel is expressed in accordance with time integration level of instantaneous luminances expressed in the plurality of subframe periods. The time integration level is increased as the level of gray level data of the pixel is higher. The time integration level is increased as the average value of gray level data of an original image is smaller. The plurality of subframe periods are equal in length.

In another embodiment of the present invention, the time integration level is increased with respect to the gray level data by power law.

In another embodiment of the present invention, the average value of the gray level data of the original image is obtained by averaging gray levels of some of pixels among the plurality of pixels.

One embodiment of the present invention is a display device including a plurality of pixels. In each pixel, a first subframe period and a second subframe period are provided in one frame period, and gray level of the pixel is expressed in accordance with time integration level of first instantaneous luminance expressed in the first subframe period and second instantaneous luminance expressed in the second subframe period. The time integration level is increased as the level of gray level data of the pixel is higher. The time integration level is increased as the average value of gray level data of an original image is smaller. The first subframe period and the second subframe period are equal in length.

In another embodiment of the present invention, when the average value of the gray level data of the original image is larger than a predetermined value, black display is performed in the plurality of pixels in the second subframe period.

Still another embodiment of the present invention is a display device including an image feature amount detection portion having a function of detecting gray level data distribution of gray level data of an inputted original image; a scale factor determination portion having a function of determining a scale factor in accordance with the gray level data distribution detected by the image feature amount detection portion; a gray level data conversion portion having a function of converting the gray level data of the original image into gray level data of a first subimage and gray level data of a second subimage in accordance with the scale factor determined by the scale factor determination portion; and a display portion having a function of displaying the first subimage and the second subimage.

Note that various types of switches can be used as a switch. Examples are an electrical switch and a mechanical switch. That is, there is no particular limitation on the kind of switch as long as it can control the flow of current. For example, a transistor (e.g., a bipolar transistor or a MOS transistor), a diode (e.g., a PN diode, a PIN diode, a Schottky diode, a metal-insulator-metal (MIM) diode, a metal-insulator-semiconductor (MIS) diode, or a diode-connected transistor), or the like can be used as a switch. Alternatively, a logic circuit combining such elements can be used as a switch.

As examples of mechanical switches, there is a switch formed by a micro electro mechanical system (MEMS) technology, such as a digital micromirror device (DMD). Such a switch includes an electrode which can be moved mechanically, and operates to control electrical connection or non-electrical-connection with the movement of the electrode.

When a transistor is used as a switch, a polarity (a conductivity type) of the transistor is not particularly limited because it operates as a mere switch. Note that a transistor of polarity with smaller off-current is preferably used when the off-current should be small. Examples of a transistor with smaller off-current are a transistor provided with an LDD region and a transistor with a multi-gate structure. Further, an n-channel transistor is preferably used when the transistor operates with a potential of a source terminal closer to a potential of a low potential side power supply (e.g., Vss, GND, or 0 V). On the other hand, a p-channel transistor is preferably used when the transistor operates with a potential of a source terminal close to a potential of a high potential side power supply (e.g., Vdd). This is because when the n-channel transistor operates with the potential of the source terminal close to a low potential side power supply or the p-channel transistor operates with the potential of the source terminal close to a high potential side power supply, an absolute value of a gate-source voltage can be increased; thus, the transistor can more precisely operate as a switch. Moreover, this is because reduction in output voltage does not often occur because the transistor does not often perform a source follower operation.

Note that a CMOS switch may be employed as a switch by using both n-channel and p-channel transistors. By employing a CMOS switch, the transistor can more precisely operate as a switch because a current can flow when either the p-channel transistor or the n-channel transistor is turned on. For example, even when a voltage of an input signal to a switch is high or low, an appropriate voltage can be outputted. Further, since a voltage amplitude value of a signal for turning on or off the switch can be made small, power consumption can be reduced.

Note that when a transistor is employed as a switch, the switch includes an input terminal (one of a source terminal and a drain terminal), an output terminal (the other of the source terminal and the drain terminal), and a terminal for controlling electrical connection (a gate terminal). On the other hand, when a diode is employed as a switch, the switch does not have a terminal for controlling electrical connection in some cases. Therefore, when a diode is used as a switch, the number of wirings for controlling terminals can be more reduced than the case of using a transistor.

Note that when it is explicitly described that A and B are connected, the case where A and B are electrically connected, the case where A and B are functionally connected, and the case where A and B are directly connected are included therein. Here, each of A and B is an object (e.g., a device, an element, a circuit, a wiring, an electrode, a terminal, a conductive film, or a layer). Accordingly, another element may be provided in the connections shown in the drawings and texts, without being limited to a predetermined connection, for example, the connection shown in the drawings and texts.

For example, when A and B are electrically connected, one or more elements that enable electrical connection between A and B (e.g., a switch, a transistor, a capacitor, an inductor, a resistor, or a diode) may be connected between A and B. In addition, when A and B are functionally connected, one or more circuits that enable functional connection between A and B (e.g., a logic circuit such as an inverter, a NAND circuit, or a NOR circuit; a signal converter circuit such as a DA converter circuit, an AD converter circuit, or a gamma correction circuit; a potential level converter circuit such as a power supply circuit (e.g., a step-up voltage circuit or a step-down voltage circuit) or a level shifter circuit for changing a potential level of a signal; a voltage source; a current source; a switching circuit; or an amplifier circuit such as a circuit that can increase signal amplitude, the amount of current, or the like (e.g., an operational amplifier, a differential amplifier circuit, a source follower circuit, or a buffer circuit), a signal generating circuit, a memory circuit, or a control circuit) may be connected between A and B. For example, when a signal outputted from A is transmitted to B, it can be said that A and B are functionally connected even if another circuit is provided between A and B.

Note that when it is explicitly described that A and B are electrically connected, the case where A and B are electrically connected (i.e., the case where A and B are connected with another element or another circuit provided therebetween), the case where A and B are functionally connected (i.e., the case where A and B are functionally connected with another circuit provided therebetween), and the case where A and B are directly connected (i.e., the case where A and B are connected without another element or another circuit provided therebetween) are included therein. That is, when it is explicitly described that A and B are electrically connected, the description is the same as the case where it is explicitly only described that A and B are connected.

Note that a display element, a display device which is a device including a display element, a light-emitting element, and a light-emitting device which is a device including a light-emitting element can employ a variety of modes and include a variety of elements. For example, a display element, a display device, a light-emitting element, and a light-emitting device can include a display medium in which contrast, luminance, reflectivity, transmissivity, or the like is changed by an electromagnetic action, such as an EL (electroluminescent) element (e.g., an EL element including organic and inorganic materials, an organic EL element, or an inorganic EL element), an LED (e.g., a white LED, a red LED, a green LED, or a blue LED), a light-emitting transistor (e.g., a transistor that emits light corresponding to a current), an electron emitter, a liquid crystal element, electronic ink, an electrophoresis element, a grating light valve (GLV), a plasma display panel (PDP), a digital micromirror device (DMD), a piezoelectric ceramic display, or a carbon nanotube can be used. Note that display devices using an EL element include an EL display; display devices using an electron emitter include a field emission display (FED) and an SED (surface-conduction electron-emitter display) flat panel display; display devices using a liquid crystal element include a liquid crystal display (e.g., a transmissive liquid crystal display, a transflective liquid crystal display, a reflective liquid crystal display, a direct-view liquid crystal display, or a projection type liquid crystal display); and display devices using electronic ink or an electrophoresis element include electronic paper in their respective categories.

An EL element is an element including an anode, a cathode, and an EL layer interposed between the anode and the cathode. The EL layer can be, for example, a layer utilizing emission from a singlet exciton (fluorescence) or a triplet exciton (phosphorescence), a layer utilizing emission from a singlet exciton (fluorescence) and emission from a triplet exciton (phosphorescence), a layer including an organic material or an inorganic material, a layer including an organic material and an inorganic material, a layer including a high molecular material or a low molecular material, and a layer including a low molecular material and a high molecular material. Note that the EL element can include a variety of layers as the EL layer without limitation to those described above.

An electron emitter is an element in which electrons are extracted by high electric field concentration on a cathode. For example, the electron emitter can be any one of a Spindt-type, a carbon nanotube (CNT) type, a metal-insulator-metal (MIM) type including a stack of a metal, an insulator, and a metal, a metal-insulator-semiconductor (MIS) type including a stack of a metal, an insulator, and a semiconductor, a MOS type, a silicon type, a thin film diode type, a diamond type, a surface conductive emitter SCD type, a thin film type in which a metal, an insulator, a semiconductor, and a metal are stacked, a HEED type, an EL type, a porous silicon type, a surface-conduction electron-emitter (SCD) type, and the like. Note that various elements can be used as an electron emitter without limitation to those described above.

A liquid crystal element is an element that controls transmission or non-transmission of light by an optical modulation action of liquid crystal and includes a pair of electrodes and liquid crystal. The optical modulation action of liquid crystal is controlled by an electric filed (including a lateral electric field, a vertical electric field and a diagonal electric field) applied to the liquid crystal. The following liquid crystal can be used for a liquid crystal element: nematic liquid crystal, cholesteric liquid crystal, smectic liquid crystal, discotic liquid crystal, thermotropic liquid crystal, lyotropic liquid crystal, low molecular liquid crystal, high molecular liquid crystal, polymer dispersed liquid crystal (PDLC), ferroelectric liquid crystal, anti-ferroelectric liquid crystal, main chain type liquid crystal, side chain type polymer liquid crystal, plasma addressed liquid crystal (PALC), banana-shaped liquid crystal, a TN (twisted nematic) mode, an STN (super twisted nematic) mode, an IPS (in-plane-switching) mode, an FFS (fringe field switching) mode, an MVA (multi-domain vertical alignment) mode, a PVA (patterned vertical alignment) mode, an ASV (advanced super view) mode, an ASM (axially symmetric aligned microcell) mode, an OCB (optical compensated birefringence) mode, an ECB (electrically controlled birefringence) mode, an FLC (ferroelectric liquid crystal) mode, an AFLC (anti-ferroelectric liquid crystal) mode, a PDLC (polymer dispersed liquid crystal) mode, and a guest-host mode. Note that various kinds of liquid crystal elements can be used without limitation to those described above.

Electronic paper corresponds to devices that display images by molecules which utilize optical anisotropy, dye molecular orientation, or the like; by particles which utilize electrophoresis, particle movement, particle rotation, phase change, or the like; by moving one end of a film; by using coloring properties or phase change of molecules; by using optical absorption by molecules; and by using self-light emission by bonding electrons and holes. For example, the following can be used for the electronic paper: microcapsule electrophoresis, horizontal electrophoresis, vertical electrophoresis, a spherical twisting ball, a magnetic twisting ball, a columnar twisting ball, a charged toner, electro liquid powder, magnetic electrophoresis, a magnetic thermosensitive type, an electrowetting type, a light-scattering (transparent-opaque change) type, cholesteric liquid crystal and a photoconductive layer, a cholesteric liquid crystal device, bistable nematic liquid crystal, ferroelectric liquid crystal, a liquid crystal dispersed type with a dichroic dye, a movable film, coloring and decoloring properties of a leuco dye, a photochromic material, an electrochromic material, an electrodeposition material, flexible organic EL, and the like. Note that various types of electronic papers can be used without limitation to those described above. By using microcapsule electrophoresis, problems of electrophoresis, that is, aggregation or precipitation of phoresis particles can be solved. Electro liquid powder has advantages such as high-speed response, high reflectivity, wide viewing angle, low power consumption, and memory properties.

A plasma display includes a substrate having a surface provided with an electrode, and a substrate having a surface provided with an electrode and a minute groove in which a phosphor layer formed. In the plasma display, the substrates are opposite to each other with a narrow interval, and a rare gas is sealed therein. Alternatively, a plasma display can have a structure in which a plasma tube is interposed between film-shaped electrodes. A plasma tube is such that a discharge gas, fluorescent materials for RGB, and the like are sealed in a glass tube. Display can be performed by applying a voltage between the electrodes to generate an ultraviolet ray so that the fluorescent materials emit light. Note that the plasma display panel may be a DC type PDP or an AC type PDP. As a driving method of the plasma display panel, AWS (address while sustain) driving, ADS (address display separated) driving in which a subframe is divided into a reset period, an address period, and a sustain period, CLEAR (high-contrast, low energy address and reduction of false contour sequence)

driving, ALIS (alternate lighting of surfaces) method, TERES (technology of reciprocal sustainer) driving, and the like can be used. Note that various types of plasma displays can be used without limitation to those described above.

Electroluminescence, a cold cathode fluorescent lamp, a hot cathode fluorescent lamp, an LED, a laser light source, a mercury lamp, or the like can be used for a light source needed for a display device, such as a liquid crystal display device (a transmissive liquid crystal display, a transflective liquid crystal display, a reflective liquid crystal display, a direct-view liquid crystal display, and a projection type liquid crystal display), a display device using a grating light valve (GLV), and a display device using a digital micromirror device (DMD). Note that a variety of light sources can be used without limitation to those described above.

Note that as a transistor, various types of transistors can be used without being limited to a certain type. For example, a thin film transistor (TFT) including a non-single-crystal semiconductor film typified by amorphous silicon, polycrystalline silicon, microcrystalline (also referred to as microcrystal or semi-amorphous) silicon, or the like can be used. The use of such TFTs has various advantages. For example, since TFTs can be formed at temperature lower than those using single crystalline silicon, manufacturing costs can be reduced and a manufacturing device can be made larger. Since the manufacturing device can be made larger, the TFTs can be formed using a large substrate. Therefore, a large number of display devices can be formed at the same time, and thus can be formed at low cost. In addition, since the manufacturing temperature is low, a substrate having low heat resistance can be used. Accordingly, the transistor can be formed over a light-transmitting substrate. Moreover, transmission of light in a display element can be controlled by using the transistors formed using the light-transmitting substrate. Further, part of a film included in the transistor can transmit light because the transistor is thin. Accordingly, the aperture ratio can be increased.

When polycrystalline silicon is formed, the use of a catalyst (e.g., nickel) enables further improvement in crystallinity and formation of a transistor with excellent electrical characteristics. Accordingly, a gate driver circuit (e.g., a scan line driver circuit), a source driver circuit (e.g., a signal line driver circuit), and a signal processing circuit (e.g., a signal generation circuit, a gamma correction circuit, or a DA converter circuit) can be formed over one substrate.

In addition, when microcrystalline silicon is formed, the use of a catalyst (e.g., nickel) enables further improvement in crystallinity and formation of a transistor with excellent electrical characteristics. At this time, the crystallinity can be improved by performing only heat treatment without laser irradiation. Thus, part of a source driver circuit (e.g., an analog switch) and a gate driver circuit (e.g., a scan line driver circuit) can be formed over one substrate. Further, when laser irradiation for crystallization is not performed, unevenness of silicon crystallinity can be suppressed. Accordingly, an image with improved image quality can be displayed.

Note that polycrystalline silicon and microcrystalline silicon can be formed without using a catalyst (such as nickel).

The crystallinity of silicon is preferably enhanced to polycrystallinity or microcrystallinity in the entire panel, but not limited thereto. The crystallinity of silicon may be improved only in part of the panel. The selective increase in crystallinity can be achieved by selective laser irradiation or the like. For example, only a peripheral driver circuit region excluding pixels may be irradiated with laser light. Alternatively, only a region of a gate driver circuit, a source driver circuit, or the like may be irradiated with laser light. Further alternatively, only part of a source driver circuit (e.g., an analog switch) may be irradiated with laser light. As a result, the crystallinity of silicon only in a region in which a circuit needs to operate at high speed can be improved. Since pixel region does not especially need to operate at high speed, the pixel circuit can operate without problems even if the crystallinity is not improved. A region crystallinity of which is improved is small, whereby manufacturing steps can be reduced, the throughput can be increased, and manufacturing costs can be reduced. Since the number of manufacturing devices needed is small, manufacturing costs can be reduced.

A transistor can be formed using a semiconductor substrate, an SOI substrate, or the like. Accordingly, a transistor with few variations in characteristics, sizes, shapes, or the like, with high current supply capability, and with a small size can be formed. By using such transistors, power consumption of a circuit can be reduced or a circuit can be highly integrated.

In addition, a transistor including a compound semiconductor or an oxide semiconductor, such as ZnO, a-InGaZnO, SiGe, GaAs, IZO, ITO, or SnO, and a thin film transistor or the like obtained by thinning such a compound semiconductor or oxide semiconductor can be used. Accordingly, the manufacturing temperature can be lowered and for example, such a transistor can be formed at room temperature. Thus, the transistor can be formed directly on a substrate having low heat resistance, such as a plastic substrate or a film substrate. Note that such a compound semiconductor or oxide semiconductor can be used for not only a channel portion of a transistor but also for other applications. For example, such a compound semiconductor or oxide semiconductor can be used for a resistor, a pixel electrode, or a light-transmitting electrode. Further, since such an element can be formed at the same time as the transistor, the costs can be reduced.

Transistors or the like formed by an inkjet method or a printing method can also be used. Accordingly, transistors can be foamed at room temperature, can be formed at a low vacuum, or can be formed using a large substrate. Since such transistors can be formed without a mask (a reticle), the layout of the transistors can be easily changed. Moreover, since it is not necessary to use a resist, the material costs are reduced and the number of steps can be reduced. Further, since a film is formed where needed, the material is not wasted compared to a manufacturing method in which etching is performed after a film is formed over the entire surface, so that the costs can be reduced.

Further, transistors or the like including an organic semiconductor or a carbon nanotube can be used. Accordingly, such transistors can be formed over a flexible substrate. A semiconductor device using such a substrate can resist a shock.

In addition, various types of transistors can be used. For example, a MOS transistor, a junction transistor, a bipolar transistor, or the like can be employed. Since a MOS transistor has a small size, a large number of transistors can be mounted. The use of a bipolar transistor can allow a large current to flow; thus, a circuit can operate at high speed.

Further, a MOS transistor, a bipolar transistor, and the like may be formed on one substrate. Thus, low power consumption, reduction in size, and high-speed operation can be achieved.

Furthermore, various transistors other than the above transistors can be used.

Note that transistor can be formed using various types of substrates. The type of a substrate is not limited to a certain type. For example, a single crystalline substrate, an SOI substrate, a glass substrate, a quartz substrate, a plastic substrate, a stainless steel substrate, a substrate including a stainless steel foil, or the like can be used as the substrate. In addition, the transistor may be formed using one substrate, and then transferred to another substrate. As a substrate to which the transistor is transferred, a single crystalline substrate, an SOI substrate, a glass substrate, a quartz substrate, a plastic substrate, a paper substrate, a cellophane substrate, a stone substrate, a wood substrate, a cloth substrate (including a natural fiber (e.g., silk, cotton, or hemp), a synthetic fiber (e.g., nylon, polyurethane, or polyester), a regenerated fiber (e.g., acetate, cupra, rayon, or regenerated polyester), or the like), a leather substrate, a rubber substrate, a stainless steel substrate, a substrate including a stainless steel foil, or the like can be used. Alternatively, a skin (e.g., epidermis or corium) or hypodermal tissue of an animal such as a human may be used as the substrate. Further, the transistor may be formed using a substrate, and the substrate may be thinned by polishing. As the substrate to be polished, a single crystalline substrate, an SOI substrate, a glass substrate, a quartz substrate, a plastic substrate, a stainless steel substrate, a substrate made of a stainless steel foil, or the like can be used. By using such a substrate, transistors with excellent properties or transistors with low power consumption can be formed, a device with high durability or high heat resistance can be formed, or reduction in weight or thinning can be achieved.

Note that a structure of a transistor can employ various modes without being limited to a specific stricture. For example, a multi-gate structure having two or more gate electrodes can be used. When the multi-gate structure is used, a structure where a plurality of transistors are connected in series is provided because channel regions are connected in series. With the multi-gate structure, the off-current can be reduced and the withstand voltage of the transistor can be increased (the reliability can be improved). Further, by employing the multi-gate structure, a drain-source current does not change much even if a drain-source voltage changes when the transistor operates in a saturation region; thus, the slope of voltage-current characteristics can be flat. By utilizing the characteristics that the slope of the voltage-current characteristics is flat, an ideal current source circuit or an active load having an extremely high resistance value can be provided. Accordingly, a differential circuit or a current mirror circuit which has excellent properties can be provided.

As another example, a structure where gate electrodes are formed above and below a channel can be used. By employing the structure where gate electrodes are formed above and below the channel, a channel region is enlarged; thus, a current value can be increased. Alternatively, by employing the structure where gate electrodes are formed above and below the channel, a depletion layer is easily formed; thus, a subthreshold swing (an S value) can be reduced. When the gate electrodes are formed above and below the channel, a structure where a plurality of transistors are connected in parallel is provided.

Further, a structure where a gate electrode is formed above or below a channel, a staggered structure, an inverted staggered structure, a structure where a channel region is divided into a plurality of regions, a structure where channel regions are connected in parallel or in series can also be employed. In addition, a source electrode or a drain electrode may overlap with a channel region (or part of it). By using the structure where the source electrode or the drain electrode may overlap with the channel region (or part of it), unstable operation due to electric charge accumulated in part of the channel region can be prevented. Further, an LDD region may be provided. By providing the LDD region, the off-current can be reduced or the withstand voltage of the transistor can be increased (the reliability can be improved). Alternatively, by providing the LDD region, a drain-source current does not change much even if a drain-source voltage changes when a transistor operates in the saturation region, so that a slope of voltage-current characteristics can be flat.

Various types of transistors can be used, and the transistors can be formed using various types of substrates. Accordingly, all of the circuits which are necessary to realize a desired function can be formed using one substrate. For example, all of the circuits which are necessary to realize a desired function can be formed using a glass substrate, a plastic substrate, a single crystalline substrate, an SOI substrate, or any other substrate. When all of the circuits which are necessary to realize a desired function are formed using one substrate, the number of components can be reduced to cut the costs or the number of connections between circuit components can be reduced to improve reliability. Alternatively, part of the circuits which are necessary to realize a desired function can be formed using one substrate, and another part of the circuits which are necessary to realize a desired function can be formed using another substrate. That is, not all of the circuits which are necessary to realize a desired function are necessary to be formed using the same substrate. For example, part of the circuits which are necessary to realize a desired function can be formed over a glass substrate using transistors, another part of the circuits which are necessary to realize the desired function can be formed using a single crystalline substrate, and an IC chip including transistors formed using the single crystalline substrate can be connected to the glass substrate by COG (chip on glass) so that the IC chip is provided over the glass substrate. Alternatively, the IC chip can be connected to the glass substrate by TAB (tape automated bonding) or a printed wiring board. When part of the circuits are formed using the same substrate in such a manner, the number of the components can be reduced to cut the costs or the number of connections between the circuit components can be reduced to improve reliability. In addition, circuits in a portion with high driving voltage or a portion with high driving frequency consume large power. Accordingly, the circuits in such portions are formed using a single crystalline substrate, for example, instead of using the same substrate, and an IC chip formed by the circuit is used; thus, increase in power consumption can be prevented.

Note that one pixel corresponds to one element whose brightness can be controlled. For example, one pixel corresponds to one color element, and brightness is expressed with one color element. Accordingly, in a color display device having color elements of R (red), G (green) and B (blue), the minimum unit of an image is composed of three pixels of an R pixel, a G pixel, and a B pixel. Note that the color elements are not limited to three colors, and color elements of more than three colors may be used and/or a color other than RGB may be used. For example, it is possible to add white so that RGBW (W means white) are used. Alternatively, ROB added with one or more colors of yellow, cyan, magenta, emerald green, vermilion, and the like can be used. Further, a color similar to at least one of R, G, and B can be added to ROB. For example, R, G, B1, and B2 may be employed. Although both B1 and B2 are blue, they have slightly different frequencies. Similarly, R1, R2, G, and B can be used. By using such color elements, display which is closer to a real object can be performed, and power consumption can be reduced. As another example, when brightness of one color element is controlled by a plurality of regions, one region can correspond to one pixel. For example, when area ratio grayscale display is performed or a subpixel is included, a plurality of regions which control brightness are provided in one color element and gray levels are expressed with all of the regions, and one region which controls brightness can correspond to one pixel. In that case, one color element is formed of a plurality of pixels. Alternatively, even when a plurality of the regions which control brightness are provided in one color element, these regions may be collected and one color element may be referred to as one pixel. In that case, one color element is formed of one pixel. In addition, when brightness of one color element is controlled by a plurality of regions, the size of regions which contribute to display may vary depending on pixels in some cases. Alternatively, in a plurality of the regions which control brightness in one color element, signals supplied to respective regions may slightly vary to widen a viewing angle. That is, potentials of pixel electrodes included in the plurality of the regions in one color element can be different from each other. Accordingly, voltages applied to liquid crystal molecules vary depending on the pixel electrodes. Thus, the viewing angle can be widened.

Note that when it is explicitly described as one pixel (for three colors), it corresponds to the case where three pixels of R, G, and B are considered as one pixel. Meanwhile, when it is explicitly described as one pixel (for one color), it corresponds to the case where a plurality of regions provided in each color element are collectively considered as one pixel.

Note that pixels are provided (arranged) in matrix in some cases. Here, description that pixels are provided (arranged) in matrix includes the case where the pixels are arranged in a straight line or a jagged line in a longitudinal direction or a lateral direction. Therefore, when full color display with three color elements (e.g., RGB) is performed, the following cases are included therein: the case where the pixels are arranged in stripes, the case where dots of the three color elements are arranged in a delta pattern, and the case where dots of the three color elements are provided in Bayer arrangement. Further, the sizes of display regions may be different between respective dots of color elements. Thus, power consumption can be reduced and the life of a display element can be prolonged.

An active matrix method in which an active element is included in a pixel or a passive matrix method in which an active element is not included in a pixel can be used.

In the active matrix method, as an active element (a non-linear element), a variety of active elements (non-linear elements) such as a metal-insulator-metal (MIM) and a thin film diode (TFD) can be used in addition to a transistor. Since such an element needs a smaller number of manufacturing steps, manufacturing costs can be reduced or a yield can be improved. Further, since the size of such an element is small, the aperture ratio can be increased, so that power consumption can be reduced and higher luminance can be achieved.

As a method other than the active matrix method, the passive matrix method in which an active element (a non-linear element) is not used can also be used. Since an active element (a non-linear element) is not used, the manufacturing steps are fewer, so that manufacturing costs can be reduced or the yield can be improved. Further, since an active element (a non-linear element) is not used, the aperture ratio can be improved, so that power consumption can be reduced and high luminance can be achieved.

Note that a transistor is an element having at least three terminals of a gate, a drain, and a source. The transistor includes a channel region between a drain region and a source region, and a current can flow through the drain region, the channel region, and the source region. Here, since the source and the drain of the transistor may change depending on the structure, operating conditions, and the like of the transistor, it is difficult to define which is a source or a drain. Therefore, a region functioning as a source and a drain is not called the source or the drain in some cases. In that case, such regions may be referred to as a first terminal and a second terminal, a first electrode and a second electrode, or a first region and a second region, for example.

Further, a transistor may be an element having at least three terminals of a base, an emitter, and a collector. In this ease also, one of the emitter and the collector may be referred to as a first terminal and a second terminal, for example.

A gate corresponds to the whole or part of a gate electrode and a gate wiring (also called a gate line, a gate signal line, a scan line, a scan signal line, or the like). A gate electrode corresponds to part of a conductive film that overlaps with a semiconductor which forms a channel region with a gate insulating film interposed therebetween. Note that in some cases, part of the gate electrode overlaps with an LDD (lightly doped drain) region, a source region (or a drain region) with the gate insulating film interposed therebetween. A gate wiring corresponds to a wiring for connecting gate electrodes of transistors, a wiring for connecting gate electrodes in pixels, or a wiring for connecting a gate electrode to another wiring.

However, there is a portion (a region, a conductive film, a wiring, or the like) which functions as both a gate electrode and a gate wiring. Such a portion (a region, a conductive film, a wiring, or the like) may be called either a gate electrode or a gate wiring. That is, there is a region where a gate electrode and a gate wiring cannot be clearly distinguished from each other. For example, when a channel region overlaps with part of an extended gate wiring, the overlapped portion (region, conductive film, wiring, or the like) functions as both a gate wiring and a gate electrode. Accordingly, such a portion (a region, a conductive film, a wiring, or the like) may be called either a gate electrode or a gate wiring.

In a multi-gate transistor, for example, a gate electrode is often connected to another gate electrode by using a conductive film which is formed of the same material as the gate electrodes. Since such a portion (a region, a conductive film, a wiring, or the like) is a portion (a region, a conductive film, a wiring, or the like) for connecting the gate electrode to another gate electrode, it may be called a gate wiring. Alternatively, it may be called a gate electrode because a multi-gate transistor can be considered as one transistor. That is, a portion (a region, a conductive film, a wiring, or the like) which is formed of the same material as a gate electrode or a gate wiring and forms the same island as the gate electrode or the gate wiring to be connected to the gate electrode or the gate wiring may be called either a gate electrode or a gate wiring. In addition, for example, part of a conductive film which connects a gate electrode and a gate wiring and is formed of a material different from that of the gate electrode and the gate wiring may also be called either a gate electrode or a gate wiring.

When a wiring is called a gate wiring, a gate line, a gate signal line, a scan line, a scan signal line, or the like, there is the case where a gate of a transistor is not connected to the wiring. In this case, the gate wiring, the gate line, the gate signal line, the scan line, or the scan signal line corresponds to a wiring formed in the same layer as the gate of the transistor, a wiring formed of the same material as the gate of the transistor, or a wiring formed at the same time as the gate of the transistor in some cases. Examples of such a wiring are a wiring for storage capacitance, a power supply line, and a reference potential supply line.

A source corresponds to the whole or part of a source region, a source electrode, and a source wiring (also called a source line, a source signal line, a data line, a data signal line, or the like). A source region corresponds to a semiconductor region containing a large amount of p-type impurities (e.g., boron or gallium) or n-type impurities (e.g., phosphorus or arsenic). Therefore, a region containing a small amount of p-type impurities or n-type impurities, a so-called LDD (lightly doped drain) region is not included in the source region. A source electrode corresponds to a conductive layer that is formed of a material different from that of a source region and electrically connected to the source region. Note that a source electrode includes a source region in some cases. A source wiring is a wiring for connecting source electrodes of transistors, a wiring for connecting source electrodes in pixels, or a wiring for connecting a source electrode to another wiring.

However, there is a portion (a region, a conductive film, a wiring, or the like) functioning as both a source electrode and a source wiring. Such a portion (a region, a conductive film, a wiring, or the like) may be called either a source electrode or a source wiring. That is, there is a region where a source electrode and a source wiring cannot be clearly distinguished from each other. For example, when a source region overlaps with part of an extended source wiring, the overlapped portion (region, conductive film, wiring, or the like) functions as both a source wiring and a source electrode. Accordingly, such a portion (a region, a conductive film, a wiring, or the like) may be called either a source electrode or a source wiring.

In addition, for example, part of a conductive film which connects a source electrode and a source wiring and is formed of a material different from that of the source electrode or the source wiring may be called either a source electrode or a source wiring.

When a wiring is called a source wiring, a source line, a source signal line, a data line, a data signal line, or the like, there is the case where a source (a drain) of a transistor is not connected to the wiring. In this case, the source wiring, the source line, the source signal line, the data line, or the data signal line corresponds to a wiring formed in the same layer as the source (the drain) of the transistor, a wiring formed of the same material as the source (the drain) of the transistor, or a wiring formed at the same time as the source (the drain) of the transistor in some cases. Examples of such a wiring are a wiring for storage capacitance, a power supply line, and a reference potential supply line.

Note that a drain is similar to the source.

A semiconductor device corresponds to a device having a circuit including a semiconductor element (e.g., a transistor, a diode, or thyristor). The semiconductor device may be general devices that can function by utilizing semiconductor characteristics. Alternatively, devices including a semiconductor material are also referred to as semiconductor devices.

A display device corresponds to a device including a display element. A display device may include a plurality of pixels including a display element. Moreover, a display device may include a peripheral driver circuit for driving a plurality of pixels. The peripheral driver circuit for driving a plurality of pixels may be formed on the same substrate as the plurality of pixels. A display device may also include a peripheral driver circuit provided over a substrate by wire bonding or bump bonding, that is, an IC chip connected by chip on glass (COG), TAB, or the like. Further, a display device may include a flexible printed circuit (FPC) to which an IC chip, a resistor, a capacitor, an inductor, a transistor, or the like is attached. A display device may include a printed wiring board (PWB) which is connected through a flexible printed circuit (FPC) and to which an IC chip, a resistor, a capacitor, an inductor, a transistor, or the like is attached. A display device may also include an optical sheet such as a polarizing plate or a retardation plate. A display device may also include a lighting device, a housing, an audio input/output device, a light sensor, and the like.

A lighting device may include a backlight unit, a light guide plate, a prism sheet, a diffusion sheet, a reflective sheet, a light source (e.g., an LED or a cold cathode fluorescent lamp), a cooling device (e.g., a water cooling device or an air cooling device), or the like.

A light-emitting device corresponds to a device including a light-emitting element or the like. A light-emitting device including a light-emitting element as a display element is a specific example of a display device.

A reflective device corresponds to a device including a light-reflecting element, a light diffraction element, a light-reflecting electrode, or the like.

A liquid crystal display device corresponds to a display device including a liquid crystal element. Liquid crystal display devices include a direct-view liquid crystal display, a projection type liquid crystal display, a transmissive liquid crystal display, a reflective liquid crystal display, a transflective liquid crystal display, and the like in their categories.

A driving device corresponds to a device including a semiconductor element, an electric circuit, an electronic circuit, or the like. Examples of the driving device are a transistor which controls input of a signal from a source signal line to a pixel (also called a selection transistor, a switching transistor, or the like), a transistor which supplies a voltage or a current to a pixel electrode, and a transistor which supplies a voltage or a current to a light-emitting element. Moreover, examples of the driving device are a circuit which supplies a signal to a gate signal line (also called a gate driver, a gate line driver circuit, or the like), a circuit which supplies a signal to a source signal line (also called a source driver, a source line driver circuit, or the like).

Note that categories of a display device, a semiconductor device, a lighting device, a cooling device, a light-emitting device, a reflective device, a driving device, and the like overlap with each other in some cases. For example, a display device includes a semiconductor device and a light-emitting device in some cases. Alternatively, a semiconductor device includes a display device and a driving device in some cases.

When it is explicitly described that B is formed on or over A, it does not necessarily mean that B is formed in direct contact with A. The description includes the case where A and B are not in direct contact with each other, that is, the case where another object is interposed between A and B. Here, each of A and B is an object (e.g., a device, an element, a circuit, a wiring, an electrode, a terminal, a conductive film, or a layer).

Accordingly, for example, when it is explicitly described that a layer B is formed on (or over) a layer A, it includes both the case where the layer B is formed in direct contact with the layer A; and the case where another layer (e.g., a layer C or a layer D) is formed in direct contact with the layer A, and the layer B is formed in direct contact with the layer C or D. Note that another layer (e.g., the layer C or the layer D) may be a single layer or a plurality of layers.

Similarly, when it is explicitly described that B is formed above A, it does not necessarily mean that B is formed in direct contact with A, and another object may be interposed between A and B. Accordingly, the case where a layer B is formed above a layer A includes the case where the layer B is formed in direct contact with the layer A and the case where another layer (such as a layer C and a layer D) is formed in direct contact with the layer A and the layer B is formed in direct contact with the layer C or the D. Note that another layer (e.g., a layer C or a layer D) may be a single layer or a plurality of layers.

Note that when it is explicitly described that B is formed over, on, or above A, B may be formed diagonally above A.

Note that the same can be said when it is explicitly described that B is formed below or under A.

Explicit singular forms preferably mean singular forms. However, without being limited thereto, such singular forms can include plural forms. Similarly, explicit plural forms preferably mean plural forms. However, without being limited thereto, such plural forms can include singular forms.

According to one embodiment of the present invention, the peak luminance can be increased depending on gray level data distribution, which leads to improvement in image quality. According to one embodiment of the present invention, faint light emission at the time of black display is not increased even when the peak luminance is increased, whereby the contrast ratio can be increased. According to one embodiment of the present invention, an optical state of liquid crystal molecules is averaged by alternately displaying a generally bright image and a generally dark image, whereby the viewing angle can be increased. According to one embodiment of the present invention, the response speed of a liquid crystal element can be increased. According to one embodiment of the present invention, the efficiency of a backlight is increased, which results in reduction in power consumption. According to one embodiment of the present invention, a desired gray level is expressed by alternately displaying a generally bright image and a generally dark image, whereby the quality of moving images can be improved. According to one embodiment of the present invention, manufacturing costs can be reduced.

BRIEF DESCRIPTION OF THE DRAWINGS

In the accompanying drawings:

FIGS. 9A to 9F illustrate examples of operations of a semiconductor device;

FIGS. 10A to 10F illustrate examples of operations of a semiconductor device;

FIGS. 11A to 11F illustrate examples of operations of a semiconductor device;

DETAILED DESCRIPTION OF THE INVENTION

Figure 1A:
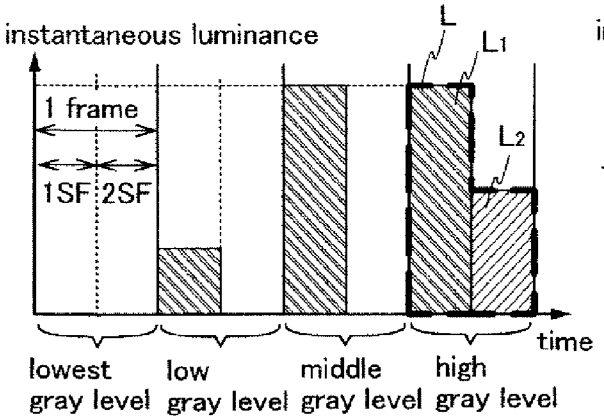
FIGS. 1A to 1D illustrate some basic properties of a semiconductor device.

Embodiments of the present invention will be described below with reference to the accompanying drawings. Note that the present invention can be implemented in various modes, and it is easily understood by those skilled in the art that modes and details can be variously changed without departing from the spirit and scope of the present invention. Therefore, the present invention is not construed as being limited to what is described in the embodiments. Note that in structures of the present invention described below, reference numerals denoting the same components are used in common in different drawings, and detailed description of the same portions or portions having similar functions is not repeated.

Hereinafter, embodiments will be described with reference to the drawings. In that case, what is described in one embodiment with reference to one drawing (or part thereof) can be freely applied to, combined with, or exchanged with what is described with reference to another drawing (or part thereof) as appropriate. Further, even more drawings can be formed when each part of a drawing described in one embodiment is combined with another part of the drawing.

Similarly, what is described in one or more embodiments (or part thereof) with reference to one drawing can be freely applied to, combined with, or exchanged with what is described another embodiment or other embodiments (or part thereof) with reference to a drawing as appropriate. Further, even more drawings can be formed when each part in the drawing in one or more embodiments is combined with part of another embodiment or other embodiments.

Note that what is described in one embodiment (or part thereof) may be an example of embodying, slightly transforming, partially modifying, improving, describing in detail, or applying other contents described in the embodiment, an example of related part thereof, or the like. Therefore, the contents (or part thereof) described in one embodiment can be freely applied to, combined with, or exchanged with other contents (or part thereof) described in the embodiment.

In addition, the contents (or part thereof) described in one or more embodiments are an example of embodying, slightly transforming, partially modifying, improving, describing in detail, or applying the contents described in another embodiment or other embodiments, an example of related part thereof, or the like. Therefore, the contents (or part thereof) described in another embodiment or other embodiments can be freely applied to, combined with, or exchanged with other contents (or part thereof) described in one or more embodiments.

Note that this specification includes not only the case where a plurality of operations described in a flowchart are performed in the order as shown in the chart, but also the case where the order of operations is changed so that the operations are not performed in the above order, and the case where each individual operation is separately performed, for example.

Embodiment 1

As Embodiment 1, a structure example and a driving method of a display device will be described.

First, terms used in this embodiment and other embodiments are described. The human eye cannot perceive change of luminance which changes faster than a certain frequency (the critical frequency). Specifically, the human eye cannot perceive change of luminance which changes at a frequency of approximately 50 Hz or more, that is, in 20 milliseconds or less, and perceives such change of luminance as certain brightness. At this time, the brightness perceived by the human eye depends on the level obtained by integrating instantaneous luminance with the time.

In this embodiment and other embodiments, when it is necessary to explicitly describe luminance that is instantaneously obtained, such luminance is referred to as instantaneous luminance. Moreover, when it is necessary to explicitly describe the level obtained by integrating instantaneous luminance with the time, such level is referred to as integrated luminance (or perceptual luminance). Note that in this embodiment and other embodiments, a range of time for integration with the time is one frame period.

Note that one frame period is 1/60 second in NTSC which is a kind of the standards for video signals, and 1/50 second in PAL which is also a kind of the standards for video signals; one frame period is shorter than 20 milliseconds in either case. The level of instantaneous luminance itself has no direct correlation with brightness perceived by the human eye. For example, when the time during which the instantaneous luminance is kept is short, the brightness perceived by the human eye is low regardless of how high the instantaneous luminance is. It is integrated luminance that directly correlates with the brightness perceived by the human eye. The brightness perceived by the human eye is higher as the integrated luminance is higher, whereas the brightness perceived by the human eye is lower as the integrated luminance is lower.

A structure example and a driving method of a display device will be described below. A display device shown in this embodiment includes a plurality of pixels, for example. A plurality of instantaneous luminances are expressed by performing signal writing to each pixel plural times in one frame period. Time integration levels of the plurality of instantaneous luminances are controlled, so that the gray level is expressed. In the display device in this embodiment, the time integration level of the instantaneous luminance is increased as the level of gray level data of the pixel is higher, and the time integration level of the instantaneous luminance is increased as the average value of gray level data of an image to be displayed is smaller. Note that the signals written to the pixels can be analog signals. Moreover, writing in one frame period is not limited to plural times and may be one time.

When power consumption is desired to be reduced, the time integration level is not necessarily increased even if the average value of gray level data of an image to be displayed is small.

FIG. 1A illustrates an example of change in instantaneous luminance over time in one focused pixel in a display region of a display device. In FIG. 1A, the horizontal axis represents time, and the vertical axis represents instantaneous luminance. The example of change in instantaneous luminance over time illustrated in FIG. 1A is the case where a display element responds to a signal written to the pixel at high speed. High-speed response refers to, for example, response within approximately less than 1/4 of a subframe period. Examples of such a display element are an organic EL element, an OCB (optically compensated birefringence) mode liquid crystal element, and a liquid crystal element using ferroelectric liquid crystal. Alternatively, it can be said that FIG. 1A illustrates an example of the case where luminance is approximately represented without considering the response time of the display element.

The instantaneous luminance of the pixel can have a plurality of levels by performing signal writing plural times in one frame period. In this embodiment, the case where signal writing is performed twice in one frame period as in the example illustrated in FIG. 1A is described. Note that this embodiment is not limited thereto, and signal writing may be performed N times (N is a positive integer) in one frame period.

Here, in a frame period, a period after N-th writing is performed until (N+1)th writing (or the first writing in the next frame period) is performed is referred to as an N-th subframe period. Moreover, an image displayed in the N-th subframe period is referred to as an N-th subimage. Since N=2 is given in this embodiment, one frame period is divided into a first subframe period (1SF) and a second subframe period (2SF). Note that since N is a positive integer, N may be 1 or an integer of 3 or more. Further, in this embodiment, description is made on the assumption that subframes are equal in length. Note that the length of subframe periods is not limited thereto and can be variously changed by controlling timing of signal writing.

When instantaneous luminance of the pixel changes over time as illustrated in FIG. 1A, integrated luminance L with an integration range of one frame period is the area of a region that is surrounded by the instantaneous luminance and the time axis in one frame period. Moreover, the integrated luminance L with an integration range of one frame period is represented as the sum of integrated luminance $L_1$ with an integration range of the first subframe period and integrated luminance $L_2$ with an integration range of the second subframe period. That is, $L=L_1+L_2$ is satisfied.

The integrated luminance L with an integration range of one frame period is preferably based on gray level data $X_0$ of an image (an original image) which should be displayed in the frame. Further, the integrated luminance L with an integration range of one frame period is variously changed based on a scale factor K determined using gray level data distribution of an image to be displayed, whereby a display device in this embodiment can be obtained.

Accordingly, in a display device in this embodiment, $L=K\cdot L_0$ is preferably satisfied. Note that increasing the scale factor K corresponds to increasing the brightness of the entire screen. In other words, the scale factor K is the degree of increase in brightness of the entire screen. $L_0$ is integrated luminance in accordance with the gray level data $X_0$ of the original image, and here, is integrated luminance when hold driving is performed in accordance with the gray level data $X_0$ of the original image. Therefore, the integrated luminance L has the relation indicated by Formula 1.

[Formula 1]

$$L = K\cdot L_0 = L_1 + L_2$$

$$\left\{L_0 = \int_0^F I_0(t)\,dt,\ \ L_1 = \int_0^{nF} I_1(t)\,dt,\ \ L_2 = \int_{nF}^F I_2(t)\,dt\right\}$$

In Formula 1, K is a scale factor; F, the length of one frame period; n, a duty ratio of a first subframe period to one frame period ($0<n\leqq 1$); $I_0(t)$, instantaneous luminance determined in accordance with the gray level data $X_0$ of the original image; $I_1(t)$, instantaneous luminance determined in accordance with gray level data $X_1$ of a first subimage; and $I_2(t)$, instantaneous luminance determined in accordance with gray level data $X_2$ of a second subimage. The scale factor K can be determined using gray level data distribution, so that a display device in this embodiment can be obtained.

A method for determining the scale factor K by gray level data distribution can be, for example, a method in which the average gray level of an image to be displayed is obtained from the gray level data distribution, and the scale factor K is reduced as the image has higher average gray level and the scale factor K is increased as the image has lower average gray level. By increasing the scale factor K as the image has lower average gray level, the peak luminance of the image (of night view or fireworks, for example) in which only part of a generally dark image has high gray level can be increased. Accordingly, a display device can be obtained in which capability of expressing brightness of night view, sparks, luster of metal, and the like can be greatly improved. Further, decrease in the scale factor K as the image has higher average gray level can prevent a viewer from feeling the glare; thus, a display device in which display is more easily to be seen can be obtained.

That is, in a display device in this embodiment, the integrated luminance L represented as the sum of the integrated luminance $L_1$ with an integration range of the first subframe period and the integrated luminance $L_2$ with an integration range of the second subframe period is changed in accordance with the gray level data $X_0$ of the original image and the scale factor K determined using gray level data distribution of an image to be displayed. The scale factor K is the degree of increase in brightness of the entire screen; the scale factor K is smaller as the image to be displayed has higher average gray level and is larger as the image has lower average gray level.

Figure 1B:
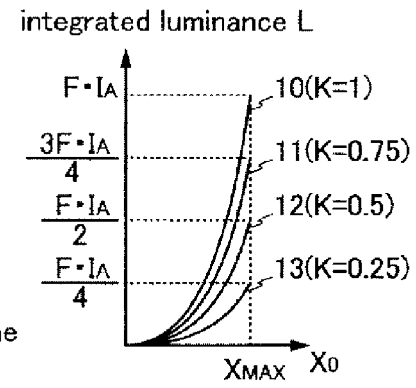
Figure 1C:
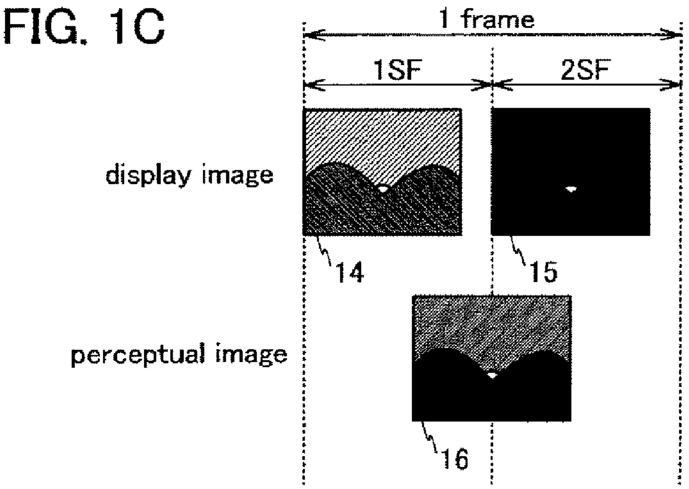
Figure 1D:
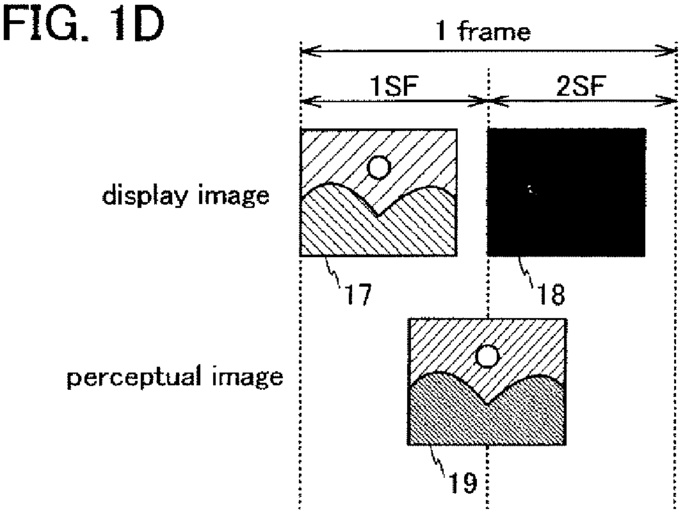

An example of the case where the display device in this embodiment displays an image is described with reference to FIGS. 1C and 1D. FIGS. 1C and 1D each illustrate images (display images) which are instantaneously displayed in accordance with instantaneous luminance of each pixel and an image (a perceptual image) which is perceived by the human eye in accordance with integrated luminance of each pixel, with the horizontal axis representing time. In FIG. 1C, a first subimage 14 and a second subimage 15 which are obtained from a first original image are sequentially displayed in a first frame period. Similarly, in FIG. 1D, a first subimage 17 and a second subimage 18 which are obtained from a second original image are sequentially displayed in a second frame period.

When the first subimage 14 and the second subimage 15 are sequentially displayed in this manner, an image perceived by the human eye is an image obtained by averaging the first subimage 14 and the second subimage 15 as illustrated as a first perceptual image 16. Similarly, when the first subimage 17 and the second subimage 18 are sequentially displayed, an image perceived by the human eye is an image obtained by averaging the first subimage 17 and the second subimage 18 as illustrated as a second perceptual image 19. The first perceptual image 16 and the second perceptual image 19 can be based on the first original image and the second original image, respectively. Specifically, each of the first perceptual image 16 and the second perceptual image 19 can be an image whose brightness has been increased or reduced to/from the original image in accordance with the value of the scale factor K. The scale factor K can be determined using gray level data distribution of the original image, for example, average gray level. Accordingly, the peak luminance can be modulated depending on images, whereby the quality of images can be improved.

The first original image in FIG. 1C is an image of sunrise between mountains. More specifically, the first original image shows the case where only part of the sun is seen between the mountains in an image in which most part of the background such as the mountains and the sky is dark, and the average gray level of the first original image is low. In such a case, a high gray level region (a portion corresponding to the sun) is displayed as being brighter not only in the first subimage 14 but also in the second subimage 15, whereby light of the sun, only part of which can be seen in the first perceptual image 16, can be brighter (the peak luminance can further be increased). Accordingly, the brightness of the sun can be enhanced, and the image quality can be improved.

On the other hand, the second original image in FIG. 1D is also an image of mountains, the sky, and the sun and shows the case where most part of the background such as the mountains and the sky has a certain level of brightness, which is different from the first original image. In this case, the average gray level of the second original image is high. At this time, if the sky and the sun are extremely bright, they are too bright for the viewer, which causes trouble. Accordingly, the image is displayed mainly by the first subimage 17 while a black image is displayed as the second subimage 18 so that luminance can be suppressed, which can prevent the image from being too bright.

As described above, when the average gray level of the original image is high, a black image is displayed as one subimage in order to suppress luminance of the image; whereas when the average gray level of the original image is low, part of the black display subimage is displayed as being brighter where needed. Accordingly, it is possible to improve the image quality by displaying a bright region as being brighter and to improve the quality of moving image by inserting a black image at the same time.

Further, at this time, luminance of a backlight can be fixed, whereby light leakage from the backlight is not increased even if the peak luminance is increased. That is, black blurring is not increased even when the peak luminance is increased, whereby the contrast of still images can be increased. Note that constant luminance of the backlight is greatly advantageous because it leads to increase in backlight efficiency, prolongation of the life of the backlight, reduction in power consumption and manufacturing costs due to simplification of a driver circuit in the backlight, and the like. Note that luminance of the backlight is not limited to being fixed and can be increased or decreased depending on images.

In a method where intermittent driving of a backlight source is controlled in accordance with general brightness of an image, the time for displaying a black image is short when the image is generally dark; thus, an afterimage due to hold driving occurs, which leads to a problem of reducing the quality of moving images. However, in the display device in this embodiment, the time for displaying a black image can be sufficiently long even when the image is generally dark, whereby the quality of moving images can be improved. In particular, by making a plurality of subframes equal in length, frequency of a peripheral driver circuit can be prevented from being increased in addition to the above advantage. Moreover, an optical state of liquid crystal molecules is averaged by alternately displaying a generally bright image and a generally dark image, whereby the viewing angle can be increased.

In addition, in a method where instantaneous luminance of a backlight source is increased or reduced in accordance with general brightness of an image, faint light emission of a pixel performing black display is increased in a generally dark image, and thus the contrast ratio is reduced. However, in the display device in this embodiment, faint light emission of a pixel performing black display can be prevented form being increased when the image is generally dark, whereby the contrast ratio can be increased. Moreover, an optical state of liquid crystal molecules is averaged by alternately displaying a generally bright image and a generally dark image, whereby the viewing angle can be increased.

Note that the gray level data distribution used for determining the scale factor K can be distribution in the entire image. Thus, the most appropriate scale factor K can be determined regardless of the position of a peak gray level region in the image or the like. Alternatively, the gray level data distribution used for determining the scale factor K can be distribution in part of the image, which can prevent a region that is inappropriate to be used as the basis for determining the scale factor K (e.g., subtitles) from being included in the gray level data distribution. Accordingly, the most appropriate scale factor K can be determined.

Next, the relation between the integrated luminance L in Formula 1 and the gray level data $X_0$ of the original image will be described. The instantaneous luminance $I_0(t)$ in Formula 1 is determined based on the gray level data $X_0$ of the original image and specifically represented as Formula 2.

$$I_0(t) = I_A\left(\frac{X_0}{X_{MAX}}\right)^{\gamma} \quad \text{[Formula 2]}$$

In Formula 2, $\gamma$ is a constant called a gamma value. The gamma value is generally $\gamma$=2.2; therefore, description is made on the case where $\gamma$=2.2 in this embodiment and other embodiments unless otherwise specified. Note that the gamma value is not limited to this and can be a variety of values. $X_{MAX}$ is the maximum level of the gray level data. In this embodiment, the maximum level $X_{MAX}$ of the gray level data is 255; however, it is not limited thereto and can be a variety of numeric data. $I_A$ is an instantaneous luminance coefficient. The instantaneous luminance coefficient $I_A$ is a coefficient that converts the gray level data into instantaneous luminance, and is the same value in all the pixels in this embodiment. However, it is not limited thereto and can vary between pixels. For example, in a liquid crystal display device, the instantaneous luminance coefficient $I_A$ is determined by the instantaneous luminance of a backlight or the like. Accordingly, when a display region is divided into a plurality of regions and instantaneous luminance of the backlight can be independently controlled in each region, the instantaneous luminance coefficient $I_A$ can vary between pixels. Note that in this embodiment, the case where the instantaneous luminance coefficient $I_A$ is invariant with respect to time is described; however, the instantaneous luminance coefficient $I_A$ can be changed with respect to time. For example, in a liquid crystal display device, by changing the instantaneous luminance of a backlight with respect to time, the instantaneous luminance coefficient $I_A$ can be changed with respect to time.

By Formulae 1 and 2, the relation between the integrated luminance L and the gray level data $X_0$ of the original image can be obtained. FIG. 1B is a graph illustrating the relation between the integrated luminance L and the gray level data $X_0$ of the original image, which is represented as Formulae 1 and 2, with the gray level data $X_0$ of the original image as the horizontal axis and the integrated luminance L as the vertical axis. A curve 10 in FIG. 1B represents the relation between the integrated luminance L and the gray level data $X_0$ of the original image in the case where K=1; a curve 11, the relation therebetween in the case where K=0.75; a curve 12, the relation therebetween in the case where K=0.5; and a curve 13, the relation therebetween in the case where K=0.25.

As illustrated in FIG. 1B, in a display device in this embodiment, the integrated luminance L is increased with respect to the gray level data $X_0$ of the original image by power law, and is increased or decreased depending on the scale factor K determined using the gray level data distribution. Specifically, when the scale factor K is increased by a times (a is a positive integer), the integrated luminance L is also increased by a times. More specifically, the scale factor K is reduced as an image to be displayed has higher average gray level, and is increased as an image to be displayed has lower average gray level.

Next, a method in which the gray level data $X_0$ of the original image is converted into the gray level data $X_3$ of the first subimage and the gray level data $X_2$ of the second subimage will be described. In the display device in this embodiment, the instantaneous luminance $I_1(t)$ and instantaneous luminance $I_2(t)$ in Formula 1 can be represented as Formula 3.

$$I_1(t) = I_A\left(\frac{X_1}{X_{MAX}}\right)^{\gamma},\ I_2(t) = I_A\left(\frac{X_2}{X_{MAX}}\right)^{\gamma} \quad \text{[Formula 3]}$$

This embodiment shows the case where a display element responds to a signal written to the pixel at high speed, such as the example of change in instantaneous luminance over time illustrated in FIG. 1A. However, this embodiment is not limited thereto and includes the case where a display element responds at low speed. In that case, instantaneous luminance changes over time in each subframe period so as to gradually approach the value shown in Formula 3.

Further, substituting Formulae 3 and 2 into Formula 1 gives the relation shown in Formula 4.

$$K\cdot X_0^{\gamma}=n\cdot X_1^{\gamma}+(1-n)\cdot X_2^{\gamma} \quad \text{[Formula 4]}$$

The relation shown in Formula 4 is referred to as a formula for gray level data conversion. Here, (1−n) represents the duty ratio of the second subframe period to one frame period. According to Formula 4, in a display device in this embodiment, the sum of a value obtained by multiplying the gray level data $X_1$ of the first subimage raised to the power of gamma by the duty ratio of the first subframe period; and a value obtained by multiplying the gray level data $X_2$ of the second subimage raised to the power of gamma by the duty ratio of the second subframe period can be proportional to the gray level data $X_0$ of the original image raised to the power of gamma. Note that a proportionality coefficient in that case can be the scale factor K determined using the gray level data distribution.

In addition, the gray level data $X_1$ of the first subimage and the gray level data $X_2$ of the second subimage are not uniquely determined by Formula 4 and the gray level data $X_0$ of the original image but optional to some extent. The display device in this embodiment may be a display device in which writing is performed plural times in one frame period in accordance with gray level data converted by Formula 4 so that an image is displayed. The scale factor K determined using the gray level data distribution is included in Formula 4, and by converting the gray level data in accordance with the scale factor K, a display device can be obtained in which the capability of expressing an image with high peak gray level is improved, the glare in a generally bright image is reduced, and afterimages of moving images or the like are reduced due to impulse driving.

Figure 2A:
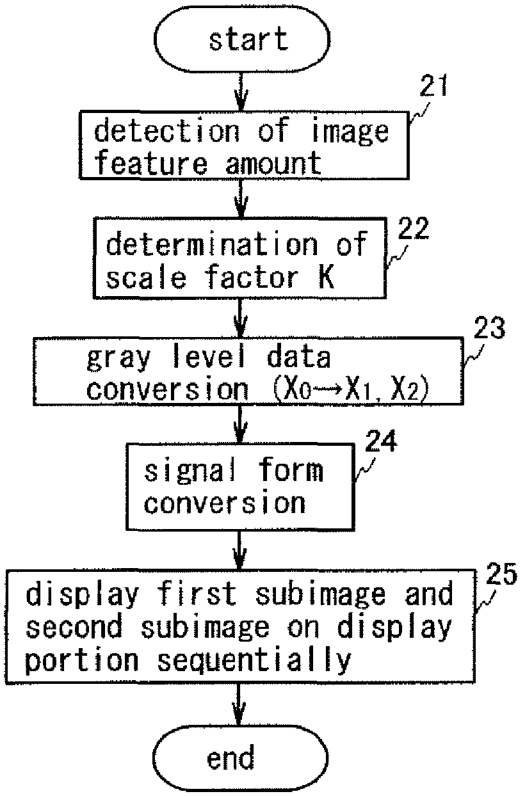
FIGS. 2A and 2B illustrate examples of operations and a structure of a semiconductor device.
Figure 2B:
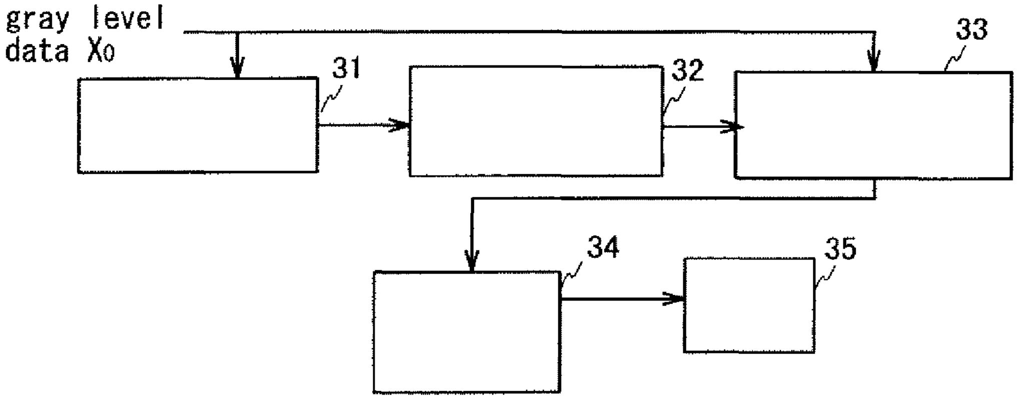

Next, a display device and its operation in this embodiment will be described with reference to FIGS. 2A and 2B. FIG. 2A is a flowchart illustrating operations of the display device in this embodiment. FIG. 2B illustrates an example of a structure of the display device performing operations such as those in FIG. 2A. Note that the flowchart and the structure example are not limited thereto, and a variety of flowcharts and structure examples can be used.

First, in an operation 21 in FIG. 2A, the image feature amount is detected from gray level data distribution of the gray level data $X_0$ of the inputted original image. In FIG. 2B, the operation 21 corresponds to the fact that an image feature amount detection portion 31 has a function of detecting the image feature amount from the gray level data distribution of the gray level data $X_0$ of the inputted original image.

Next, in an operation 22 in FIG. 2A, the scale factor K in Formula 1 or Formula 4 is determined in accordance with the detected image feature amount. In FIG. 2B, the operation 22 corresponds to the fact that a scale factor determination portion 32 has a function of determining the scale factor K in accordance with the image feature amount detected by the image feature amount detection portion 31. For example, when the average value of gray level (average gray level) is used as the image feature amount, the scale factor K can be reduced as an image to be displayed has higher average gray level and can be increased as an image to be displayed has lower average gray level. Specifically, for example, when a scale factor in the case where white is displayed in all the pixel in a screen (the case of all white display) is denoted by $K_W$ and a scale factor in the case where white is displayed in part of the pixels in the screen is denoted by $K_W'$, $K_W<K_W'$ can be given.

Then, in an operation 23 in FIG. 2A, the gray level data $X_0$ of the original image is converted into the gray level data $X_1$ of the first subimage and the gray level data $X_2$ of the second subimage in accordance with the determined scale factor K so that the gray level data $X_1$ and the gray level data $X_2$ have the relation shown in Formula 4. Thus, $X_1 \leqq X_2$ or $X_1 \geqq X_2$ holds with any gray level, for example. In FIG. 2B, the operation 23 corresponds to the fact that a gray level data conversion portion 33 has a function of converting the gray level data $X_0$ of the original image into the gray level data $X_1$ of the first subimage and the gray level data $X_2$ of the second subimage in accordance with the determined scale factor K so that the gray level data $X_1$ and the gray level data $X_2$ have the relation shown in Formula 4.

Next, in an operation 24 in FIG. 2A, the gray level data $X_1$ of the first subimage and the gray level data $X_2$ of the second subimage, which have been converted, are converted into signals appropriate for display. Here, the operation of converting data into signals appropriate for display includes an operation of converting gray level data which is digital data into an analog voltage (DA conversion), an operation of correcting the gray level data or the analog voltage in accordance with characteristics of a display element (gamma correction), an operation of inverting the polarity of the analog voltage (polarity inversion), and the like. By performing such conversion operations in accordance with characteristics of the display element as appropriate, display in the display device in this embodiment can be realized. Specifically, for example, when a liquid crystal element is used as the display element, the operation 24 can be an operation of performing gamma correction and polarity inversion at the same time as DA conversion. That is, when the liquid crystal element is controlled by the analog voltage, DA conversion is performed. When an output of the DA conversion is subjected to gamma correction and polarity inversion, a structure of the display device can be simplified, whereby manufacturing costs and power consumption can be reduced. Note that the operations in the display device are not limited thereto, and a variety of operations can be performed. For example, it is possible to perform gamma correction on gray level data before DA conversion and perform DA conversion and polarity inversion in accordance with the gray level data on which gamma correction has been performed. Moreover, when the display element is controlled by a digital voltage, DA conversion can be omitted. When the display element is not driven by alternating-current driving, polarity inversion can be omitted. Further, when it is not necessary to correct gray level data or an analog voltage in accordance with characteristics of the display element, gamma correction can be omitted.

In FIG. 2B, the operation 24 corresponds to the fact that a display control portion 34 has a function of converting the gray level data which has been converted by the gray level data conversion portion 33, into a signal appropriate for display; and a function of generating a display control signal for controlling a display portion 35 as appropriate and transmitting the signals to the display portion 35. Note that the operation 24 can be omitted in some cases. When the operation 24 is omitted, the display control portion 34 can also be omitted.

Then, in an operation 25 in FIG. 2A, the first subimage and the second subimage are displayed on the display portion 35. Here, when integrated luminance $L_W$ in the case where the scale factor K is $K_W$ and integrated luminance $L_W'$ in the case where the scale factor K is $K_W'$ are compared to each other, $L_W<L_W'$ can be given. Further, at this time, the integrated luminance $L_1$ with an integration range of the first subframe period and integrated luminance $L_2$ with an integration range of the second subframe period can satisfy $L_1 \leqq L_2$ or $L_1 \geqq L_2$ with any gray level. In FIG. 2B, the operation 25 corresponds to the fact that the display portion 35 has a function of displaying the first subimage and the second subimage in accordance with the gray level signal and the display control signal which are transmitted from the display control portion 34.

That is, a display device in this embodiment performs the following operations: detecting the image feature amount in accordance with inputted gray level data, determining the scale factor K in accordance with the detected image feature amount, converting the inputted gray level data into the gray level data of the first subimage and the gray level data of the second subimage in accordance with the scale factor K, and displaying the first subimage and the second subimage in accordance with the gray level data of the first subimage and the gray level data of the second subimage which have been converted. Further, a display device in this embodiment includes the image feature amount detection portion 31 which has a function of detecting the gray level data distribution of the gray level data of the inputted original image; the scale factor determination portion 32 which has a function of determining the scale factor K in accordance with the gray level data distribution detected by the image feature amount detection portion 31; the gray level data conversion portion 33 which has a function of converting the gray level data of the original image into the gray level data of the first subimage and the gray level data of the second subimage in accordance with the scale factor K determined by the scale factor determination portion 32; and the display portion 35 which has a function of displaying the first subimage and the second subimage.

Embodiment 2

As Embodiment 2, another structure example and a driving method of a display device will be described. In this embodiment, an example of a specific method for determining the scale factor K, and specific structure examples and operations of the image feature amount detection portion 31 and the scale factor determination portion 32 in FIG. 2B will be described.

A display device in this embodiment performs operations detailed more than or different from the operation 21 (detection of the image feature amount) and the operation 22 (determination of the scale factor K) among the operations (FIG. 2A) of the display device in Embodiment 1. The other operations and structures are similar to those in the display device in Embodiment 1; therefore, the detail description is not repeated.

Figure 5A:
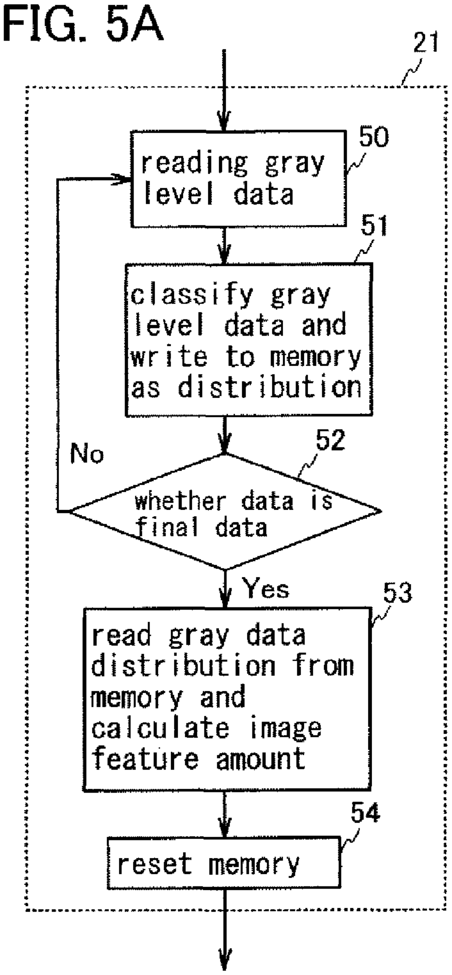
FIGS. 5A to 5C illustrate examples of operations of a semiconductor device.
Figure 5B:
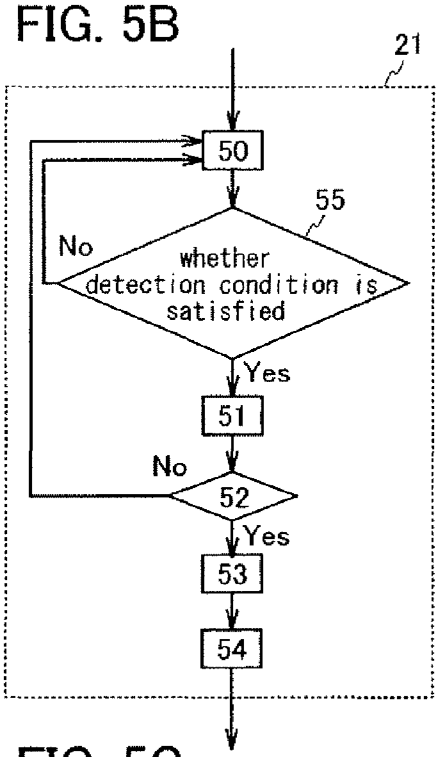
Figure 5C:
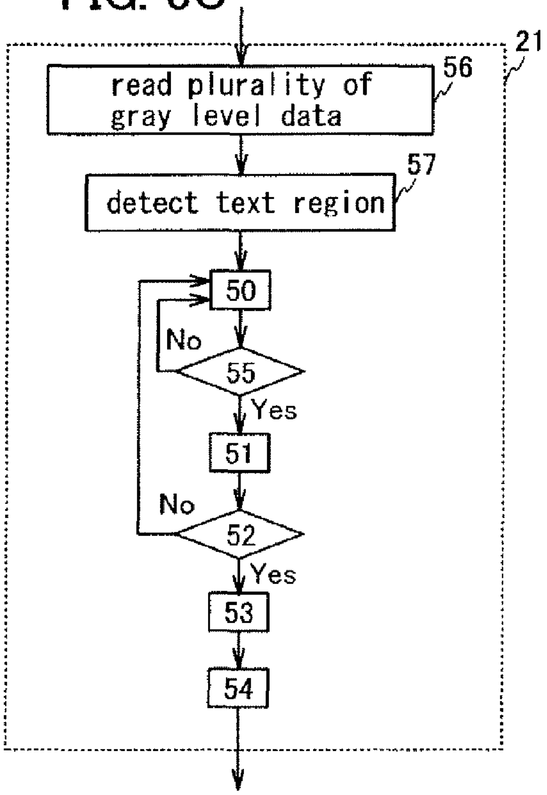
Figure 6A:
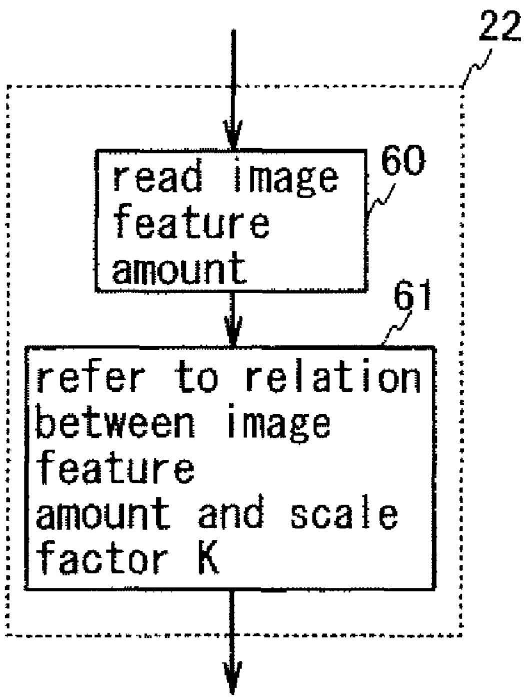
FIGS. 6A and 6B illustrate examples of operations of a semiconductor device.
Figure 6B:
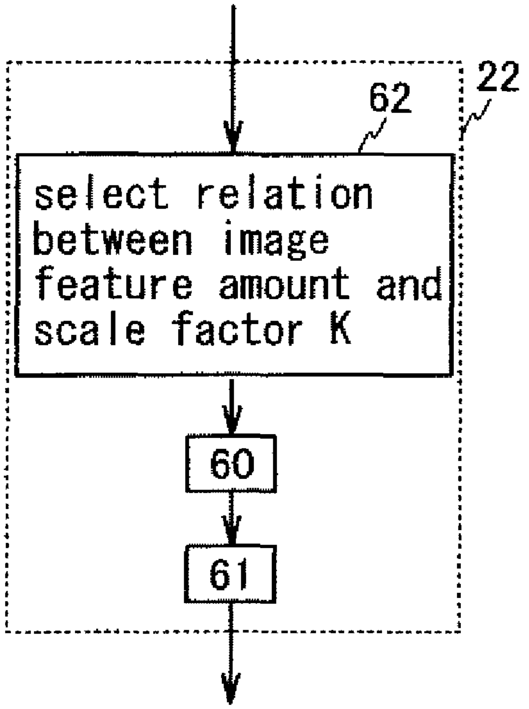

First, the operation flow of the display device in this embodiment and means to perform such operations will be described. FIGS. 5A to 5C are flowcharts each illustrating a detailed example of the operation 21 in FIG. 2A. FIGS. 6A and 6B are flowcharts each illustrating a detailed example of the operation 22 in FIG. 2A. FIGS. 7A to 7D each illustrate an example of a structure of a device for realizing the operations illustrated in FIGS. 6A and 6B.

In the detailed example (FIG. 5A) of the operation 21, an operation 50 is an operation of reading gray level data. Reading of gray level data in the operation 50 is reading of gray level data corresponding to one pixel. Note that the operation 50 is not limited thereto and may be reading of gray level data corresponding to a plurality of pixels. After the operation 50, the process moves on to an operation 51.

In the operation 51, the gray level data read in the operation 50 is classified and written to a memory as gray level data distribution. Note that the memory used for writing the gray level data distribution in the operation 51 is a memory 71 illustrated in FIG. 7A. However, this embodiment is not limited thereto, and a memory in another portion (a portion that is not directly related to the operation 21) in the display device may be used. After the operation 51, the process moves on to an operation 52.

In the operation 52, whether the gray level data classified in the operation 51 is the final data of a plurality of data forming one screen is determined. When the gray level data is not the final data, the process returns to the operation 50, and the next gray level data is read. When the gray level data is the final data, the process moves on to an operation 53.

Figure 7A:
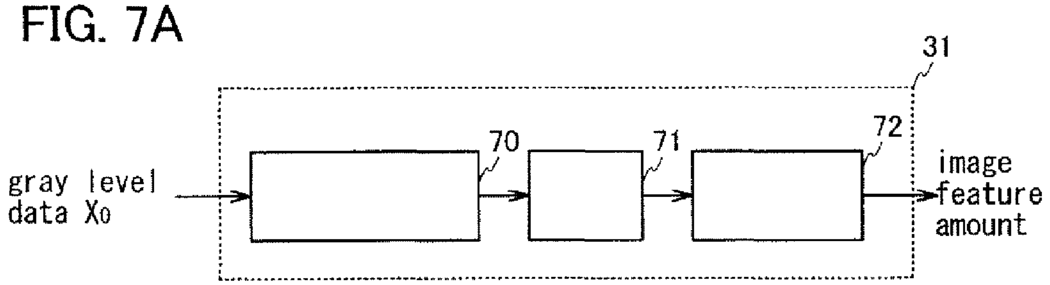
FIGS. 7A to 7D illustrate examples of structures of a semiconductor device.

In the operation 53, the gray level data distribution for one screen is read from the memory illustrated in FIG. 7A, and calculation of the image feature amount is performed. After the operation 53, the process moves on to an operation 54.

In the operation 54, the content of the memory 71 illustrated in FIG. 7A is reset after calculation of the image feature amount is finished in the operation 53. Note that reset in the operation 54 is processing that is performed on the gray level data distribution of the image so that gray level data distribution of the next image can be generated. For example, processing in which the number of data in all categories in the gray level data distribution of the image is 0 can be used.

That is, a display device in this embodiment performs the operations described in Embodiment 1. Among the operations, the operation of detecting the image feature amount includes the following operations: reading gray level data, classifying the gray level data to be written to a memory as gray level data distribution, determining whether the data is the final data of the gray level data for one screen, and reading the gray level data distribution and calculating the image feature amount. Note that in the detailed example illustrated in FIG. 5A, each operation can be omitted or exchanged as necessary. For example, the operation 54 of resetting the content of the memory 71 can be omitted by writing over the stored content or the like.

Note that the operations 50 to 54 illustrated in FIG. 5A can be realized with a structure illustrated in FIG. 7A. FIG. 7A illustrates an example of a detailed structure of the image feature amount detection portion 31 in FIG. 2B. The operations 50 to 52 in FIG. 5A are realized by functions of a gray level data distribution generation portion 70 and the memory 71 in FIG. 7A. The gray level data distribution generation portion 70 can have a function of reading gray level data and classifying the gray level data to be written to the memory 71 as gray level data distribution. The operations 53 and 54 in FIG. 5A are realized by functions of an image feature amount calculation portion 72 in FIG. 7A. The image feature amount calculation portion 72 can have a function of reading the gray level data distribution from the memory 71 and calculating the image feature amount, and a function of resetting the memory 71.

That is, a display device in this embodiment is the display device described in Embodiment 1, and includes a gray level data distribution generation portion which has a function of reading gray level data and classifying the gray level data to be written to a memory as gray level data distribution; and an image feature amount calculation portion which has a function of reading the gray level data distribution from the memory and calculating the image feature amount, and a function of resetting the memory. Note that each portion and each function of the portions can be omitted or exchanged as necessary.

In another detailed example (FIG. 5B) of the operation 21, the same operations as those in FIG. 5A are denoted by the same reference numerals, and the description is not repeated. In operations illustrated in FIG. 5B, an operation 55 is added between the operations 50 and 51 among the operations illustrated in FIG. 5A. In the operation 55, whether the gray level data read in the operation 50 satisfies a predetermined detection condition is determined. When the operation 55 determines that the gray level data satisfies a predetermined detection condition, the process moves on to the operation 51, and an operation similar to that illustrated in FIG. 5A is performed. On the other hand, when the operation 55 determines that the gray level data does not satisfy a predetermined detection condition, the process moves on to the operation 50, and reading of the next gray level data is performed. In such a manner, the gray level data is not subjected to the operation illustrated in FIG. 5A and thus can be excluded from gray level data distribution.

Figure 3A:
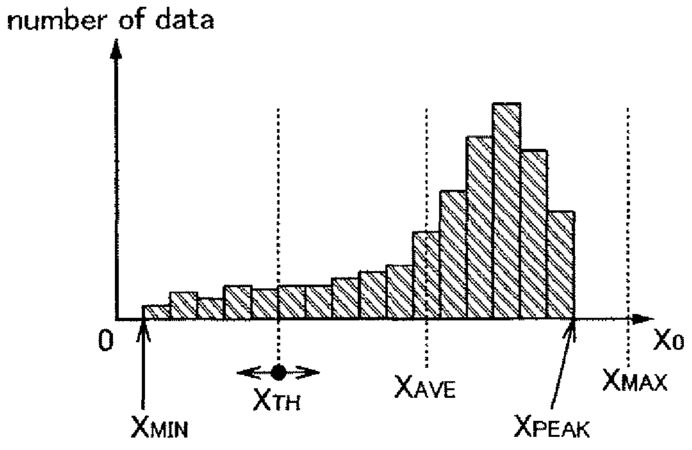
FIGS. 3A to 3D illustrate examples of operations of a semiconductor device.
Figure 3B:
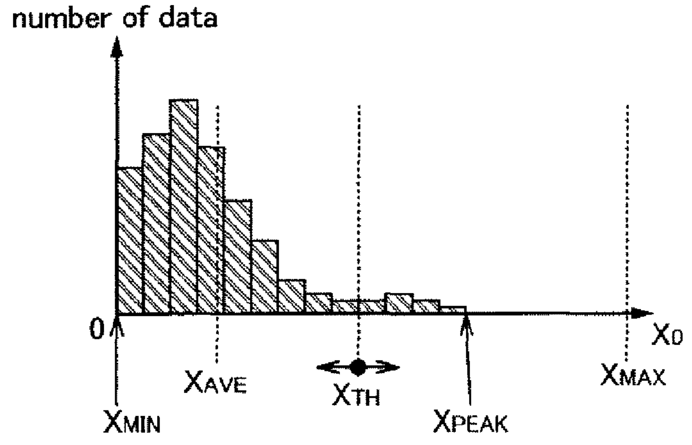
Figure 3C:
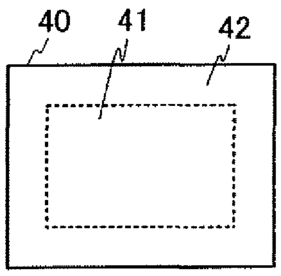

That is, a display device in this embodiment performs the operations described in Embodiment 1. Among the operations, the operation of detecting the image feature amount includes the following operations: reading gray level data, determining whether the gray level data satisfies a predetermined detection condition, classifying the gray level data to be written to a memory as gray level data distribution, determining whether the data is the final data of the gray level data for one screen, and reading the gray level data distribution and calculating the image feature amount. Note that as the predetermined detection condition, the position of the gray level data in the screen can be used. In such a manner, a method in which an outer edge portion of the screen is excluded from the detection target can be realized as illustrated in FIG. 3C. Note that in the detailed example illustrated in FIG. 5B, each operation can be omitted or exchanged as necessary.

Like the operations in FIG. 5A, the operations 50 to 55 illustrated in FIG. 5B can be realized with the structure illustrated in FIG. 7A. Note that when the operations in FIG. 5B are realized with the structure as illustrated in FIG. 7A, a function of determining whether the gray level data satisfies a predetermined detection condition is added to the gray level data distribution generation portion 70 in FIG. 7A. That is, a display device in this embodiment is the display device described in Embodiment 1, and includes a gray level data distribution generation portion which has a function of reading gray level data and, if the gray level data satisfies a predetermined detection function, classifying the gray level data to be written to a memory as gray level data distribution; and an image feature amount calculation portion which has a function of reading the gray level data distribution from the memory and calculating the image feature amount, and a function of resetting the memory. Note that each portion and each function of the portions can be omitted or exchanged as necessary.

In another detailed example (FIG. 5C) of the operation 21, the same operations as those in FIG. 5A or FIG. 5B are denoted by the same reference numerals, and the description is not repeated. In operations illustrated in FIG. 5C, operations 56 and 57 are added before the operation 50 among the operations illustrated in FIG. 5B. In the operation 56, a plurality (the number with which a text region can be detected) of gray level data are read to a memory. After the operation 56, the process moves on to the operation 57. In the operation 57, a text region in the screen is detected from the plurality of gray level data read in the operation 56, and information on the detected text region (e.g., the position, size, or shape of the text region) is written to the memory. After the operation 57, the process returns to the operation 50.

Figure 3D:
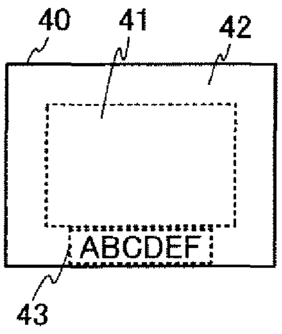

That is, a display device in this embodiment performs the operations described in Embodiment 1. Among the operations, the operation of detecting the image feature amount includes the following operations: reading a plurality (the number with which a text region can be detected) of gray level data to a memory, detecting a text region in a screen, reading gray level data, determining whether the gray level data satisfies a predetermined detection condition, classifying the gray level data to be written to a memory as gray level data distribution, determining whether the data is the final data of the gray level data for one screen, and reading the gray level data distribution and calculating the image feature amount. Note that as the predetermined detection condition in the operation 55, the position of the gray level data in the screen and/or information on the text region detected in the operation 57 can be used. In such a manner, a method can be realized as illustrated in FIG. 3D, in which characters are detected from the shape of a high gray level region included in the image and the text region is excluded from the detection target. Note that in the detailed example illustrated in FIG. 5C, each operation can be omitted or exchanged as necessary.

Note that the operations illustrated in FIG. 5C can be changed as long as a text region in one screen can be detected and information on the text region can be obtained; therefore, the operations 56 and 57 can be a variety of operations. For example, in the operation 56, gray level data for one screen can be read into a memory. In such a manner, the text region can be accurately detected, whereby the image quality can be improved. Alternatively, the gray level data for part of the screen may be read into the memory instead of the gray level data for one screen. Note that the part of the screen is preferably a portion where a text region is likely to be detected (e.g., an outer edge portion 42 in FIGS. 3C and 3D). Accordingly, the capacity of the memory needed and the number of processings can be reduced, whereby manufacturing costs and power consumption can be reduced. Alternatively, in the operation 56, instead of being read at one time, the gray level data for one screen may be divided into a plurality of pieces so that the pieces of the data are sequentially read. Accordingly, the capacity of the memory needed can be reduced, whereby manufacturing costs and power consumption can be reduced.

Figure 7B:
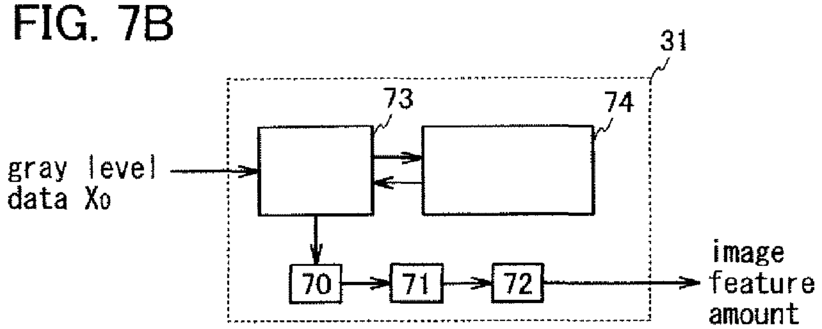

Note that the operations 50 to 57 illustrated in FIG. 5C can be realized with a structure illustrated in FIG. 7B. In FIG. 7B, the same functions as those in FIG. 7A are denoted by the same reference numerals, and the description is not repeated. FIG. 7B illustrates an example of a detailed structure of the image feature amount detection portion 31 in FIG. 2B. The operation 56 in FIG. 5C can be realized by a function of a memory 73 in FIG. 7B. The memory 73 can have a function of reading a plurality of gray level data. The operation 57 in FIG. 5C is realized by a function of a text region detection portion 74 in FIG. 7B. The text region detection portion 74 can have a function of reading a plurality of gray level data from the memory 73, detecting a text region in a screen, and writing information on the detected text region to the memory.

That is, a display device in this embodiment is the display device described in Embodiment 1, and includes a memory which has a function of reading a plurality of gray level data; a text region detection portion which has a function of detecting a text region in a screen from the plurality of gray level data, and writing information on the detected text region to the memory; a gray level data distribution generation portion which has a function of reading the gray level data and classifying the gray level data to be written to a memory as gray level data distribution; and an image feature amount calculation portion which has a function of reading the gray level data distribution from the memory and calculating the image feature amount, and a function of resetting the memory. Note that each portion and each function of the portions can be omitted or exchanged as necessary.

Note that a display device in this embodiment can realize at least two operations illustrated in FIGS. 5A to 5C, and performs an operation for switching the operations illustrated in FIGS. 5A to 5C depending on conditions. Accordingly, a display device that can perform the most appropriate operation under a variety of conditions can be obtained.

In the detailed example (FIG. 6A) of the operation 22, an operation 60 is an operation of reading the image feature amount obtained by the operation 21. Reading of the image feature amount in the operation 60 is performed once for processing for one screen. Note that this embodiment is not limited thereto, and reading of the image feature amount may be performed once for processing for a plurality of screens or may be performed plural times for processing for one screen. After the operation 60, the process moves on to an operation 61. In the operation 61, the scale factor K is calculated from the image feature amount which is read in the operation 60 with reference to a predetermined relation between the image feature amount and the scale factor K.

Figure 7C:
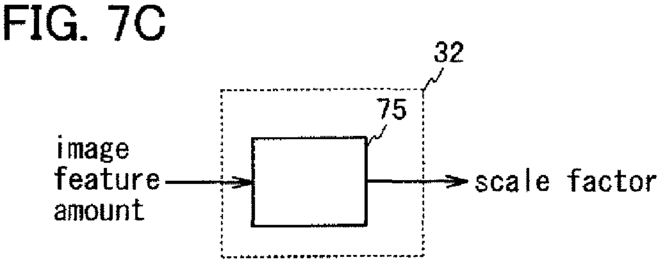

Note that the operations 60 and 61 illustrated in FIG. 6A can be realized with a structure illustrated in FIG. 7C. FIG. 7C illustrates an example of a detailed structure of the scale factor determination portion 32 in FIG. 2B. The operations 60 and 61 in FIG. 6A are realized by a function of a scale factor calculation portion 75 in FIG. 7C. The scale factor calculation portion 75 can have a function of reading the image feature amount and calculating the scale factor K with reference to a predetermined relation between the image feature amount and the scale factor K. That is, a display device in this embodiment is the display device described in Embodiment 1, and includes a scale factor calculation portion having a function of reading the image feature amount and calculating the scale factor K with reference to a predetermined relation between the image feature amount and the scale factor K.

Figure 4A:
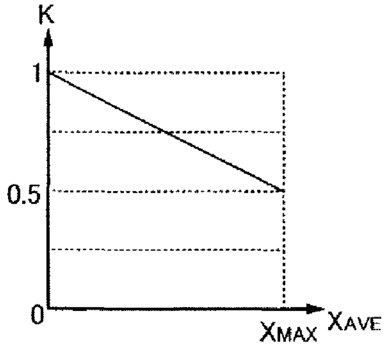
FIGS. 4A to 4F illustrate examples of operations of a semiconductor device.
Figure 4D:
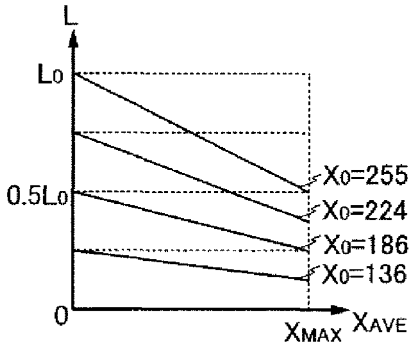
Figure 4B:
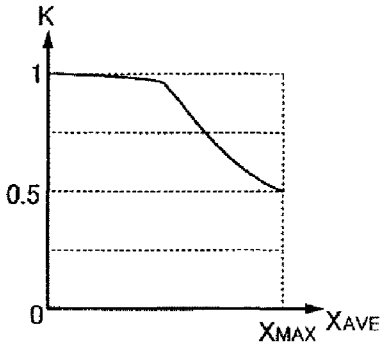
Figure 4E:
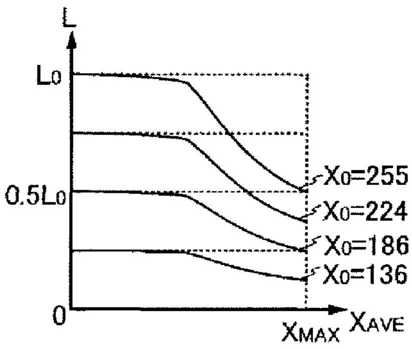
Figure 4C:
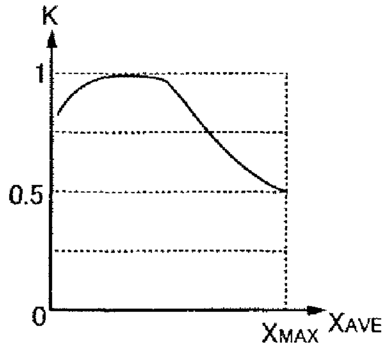

Note that as a predetermined relation between the image feature amount and the scale factor K, relations illustrated in FIGS. 4A to 4C can be used, for example. Specifically, a lookup table (LUT) or a logic circuit can be used. For example, when the relation between the image feature amount and the scale factor K is simple, for example, is monotonously increased and can be analytically obtained by an approximate formula or the like, a logic circuit is preferably used for the scale factor calculation portion 75 illustrated in FIG. 7C. This is because a memory required in the case of using a LUT is not needed, and thus manufacturing costs can be reduced. On the other hand, when it is difficult to analytically obtain the relation between the image feature amount and the scale factor K by an approximate formula or the like, a LUT is preferably used for the scale factor calculation portion 75. This is because an error can be smaller and the appropriate scale factor K can be calculated. That is, a display device in this embodiment performs the operations described in Embodiment 1. Among the operations, the operation of determining the scale factor K includes an operation of reading the image feature amount, and an operation of calculating the scale factor K with reference to a predetermined relation between the image feature amount and the scale factor K.

In another detailed example (FIG. 6B) of the operation 22, the same operations as those in FIG. 6A are denoted by the same reference numerals, and the description is not repeated. In operations illustrated in FIG. 6B, an operation 62 is added before the operation 60. The operation 62 is an operation of selecting the relation between the image feature amount and the scale factor K to be used in the case where there are a plurality of predetermined relations between the image feature amount and the scale factor K. After the operation 62, the process moves on to the operation 60. That is, a display device in this embodiment performs the operations described in Embodiment 1. Among the operations, the operation of determining the scale factor K includes an operation of reading the image feature amount, and an operation of calculating the scale factor K with reference to a selected relation between the image feature amount and the scale factor K. Note that the relation between the image feature amount and the scale factor K can be selected based on an operation mode, user setting, or the like of the display device. Accordingly, a display device that can perform the most appropriate operation under a variety of conditions can be obtained.

Figure 7D:
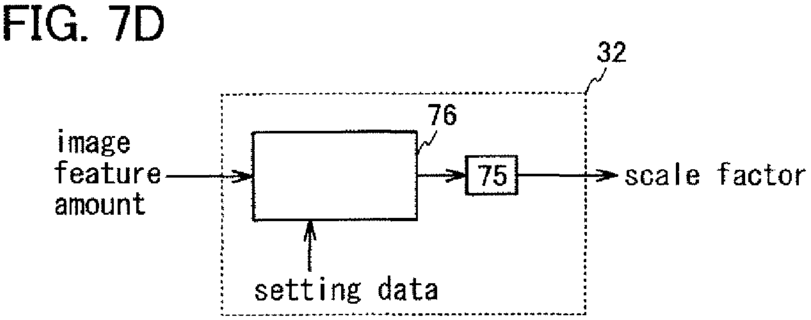

Note that the operations 60 to 62 illustrated in FIG. 6B can be realized with a structure illustrated in FIG. 7D. In FIG. 7D, the same function as that in FIG. 7C is denoted by the same reference numeral, and the description is not repeated. FIG. 7D illustrates an example of a detailed structure of the scale factor determination portion 32 in FIG. 2B. The operation 62 in FIG. 6B is realized by a function of an image feature amount setting portion 76 in FIG. 7D. The image feature amount setting portion 76 can have a function of selecting the relation between the image feature amount and the scale factor K to be used in the case where there are a plurality of predetermined relations between the image feature amount and the scale factor K. That is, a display device in this embodiment is the display device described in Embodiment 1, and includes an image feature amount setting portion which has a function of selecting the relation between the image feature amount and the scale factor K to be used; and a scale factor calculation portion which has a function of reading the image feature amount and calculating the scale factor K with reference to a predetermined relation between the image feature amount and the scale factor K.

Next, specific examples of each operation will be described. As a method of detecting gray level data distribution, a method can be used, for example, in which the gray level data $X_0$ of the inputted original image is classified in accordance with the level of the gray level data and the number of data of the gray level data $X_0$ included in each category is counted. FIGS. 3A and 3B illustrate examples of gray level data distribution that are thus founded by the counting.

FIGS. 3A and 3B each illustrate the gray level data distribution with the horizontal axis representing the level of the gray level data $X_0$ of the original image and the vertical axis representing the number of data. Note that as for categories of the level of the gray level data $X_0$ of the original image, each gray level can be classified into one category. In this case, the gray level data distribution can be accurately represented. Alternatively, as for categories of the level of the gray level data $X_0$ of the original image, a plurality of gray levels can be classified into one category. In that case, a load of detection and calculation of the gray level data distribution can be reduced, so that a display device with reduced power consumption and manufacturing costs can be obtained.

Then, the image feature amount is calculated from the detected gray level data distribution. For calculation of the image feature amount, the average gray level $X_{AVE}$, the peak gray level $X_{PEAK}$, the minimum gray level $X_{MIN}$, the number of low gray level data, the number of high gray level data, or the like can be used. Note that the average gray level $X_{AVE}$ is the average value of gray level and can be a value obtained by dividing the total level of the gray level data $X_0$ of the original image by the number of all the data. The peak gray level $X_{PEAK}$ is a level of gray level data having the maximum level in one image, and is sometimes different from $X_{MAX}$ which is the maximum possible. The minimum gray level $X_{MIN}$ is a level of gray level data having the minimum level in one image. With reference to a given threshold gray level $X_{TH}$, the number of low gray level data is the number of gray level data whose level is lower than the threshold gray level $X_{TH}$, and the number of high gray level data is the number of gray level data whose level is higher than the threshold gray level $X_{TH}$. Note that the value representing the image feature amount is not limited thereto, and a variety of values can be used. In particular, by using a combination of a plurality of values among the average gray level $X_{AVE}$, the peak gray level $X_{PEAK}$, the minimum gray level $X_{MIN}$, the number of low gray level data, and the number of high gray level data, the image feature amount can be more precisely represented. Accordingly, the scale factor K can be determined more appropriately, and a display device by which the objects can be achieved more effectively can be obtained.

A distribution state is different in the gray level data distribution example illustrated in FIG. 3A and the gray level data distribution example illustrated in FIG. 3B. FIG. 3A illustrates an example in which gray level data is generally biased to the higher gray level side. FIG. 3B illustrates an example in which gray level data is generally biased to the lower gray level side. The image feature amount can vary depending on such difference of distribution.

When the average gray level $X_{AVE}$ is used as the image feature amount, the scale factor K can be determined as illustrated in FIGS. 4A to 4C, for example. FIGS. 4A to 4C each illustrate an example of a value of the scale factor K with respect to the average gray level $X_{AVE}$, with the horizontal axis representing the average gray level $X_{AVE}$ and the vertical axis representing the scale factor K. Moreover, FIGS. 4D to 4F each illustrate change in integrated luminance L with respect to the average gray level $X_{AVE}$ in accordance with the gray level data $X_0$ of various original images, with the horizontal axis representing the average gray level $X_{AVE}$ and the vertical axis representing the integrated luminance L.

As illustrated in FIG. 4A, the scale factor K can be monotonously increased as the average gray level $X_{AVE}$ is decreased. Accordingly, luminance is modulated even in an image with small average gray level $X_{AVE}$, in other words, an image in which a high gray level region is considerably small; thus, the capability of expressing an image with high peak gray level, such as an image of night view, sparks, and luster of metal, can be greatly improved. When the scale factor K is determined as illustrated in FIG. 4A, the integrated luminance L with respect to the average gray level $X_{AVE}$ is monotonously increased in all the gray levels as the average gray level $X_{AVE}$ is decreased. FIG. 4D illustrates, as an example, change in integrated luminance L with respect to the average gray level $X_{AVE}$ in the case where the level of the gray level data $X_0$ of the original image is 255, 224, 186, and 136. In such a manner, the capability of expressing an image with high peak gray level, such as an image of night view, sparks, and luster of metal, can be greatly improved.

Alternatively, as illustrated in FIG. 4B, the scale factor K is monotonously increased as the average gray level $X_{AVE}$ is decreased, and moreover, increase of the scale factor K can be stopped (saturated) at the time when the average gray level $X_{AVE}$ reaches a certain value. Accordingly, display can be performed with higher quality, and a defect of image blink due to rapid change of the average gray level $X_{AVE}$ can be suppressed. In the case where a portion that is not related to the image quality, such as subtitles for movies, repeatedly appears and disappears in an image to be displayed, if the scale factor K is set to be rapidly changed in the range where the average gray level $X_{AVE}$ is low, the scale factor K is affected by display of such a portion, such as subtitles, and image blink occurs regardless of the original image in some cases. Such a phenomenon can be suppressed by determining the scale factor K as in the graph in FIG. 4B.

Note that the value of the average gray level $X_{AVE}$ when increase of the scale factor K is saturated can be set to a variety of values and is preferably approximately ⅓ of the maximum level $X_{MAX}$ of the gray level data. Accordingly, the effect of displaying images with higher quality and the effect of suppressing image blink can both be achieved. When the scale factor K is determined as illustrated in FIG. 4B, the integrated luminance L with respect to the average gray level $X_{AVE}$ is monotonously increased in all the gray levels as the average gray level $X_{AVE}$, is decreased, and moreover, increase of the scale factor K is saturated at the time when the average gray level $X_{AVE}$ reaches a certain value. FIG. 4E illustrates, as an example, change in integrated luminance L with respect to the average gray level $X_{AVE}$ in the case where the level of the gray level data $X_0$ of the original image is 255, 224, 186, and 136. In such a manner, the effect of displaying images with higher quality and the effect of suppressing image blink can both be achieved.

Alternatively, as illustrated in FIG. 4C, the scale factor K is monotonously increased as the average gray level $X_{AVE}$ is decreased, and moreover, increase of the scale factor K can be saturated at the time when the average gray level $X_{AVE}$ reaches a certain value, and in the case where the average gray level $X_{AVE}$ is decreased, the scale factor K can be decreased along with decrease of the average gray level $X_{AVE}$. Accordingly, unnecessary increase of the scale factor K can be suppressed while the advantages described in FIG. 4B are obtained.

This is because in the range where the average gray level $X_{AVE}$, is extremely low, the human eye does not easily recognize the effect of a large scale factor K, and thus display can sometimes be performed with sufficiently high image quality without increasing the scale factor K very much. Therefore, in the range where the average gray level $X_{AVE}$ is extremely low, the scale factor K is decreased as the average gray level $X_{AVE}$ is decreased, whereby the scale factor K can be smaller. When the scale factor K is smaller, the integrated luminance can be lower accordingly. In such a manner, in the display device in Embodiment 1, for example, the gray level of one of the first subimage and the second subimage can be lower, and thus, display can be closer to impulse-type display. Accordingly, afterimages of moving images or the like can be reduced, and the quality of moving images can be improved.

Note that the level of the average gray level $X_{AVE}$ at the time when the scale factor K starts to decrease along with decrease of the average gray level $X_{AVE}$ can be set to a variety of levels. For example, the level can be approximately half the level of the average gray level $X_{AVE}$ when increase of the scale factor K is saturated. In this case, the advantage of saturating increase of the scale factor K and the advantage of a small scale factor K can both be achieved. Alternatively, the scale factor K can be decreased at the same time as saturation of the increase of the scale factor K. In this case, the advantage of a small scale factor K can be more significant. When the scale factor K is determined as illustrated in FIG. 4C, the integrated luminance L with respect to the average gray level $X_{AVE}$ is monotonously increased in all the gray levels as the average gray level $X_{AVE}$ is decreased, and moreover, increase of the scale factor K is saturated at the time when the average gray level $X_{AVE}$ reaches a certain value, and in the case where the average gray level $X_{AVE}$ is decreased, the scale factor K is decreased along with decrease in the average gray level $X_{AVE}$.

Figure 4F:
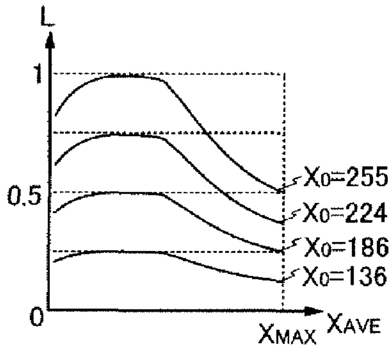

FIG. 4F illustrates, as an example, change in integrated luminance L with respect to the average gray level $X_{AVE}$ in the case where the level of the gray level data $X_0$ of the original image is 255, 224, 186, and 136. In such a manner, the effect of displaying images with higher quality and the effect of suppressing image blink can both be achieved. Further, the effect of a small scale factor K, such as reduction in afterimages of moving images or the like, can also be obtained.

Note that the case where the average gray level $X_{AVE}$ is used as the image feature amount has been described so far. Alternatively, the number of low gray level data or the number of high gray level data can be used instead of the average gray level $X_{AVE}$. That is, in the methods of determining the scale factor K illustrated in FIGS. 4A to 4C, K is determined based on whether an image is generally bright or generally dark. Therefore, methods similar to the methods of determining the scale factor K illustrated in FIGS. 4A to 4C can be used for the number of low gray level data or the number of high gray level data.

In the case of using the number of high gray level data, an image is generally bright as the number of high gray level data is larger; thus, the method can be performed only by replacing the average gray level $X_{AVE}$ with the number of high gray level data. In the case of using the number of low gray level data, an image is generally dark as the number of low gray level data is larger; thus, the method can be performed by reversing the change in integrated luminance L with respect to the average gray level $X_{AVE}$ and replacing the average gray level $X_{AVE}$ with the number of low gray level data.

Note that a combination of the average gray level $X_{AVE}$, the number of low gray level data, or the number of high gray level data; and the peak gray level $X_{PEAK}$ or the minimum gray level $X_{MIN}$ can be the image feature amount. That is, whether the image is generally bright or generally dark can be determined by the average gray level $X_{AVE}$, the number of low gray level data, or the number of high gray level data, and more detailed characteristics of the image can be determined using the peak gray level $X_{PEAK}$ or the minimum gray level $X_{MIN}$ of the image.

For example, when the image which is generally dark and has high peak gray level $X_{PEAK}$ can be determined as an image whose image quality is significantly improved by increasing the scale factor K, the scale factor K can be determined more appropriately. Further, the range of the level of gray level data included in the image can be found with the peak gray level $X_{PEAK}$ and the minimum gray level $X_{MIN}$, so that a driving method appropriate for the display within the range can be selected. For example, when the range is smaller than a range between the gray level 0 and the maximum gray level $X_{MAX}$ the gray level data $X_0$ of the original image is extended by linear interpolation or the like, whereby a region where the gray level is gradually changed can be smoothly expressed, and the image quality can be improved. In addition, when the high peak gray level $X_{PEAK}$ is lower than the maximum gray level $X_{MAX}$ in a liquid crystal display device, the gray level data $X_0$ of the original image is converted in accordance with instantaneous luminance of a backlight while the instantaneous luminance of the backlight is reduced, whereby power consumption can be reduced.

Next, a method of limiting a detection range of gray level data distribution in order to detect the image feature amount more appropriately will be described. Subtitles for movies and television programs are often not related to the image feature amount. If a portion with subtitles is included in the detection range of gray level data distribution, the portion might be a cause of false detection of the image feature amount. Therefore, by detecting subtitles which are not related to an image in advance and excluding the subtitle portion from the detection target of the image feature amount, the image can be displayed with higher quality while a defect of screen blink is more effectively suppressed. As described above, examples of a method for excluding a subtitle portion from the detection target of the image feature amount are a method in which an outer edge portion of a screen is excluded from the detection target; and a method in which characters are detected from the shape of a high gray level region included in the image and the text region is excluded from the detection target.

The case where an outer edge portion of a screen is excluded from the detection target will be described with reference to FIG. 3C. In FIG. 3C, a center portion 41 in a display region 40 is a detection region and the outer edge portion 42 is a non-detection region. Subtitles are not usually displayed near the center of the screen and are almost displayed on the outer edge portion of the screen. Therefore, only the center portion 41 is subjected to detection of the image feature amount. On the other hand, it is highly likely that subtitles are displayed on the outer edge portion 42; thus, the outer edge portion 42 corresponds to a non-detection region. Accordingly, a high gray level region which is not related to the image is not used for luminance modulation of a perceptual image, whereby a defect of screen blink can be suppressed.

Note that a boundary between the center portion 41 and the outer edge portion 42 is not usually displayed; however, it is possible to make the boundary displayed. Accordingly, a user can specify the size and shape of a portion defined by the boundary. Further, although the portion defined by the boundary is preferably rectangular, it is not limited thereto and can be a variety of shapes.

The case where characters are detected from the shape of a high gray level region included in the image and the text region is excluded from the detection target will be described with reference to FIG. 3D. In FIG. 3D, when a high gray level region is detected in the display region 40 and is further found by the shape, color, luminance difference with a background, motion, or the like to be a region including subtitles, the region serves as a non-detection region 43. Accordingly, a high gray level region which is not related to the image is not used to determine the scale factor K, whereby a defect of screen blink can be suppressed.

Note that in that case, in order to prevent a text region (e.g., characters on a signboard) included in the original image from being determined as the non-detection region 43, it is effective to combine the method in FIG. 3D with a method of excluding an outer edge portion of a screen as illustrated in FIG. 3C. That is, the entire display region 40 serves as a detection region in an image where a text region is not detected; whereas in an image where a text region is detected, the text region is included in the detection target when located in the center portion 41, and the text region is excluded from the detection target when located in the outer edge portion 42. In such a manner, detection accuracy can be improved as compared to the case of using only one of the methods.

Note that the area of the detection region preferably accounts for ½ or more of the area of the entire screen. Accordingly, the image can be displayed with higher quality while a defect of screen blink is more effectively suppressed.

It is effective to combine a method where subtitles which are not related to an image are detected in advance and the subtitle portion is excluded from the detection target of the image feature amount and the methods of determining the scale factor K illustrated in FIGS. 4A to 4C. When the methods of determining the scale factor K illustrated in FIGS. 4A to 4C are combined with the method of excluding the subtitle portion from the detection target of the image feature amount, a defect of screen blink is more effectively suppressed while the image can be displayed with higher quality.

Note that in a display device in which a flicker is observed, screen blink due to rapid change of the scale factor K sometimes promotes a flicker. Accordingly, it is extremely effective to use the method of suppressing a defect of screen blink as described above in such a display device.

Embodiment 3

As Embodiment 3, another structure example and a driving method of a display device will be described. In this embodiment, an example of a specific method of determining gray level data conversion, and a specific structure example and a driving method of the gray level data conversion portion 33 in FIG. 2B will be described.

A display device in this embodiment performs an operation detailed more than or different from the operation 23 (gray level data conversion) among the operations (FIG. 2A) of the display device in Embodiment 1. The other operations and structures are similar to those in the display device in Embodiment 1; therefore, the detail description is not repeated.

Figure 8A:
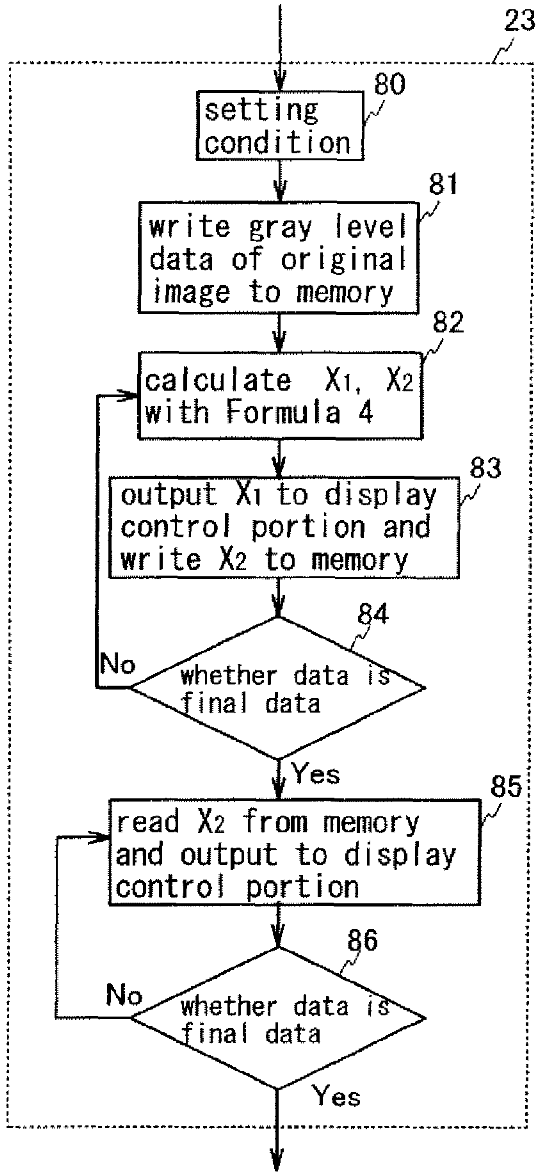
FIGS. 8A and 8B illustrate examples of operations and a structure of a semiconductor device.
Figure 8B:
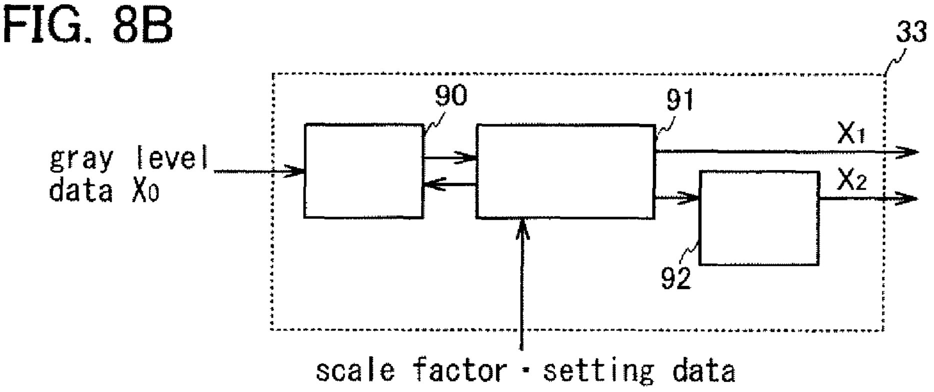

First, the operation flow of the display device in this embodiment and means to perform such operations will be described. FIG. 8A is a flowchart illustrating a detailed example of the operation 23 in FIG. 2A. FIG. 8B illustrates an example of a structure of a device for realizing the operations illustrated in FIG. 8A.

In the detailed example (FIG. 8A) of the operation 23, an operation 80 is an operation of setting a condition for converting gray level data. In the operation 80, a condition necessary to convert gray level data, such as a constant in Formula 4, is set. After the operation 80, the process moves on to an operation 81.

In the operation 81, the gray level data $X_0$ of the original image is written to a memory. The operation 81 is necessary because a cycle (one subframe period) for displaying an image in the display device in this embodiment is shorter than an input cycle (one frame period) for the image inputted from the outside of the display device. Note that the operation 80 and the operation 81 may be performed in reverse order. After the operation 81, the process moves on to an operation 82.

In the operation 82, the gray level data $X_0$ of the original image, which is written in the operation 81, is read at higher speed than the writing in the operation 81, and the gray level data $X_1$ of the first subimage and the gray level data $X_2$ of the second subimage are calculated in accordance with Formula 4 and the condition set by the operation 80. Note that the reading speed can be determined by the ratio of the length of one subframe period to that of one frame period. Specifically, for example, when the length of one subframe period is ½ of the length of one frame period, reading is preferably performed at double speed. Similarly, when the length of one subframe period is ¼ of the length of one frame period, reading is preferably performed at quadruple speed. After the operation 82, the process moves on to an operation 83.

In the operation 83, as for the gray level data $X_1$ of the first subimage and the gray level data $X_2$ of the second subimage, which are calculated in the operation 82, the gray level data $X_1$ of the first subimage is outputted to the display control portion 34 in FIG. 2B, and the gray level data $X_2$ of the second subimage is written to the memory. At this time, the first subimage can be displayed on the display portion 35 in FIG. 2B. Note that the operation 83 is necessary because the timing of displaying the first subimage and the timing of displaying the second subimage are different from each other. Therefore, the operation 83 can be replaced with another operation for making the timing of display different. Specifically, the gray level data $X_1$ of the first subimage may be written to the memory and the gray level data $X_2$ of the second subimage may be outputted to the display control portion 34, which is different from the operation 83. Alternatively, both the gray level data $X_1$ of the first subimage and the gray level data $X_2$ of the second subimage may be written to the memory. After the operation 83, the process moves on to an operation 84.

In the operation 84, whether the gray level data is the final data for one screen is determined. When the operation 84 determines that the gray level data is the final data for one screen, the process moves on to an operation 85. On the other hand, the operation 84 determines that the gray level data is not the final data for one screen, the process returns to the operation 82, and the next gray level data is calculated and outputted.

In the operation 85, after all the gray level data $X_1$ of the first subimage is outputted, the gray level data $X_2$ of the second subimage is read from the memory and outputted to the display control portion 34. At this time, the second subimage can be displayed on the display portion 35 in FIG. 2B. After the operation 85, the process moves on to an operation 86.

In the operation 86, whether the gray level data is the final data for one screen is determined. When the operation 86 determines that the gray level data is the final data for one screen, conversion and output of gray level data is finished. On the other hand, the operation 86 determines that the gray level data is not the final data for one screen, the process returns to the operation 85, and the next gray level data is outputted. Note that gray level data of the next image can be written by the operation 81 at the same time as the second subimage is displayed on the display portion 35 by the operations 85 and 86.

That is, a display device in this embodiment performs the operations described in Embodiment 1. Among the operations, the operation of converting gray level data includes the following operations: setting a condition for converting gray level data; writing gray level data of the original image to a memory; calculating gray level data of each subimage; outputting the gray level data of one subimage to a display control portion and writing the gray level data of the other subimage to the memory; determining whether the gray level data is the final data for one screen; reading the gray level data of the subimage, which is written to the memory, to be outputted to the display control portion; and determining whether the gray level data of the subimage is the final data for one screen.

Note that the operations 80 to 86 illustrated in FIG. 8A can be realized with a structure illustrated in FIG. 8B. The structure illustrated in FIG. 8B is a detailed example of the gray level data conversion portion 33. When a gray level data calculation portion 91 in FIG. 8B has a function of reading setting data from the outside, the operation 80 can be realized. Moreover, when the reading speed is higher than the writing speed in a memory 90, the operation 81 can be realized. Further, the operations 82 to 86 can be realized when the gray level data calculation portion 91 has a function of calculating the gray level data $X_1$ of the first subimage and the gray level data $X_2$ of the second subimage, and a function of writing the gray level data $X_2$ of the second subimage to a memory 92 while outputting the gray level data $X_1$ of the first subimage to a display control portion, and the memory 92 has a function of outputting the gray level data $X_2$ of the second subimage to the display control portion.

That is, a display device in this embodiment is the display device described in Embodiment 1, and includes the gray level data calculation portion 91 which has a function of reading setting data from the outside, a function of calculating the gray level data $X_1$ of the first subimage and the gray level data $X_2$ of the second subimage, and a function of writing the gray level data $X_2$ of the second subimage to the memory while outputting the gray level data $X_1$ of the first subimage to a display control portion; the memory 90 which has a function of reading faster than writing; and the memory 92 which has a function of outputting the gray level data $X_2$ of the second subimage to the display control portion.

Next, a specific example of a method where the gray level data $X_0$ of the original image is converted into the gray level data $X_1$ of the first subimage and the gray level data $X_2$ of the second subimage will be described. In a first conversion example, the instantaneous luminance is collected in the first subimage so that the second subimage is closer to black display, whereby the peak luminance and the quality of moving images are improved. In a second conversion example, the gray level data $X_1$ of the first subimage is the same as the gray level data $X_0$ of the original image, and only the gray level data $X_2$ of the second subimage is changed to improve the peak luminance and the quality of moving images. In a third conversion example, gamma correction is performed on the gray level data $X_1$ of the first subimage so that the instantaneous luminance is increased, whereby the peak luminance and the quality of moving images are improved. Note that in all the conversion examples, conversion methods of the first subimage and the second subimage are exchangeable.

The first conversion example will be described with reference to FIGS. 9A to 9F. A condition indicated by Formula 5 is set in the operation 80 illustrated in FIG. 8A, whereby the first conversion example can be realized.

$$X_1 = \mathrm{MIN}\left[\left(\frac{K}{n}\right)^{\frac{1}{\gamma}} \cdot X_0,\ X_{MAX}\right] \quad \text{[Formula 5]}$$

Here, MIN[A,B] indicates that a smaller value of A and B is selected. When the lengths of subframes are the same, that is, when n=½ in Formulae 4 and 5, Formula 6 is derived from Formulae 4 and 5.

$$X_1 = \mathrm{MIN}\left[(2K)^{\frac{1}{\gamma}} \cdot X_0,\ X_{MAX}\right]; \quad \text{[Formula 6]}$$
$$X_2 = \{2K \cdot X_0^{\gamma} - X_1^{\gamma}\}^{\frac{1}{\gamma}}$$

From Formula 6, the gray level data $X_1$ of the first subimage and the gray level data $X_2$ of the second subimage can be uniquely determined with respect to the gray level data $X_0$ of the original image. That is, a display device in this embodiment is a display device in which the sum of a value obtained by multiplying the gray level data $X_1$ of the first subimage raised to the power of gamma by the duty ratio of the first subframe period; and a value obtained by multiplying the gray level data $X_2$ of the second subimage raised to the power of gamma by the duty ratio of the second subframe period is proportional to the gray level data $X_0$ of the original image raised to the power of gamma. The gray level data $X_1$ of the first subimage is the smaller value of the maximum gray level $X_{MAX}$ of the gray level data and a value obtained by multiplying the gray level data $X_0$ of the original image by a coefficient $(K/n)^{1/\gamma}$. Note that the constant n is the duty ratio of the first subframe period in one frame period, and when the first subframe period and the second subframe period are equal in length, n=½ is given.

FIGS. 9A to 9C are graphs each illustrating the relation between $X_0$ and $X_1$ or $X_2$ in the case where the gray level data $X_0$ is converted in accordance with Formula 6, with the gray level data $X_0$ of the original image as the horizontal axis and the gray level data ($X_1$ or $X_2$) after conversion as the vertical axis. FIG. 9A illustrates the case where the scale factor K in Formula 6 is 0.5; FIG. 9B, 0.75; and FIG. 9C, 1. In FIGS. 9A to 9C, dashed lines represent the relation between $X_0$ and $X_1$, and dotted lines represent the relation between $X_0$ and $X_2$.

That is, a display device in this embodiment is a display device in which the sum of a value obtained by multiplying the gray level data $X_1$ of the first subimage raised to the power of gamma by the duty ratio of the first subframe period; and a value obtained by multiplying the gray level data $X_2$ of the second subimage raised to the power of gamma by the duty ratio of the second subframe period is proportional to the gray level data $X_0$ of the original image raised to the power of gamma. $X_1$ is proportional to $X_0$ when $X_2$ is 0, and $X_2$ is a curve that is convex upward with respect to $X_0$ when $X_1$ is $X_{MAX}$. Note that a proportionality coefficient in the relation between $X_1$ and $X_0$ can be based on the scale factor K determined using gray level data distribution. Specifically, it is preferably (2K) raised to the power of 1/γ. Note that in the first conversion example, when K=0.5, the gray level data $X_2$ of the second subimage is always 0. That is, the second subimage is a black image. When K=0.75, the range of $X_0$ where the gray level data $X_2$ of the second subimage is 0 is $0 \leqq X_0 \leqq 212$; and K=1, $0 \leqq X_0 \leqq 186$. That is, in a display device in this embodiment, when peak luminance is increased or decreased in accordance with general brightness of an image, the range of $X_0$ where the gray level data of the second subimage is not 0 is $187 \leqq X_0 \leqq 255$ at the maximum.

Note that when gray level data is converted as the graphs illustrated in FIGS. 9A to 9C, the relation between the gray level data $X_0$ of the original image and the instantaneous luminance in each subimage is as in the graphs in FIGS. 9D to 9F.

FIGS. 9D to 9F are graphs each illustrating the relation between the gray level data $X_0$ of the original image in the first conversion example and the instantaneous luminance of each subimage with $X_0$ as the horizontal axis and the instantaneous luminance as the vertical axis. In the graphs, dashed lines represent the instantaneous luminance of the first subimage, dotted lines represent the instantaneous luminance of the second subimage, and solid lines represent the average value of the instantaneous luminance of the first subimage and the second subimage. Note that the instantaneous luminance of the first subimage and the second subimage can be obtained by substituting the gray level data of the subimage, which is obtained from Formula 6, into Formula 3. In addition, when the first subframe period and the second subframe period are equal in length, the average value of the instantaneous luminance of the first subimage and the second subimage is proportional to integrated luminance that is obtained by integrating the instantaneous luminance with the time in one frame period.

Therefore, when the solid lines in the graphs of FIGS. 9D to 9F are compared to each other, it can be found that the integrated luminance in all the gray level ranges can be increased or decreased based on the scale factor K as in FIG. 1B in Embodiment 1. Accordingly, a display device with improved peak luminance and quality of moving images can be obtained.

That is, a display device in this embodiment is a display device in which the sum of a value obtained by multiplying the gray level data $X_1$ of the first subimage raised to the power of gamma by the duty ratio of the first sub frame period; and a value obtained by multiplying the gray level data $X_2$ of the second subimage raised to the power of gamma by the duty ratio of the second subframe period is proportional to the gray level data $X_0$ of the original image raised to the power of gamma. The second subimage is closer to black display by collecting the instantaneous luminance into the first subimage and the integrated luminance in one frame period is changed in accordance with the scale factor K determined using gray level data distribution. Note that in the first conversion example, when K is larger than 0.5, the instantaneous luminance in the first subimage is saturated at a certain gray level. However, by converting the gray level data in accordance with Formula 6, the integrated luminance in one frame period can be smoothly changed even at a gray level at which the integrated luminance is saturated.

The second conversion example will be described with reference to FIGS. 10A to 10F. A condition indicated by Formula 7 is set in the operation 80 illustrated in FIG. 8A, whereby the second conversion example can be realized.

$$X_1 = X_0 \quad \text{[Formula 7]}$$

Then, when the lengths of subframes are the same, that is, when n=½ in Formula 4, Formula 8 is derived from Formulae 4 and 7.

$$X_1 = X_0;\ X_2 = (2K - 1)^{\frac{1}{\gamma}} \cdot X_0 \quad \text{[Formula 8]}$$

From Formula 8, the gray level data $X_1$ of the first subimage and the gray level data $X_2$ of the second subimage can be uniquely determined with respect to the gray level data $X_0$ of the original image. That is, a display device in this embodiment is a display device in which the sum of a value obtained by multiplying the gray level data $X_1$ of the first subimage raised to the power of gamma by the duty ratio of the first subframe period; and a value obtained by multiplying the gray level data $X_2$ of the second subimage raised to the power of gamma by the duty ratio of the second subframe period is proportional to the gray level data $X_0$ of the original image raised to the power of gamma. The gray level data $X_1$ of the first subimage is equal to the gray level data $X_0$ of the original image.

FIGS. 10A to 10C are graphs each illustrating the relation between $X_0$ and $X_1$ or $X_2$ in the case where the gray level data is converted in accordance with Formula 8, with the gray level data $X_0$ of the original image as the horizontal axis and the gray level data ($X_1$ or $X_2$) after conversion as the vertical axis. FIG. 10A illustrates the case where the scale factor K in Formula 8 is 0.5; FIG. 10B, 0.75; and FIG. 10C, 1. In FIGS. 10A to 10C, dashed lines represent the relation between $X_0$ and $X_1$, and dotted lines represent the relation between $X_0$ and $X_2$.

That is, a display device in this embodiment is a display device in which the sum of a value obtained by multiplying the gray level data $X_1$ of the first subimage raised to the power of gamma by the duty ratio of the first subframe period; and a value obtained by multiplying the gray level data $X_2$ of the second subimage raised to the power of gamma by the duty ratio of the second subframe period is proportional to the gray level data $X_0$ of the original image raised to the power of gamma. $X_1$ is equal to $X_0$ and $X_2$ is proportional to $X_0$.

Note that a proportionality coefficient in the relation between $X_2$ and $X_0$ can be based on the scale factor K determined using gray level data distribution. Specifically, it is preferably (2K−1) raised to the power of 1/γ. Note that in the second conversion example, when K=0.5, the gray level data $X_2$ of the second subimage is always 0. That is, the second subimage is a black image. Note that the proportionality coefficient between $X_2$ and $X_0$ is approximately 0.73 when K=0.75 and is 1 when K=1. That is, in a display device in this embodiment, when peak luminance is increased or decreased in accordance with general brightness of an image, the proportionality coefficient between the gray level data $X_2$ of the second subimage and $X_0$ is increased or decreased between 0 and 1.

Note that when gray level data is converted as the graphs illustrated in FIGS. 10A to 10C, the relation between the gray level data $X_0$ of the original image and the instantaneous luminance in each subimage is as in the graphs in FIGS. 10D to 10F.

FIGS. 10D to 10F are graphs each illustrating the relation between the gray level data $X_0$ of the original image in the second conversion example and the instantaneous luminance of each subimage with $X_0$ as the horizontal axis and the instantaneous luminance as the vertical axis. In the graphs, dashed lines represent the instantaneous luminance of the first subimage, dotted lines represent the instantaneous luminance of the second subimage, and solid lines represent the average value of the instantaneous luminance of the first subimage and the second subimage. Note that the instantaneous luminance of the first subimage and the second subimage can be obtained by substituting the gray level data of the subimage, which is obtained from Formula 8, into Formula 3. In addition, when the first subframe period and the second subframe period are equal in length, the average value of the instantaneous luminance of the first subimage and the second subimage is proportional to integrated luminance that is obtained by integrating the instantaneous luminance with the time in one frame period.

Therefore, when the solid lines in the graphs of FIGS. 10D to 10F are compared to each other, it can be found that integrated luminance in all the gray level ranges can be increased or decreased based on the factor K as in FIG. 1B in Embodiment 1. Accordingly, a display device with improved peak luminance and quality of moving images can be obtained. That is, a display device in this embodiment is a display device in which the sum of a value obtained by multiplying the gray level data $X_1$ of the first subimage raised to the power of gamma by the duty ratio of the first subframe period; and a value obtained by multiplying the gray level data $X_2$ of the second subimage raised to the power of gamma by the duty ratio of the second subframe period is proportional to the gray level data $X_0$ of the original image raised to the power of gamma. The gray level data $X_1$ of the first subimage is the same as the gray level data $X_0$ of the original image and only the gray level data $X_2$ of the second subimage is changed, and the integrated luminance in one frame period is changed in accordance with the scale factor K determined using gray level data distribution. Note that in the second conversion example, the only difference between the first subimage and the second subimage is that the general brightness is increased or decreased. That is, in a display device in this embodiment, two images, the general brightness of each of which is increased or decreased, are sequentially displayed so that the peak luminance is increased or decreased in accordance with the general brightness of the image.

The third conversion example will be described with reference to FIGS. 11A to 11F. A condition indicated by Formula 9 is set in the operation 80 illustrated in FIG. 8A, whereby the third conversion example can be realized.

$$\left(\frac{X_1}{X_{MAX}}\right)^{\gamma} = \left(\frac{X_0}{X_{MAX}}\right)^{\gamma'} \quad \text{[Formula 9]}$$

Here, γ' is a gamma value after correction. Note that the gamma value after correction is preferably based on the scale factor K determined using gray level data distribution. Specifically, γ'=γ−(K−0.5) can be given. For example, when the gamma value is 2.2, the gamma value after correction is preferably in the range of approximately 1.7 to 2.2. Note that the gamma value is not limited thereto and can be a variety of values. Then, when the lengths of subframes are the same, that is, when n=½ in Formula 4, Formula 10 is derived from Formulae 4 and 9.

$$X_1 = X_{MAX}^{1-\frac{\gamma'}{\gamma}} \cdot X_0^{\frac{\gamma'}{\gamma}};\ X_2 = \{2K \cdot X_0^{\gamma} - X_1^{\gamma}\}^{\frac{1}{\gamma}} \quad \text{[Formula 10]}$$

From Formula 10, the gray level data $X_3$ of the first subimage and the gray level data $X_2$ of the second subimage can be uniquely determined with respect to the gray level data $X_0$ of the original image. That is, a display device in this embodiment is a display device in which the sum of a value obtained by multiplying the gray level data $X_1$ of the first subimage raised to the power of gamma by the duty ratio of the first subframe period; and a value obtained by multiplying the gray level data $X_2$ of the second subimage raised to the power of gamma by the duty ratio of the second subframe period is proportional to the gray level data $X_0$ of the original image raised to the power of gamma. A value obtained by dividing the gray level data $X_1$ of the first subimage by the maximum gray level and raising the obtained value to the power of γ is equal to a value obtained by dividing the gray level data $X_0$ of the original image by the maximum gray level and raising the obtained value to the power of γ'.

FIGS. 11A to 11C are graphs each illustrating the relation between $X_0$ and $X_1$ or $X_2$ in the case where the gray level data is converted in accordance with Formula 10, with the gray level data $X_0$ of the original image as the horizontal axis and the gray level data ($X_1$ or $X_2$) after conversion as the vertical axis. FIG. 11A illustrates the case where the scale factor K in Formula 10 is 0.5; FIG. 11B, 0.75; and FIG. 11C, 1. In FIGS. 11A to 11C, dashed lines represent the relation between $X_0$ and $X_1$, and dotted lines represent the relation between $X_0$ and $X_2$.

That is, a display device in this embodiment is a display device in which the sum of a value obtained by multiplying the gray level data $X_1$ of the first subimage raised to the power of gamma by the duty ratio of the first subframe period; and a value obtained by multiplying the gray level data $X_2$ of the second subimage raised to the power of gamma by the duty ratio of the second subframe period is proportional to the gray level data $X_0$ of the original image raised to the power of gamma. $X_1$ is proportional to a value obtained by raising $X_0$ to the power of (γ'/γ). Note that a proportionality coefficient in the relation between $X_1$ and $X_0$ can be based on the scale factor K determined using gray level data distribution.

Specifically, the gamma value γ' after correction is preferably changed in the range of approximately 1.7 to 2.2 in accordance with the scale factor K determined using gray level data distribution. Note that in the third conversion example, when K=0.5, the gray level data $X_2$ of the second subimage is always 0. That is, the second subimage is a black image. When K=0.75, the gamma value of the first subimage is smaller than the gamma value of the original image by 0.25, and gamma correction is performed so that the general brightness of the first subimage is increased. When K=1, the gamma value of the first subimage is smaller than the gamma value of the original image by 0.5, and gamma correction is performed so that the general brightness of the first subimage is further increased. That is, in a display device in this embodiment, gamma correction is performed on the first subimage so that the general brightness of the first subimage is increased, and thus the peak luminance is increased or decreased in accordance with the general brightness of the image. Note that in the third conversion example, the instantaneous luminance of the first subimage and the instantaneous luminance of the second subimage can be made different from each other even when K=1. Accordingly, afterimages of moving images or the like can be reduced more effectively, and a display device with further improved image quality can be obtained.

Note that when gray level data is converted as the graphs illustrated in FIGS. 11A to 11C, the relation between the gray level data $X_0$ of the original image and the instantaneous luminance in each subimage is as in graphs in FIGS. 11D to 11F.

FIGS. 11D to 11F are graphs each illustrating the relation between the gray level data $X_0$ of the original image in the third conversion example and the instantaneous luminance of each subimage with $X_0$ as the horizontal axis and the instantaneous luminance as the vertical axis. In the graphs, dashed lines represent the instantaneous luminance of the first subimage, dotted lines represent the instantaneous luminance of the second subimage, and solid lines represent the average value of the instantaneous luminance of the first subimage and the second subimage. Note that the instantaneous luminance of the first subimage and the second subimage can be obtained by substituting the gray level data of the subimage, which is obtained from Formula 10, into Formula 3. In addition, when the first subframe period and the second subframe period are equal in length, the average value of the instantaneous luminance of the first subimage and the second subimage is proportional to integrated luminance that is obtained by integrating the instantaneous luminance with the time in one frame period.

Therefore, when the solid lines in the graphs of FIGS. 11D to 11F are compared to each other, it can be found that integrated luminance in all the gray level ranges can be increased or decreased based on the scale factor K as in FIG. 1B in Embodiment 1. Accordingly, a display device with improved peak luminance and quality of moving images can be obtained. That is, a display device in this embodiment is a display device in which the sum of a value obtained by multiplying the gray level data $X_1$ of the first subimage raised to the power of gamma by the duty ratio of the first subframe period; and a value obtained by multiplying the gray level data $X_2$ of the second subimage raised to the power of gamma by the duty ratio of the second subframe period is proportional to the gray level data $X_0$ of the original image raised to the power of gamma. Gamma correction is performed on the gray level data $X_1$ of the first subimage so as to increase the instantaneous luminance, and the gamma value after correction is changed in accordance with the scale factor K determined using gray level data distribution.

Note that in this embodiment, the specific examples of a method where the gray level data $X_0$ of the original image is converted into the gray level data $X_1$ of the first subimage and the gray level data $X_2$ of the second subimage are described. Since the conversion method described in this embodiment is a specific example of the method in Embodiment 1, it is not limited to those described above, and a variety of methods can be used.

Embodiment 4

As Embodiment 4, another structure example and a driving method of a display device will be described. In this embodiment, the case of using a display device including a display element whose luminance response with respect to signal writing is slow (the response time is long) will be described. In this embodiment, a liquid crystal element is described as an example of the display element with long response time; however, a display element in this embodiment is not limited thereto, and a variety of display elements in which luminance response with respect to signal writing is slow can be used.

In a general liquid crystal display device, luminance response with respect to signal writing is slow, and it sometimes takes more than one frame period to complete the response even when a signal voltage continues to be applied to a liquid crystal element. Moving images cannot be precisely displayed by such a display element. Further, in the case of employing active matrix driving, the time for signal writing to one liquid crystal element is only a period (one scan line selection period) obtained by dividing a signal writing cycle (one frame period or one subframe period) by the number of scan lines, and the liquid crystal element cannot respond in such a short time in many cases.

Therefore, most of the response of the liquid crystal element is performed in a period when signal writing is not performed. Here, the dielectric constant of the liquid crystal element is changed in accordance with the transmissivity of the liquid crystal element, and the response of the liquid crystal element in a period when signal writing is not performed means that the dielectric constant of the liquid crystal element is changed in a state where electric charge is not exchanged with the outside of the liquid crystal element (in a constant charge state). In other words, in the formula where charge=(capacitance)·(voltage), the capacitance is changed in a state where the charge is constant. Accordingly, a voltage applied to the liquid crystal element is changed from a voltage at the time of signal writing, in accordance with the response of the liquid crystal element. Therefore, when the liquid crystal element whose luminance response with respect to signal writing is slow is driven by an active matrix mode, a voltage applied to the liquid crystal element cannot theoretically reach the voltage at the time of signal writing.

In a display device in this embodiment, the signal level at the time of signal writing is corrected in advance (a correction signal is used) so that a display element can reach desired luminance within a signal writing cycle, whereby the above problem can be solved. Further, since the response time of the liquid crystal element is shorter as the signal level becomes higher, the response time of the liquid crystal element can also be shorter by writing a correction signal. A driving method in which such a correction signal is added is referred to as overdriving.

By overdriving in this embodiment, even when a signal writing cycle is shorter than a cycle (an input image signal cycle $T_{in}$) for an image signal inputted to the display device, the signal level is corrected in accordance with the signal writing cycle, whereby the display element can reach desired luminance within the signal writing cycle. The case where the signal writing cycle is shorter than the input image signal cycle $T_{in}$ is, for example, the case where one original image is divided into a plurality of subimages and the plurality of subimages are sequentially displayed in one frame period.

Figure 12A:
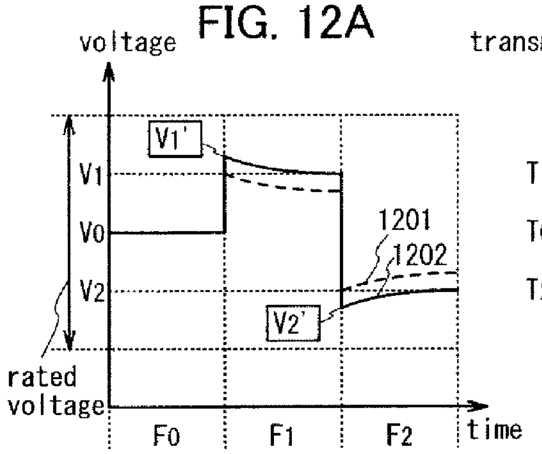
FIGS. 12A to 12F illustrate examples of operations of a semiconductor device.
Figure 12B:
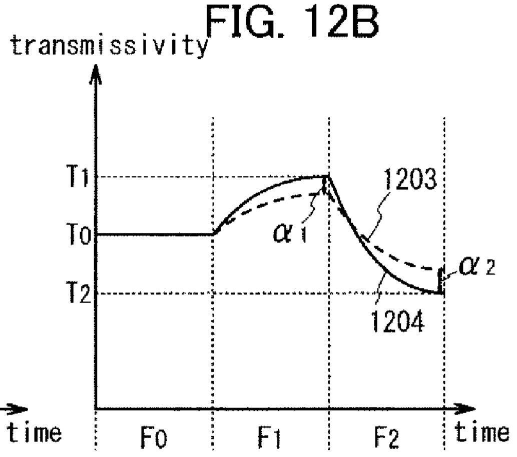

Next, an example of correcting the signal level at the time of signal writing in an active matrix display device will be described with reference to FIGS. 12A and 12B. FIG. 12A is a graph schematically illustrating change over time in signal level at the time of signal writing in one display element, with the time as the horizontal axis and the signal level at the time of signal writing as the vertical axis. FIG. 12B is a graph schematically illustrating change over time in display level, with the time as the horizontal axis and the display level as the vertical axis. Note that when the display element is a liquid crystal element, the signal level at the time of signal writing can be the voltage, and the display level can be the transmissivity of the liquid crystal element. In the following description, the vertical axis in FIG. 12A is regarded as the voltage, and the vertical axis in FIG. 12B is regarded as the transmissivity.

Note that in the overdriving in this embodiment, the signal level may be other than the voltage (may be the duty ratio or current, for example). Moreover, in the overdriving in this embodiment, the display level may be other than the transmissivity (may be luminance or current, for example). Liquid crystal elements are classified into two modes: a normally black mode in which black is displayed when a voltage is 0 (e.g., a VA mode and an IPS mode), and a normally white mode in which white is displayed when a voltage is 0 (e.g., a TN mode and an OCB mode). The graph illustrated in FIG. 12B can correspond to both modes; the transmissivity increases in the upper part of the graph in the normally black mode, and the transmissivity increases in the lower part of the graph in the normally white mode. That is, a liquid crystal mode in this embodiment may be a normally black mode or a normally white mode. Note that the timing of signal writing is represented on the time axis by dotted lines, and a period after signal wiring is performed until the next signal writing is performed is referred to as a retention period $F_i$.

In this embodiment, i is an integer and an index for representing each retention period. In FIGS. 12A and 12B, i is 0 to 2; however, i can be an integer other than 0 to 2 (only the case where i is 0 to 2 is illustrated). Note that in the retention period $F_i$, the transmissivity for realizing luminance corresponding to an image signal is denoted by $T_i$, and the voltage for providing the transmissivity $T_i$ in a constant state is denoted by $V_i$. In FIG. 12A, a dashed line 1201 represents change over time in voltage applied to the liquid crystal element when overdriving is not performed, and a solid line 1202 represents change over time in voltage applied to the liquid crystal element when the overdriving in this embodiment is performed. Similarly, in FIG. 12B, a dashed line 1203 represents change over time in transmissivity of the liquid crystal element when overdriving is not performed, and a solid line 1204 represents change over time in transmissivity of the liquid crystal element when the overdriving in this embodiment is performed. Note that the difference between the desired transmissivity $T_i$ and the actual transmissivity at the end of the retention period $F_i$ is referred to as an error $\alpha_i$.

It is assumed that, in the graph illustrated in FIG. 12A, both the dashed line 1201 and the solid line 1202 represent the case where a desired voltage $V_0$ is applied in a retention period $F_0$; and in the graph illustrated in FIG. 12B, both the dashed line 1203 and the solid line 1204 represent the case where desired transmissivity $T_0$ is obtained. When overdriving is not performed, a desired voltage $V_1$ is applied at the beginning of a retention period $F_1$ as shown by the dashed line 1201. As has been described above, a period for signal writing is extremely shorter than a retention period, and the liquid crystal element is in a constant charge state in most of the retention period. Accordingly, a voltage applied to the liquid crystal element in the retention period $F_1$ is changed along with change in transmissivity and becomes greatly different from the desired voltage $V_1$ at the end of the retention period $F_1$. At this time, the dashed line 1203 in the graph of FIG. 12B is greatly different from desired transmissivity $T_1$. Accordingly, accurate display of an image signal cannot be performed, and thus the image quality is degraded.

On the other hand, when the overdriving in this embodiment is performed, a voltage $V_1'$ which is larger than the desired voltage $V_1$ is applied to the liquid crystal element at the beginning of the retention period $F_1$ as shown by the solid line 1202. That is, the voltage $V_1'$ which is corrected from the desired voltage $V_1$ is applied to the liquid crystal element at the beginning of the retention period $F_1$ so that the voltage applied to the liquid crystal element at the end of the retention period $F_1$ is close to the desired voltage $V_1$ in anticipation of gradual change in voltage applied to the liquid crystal element in the retention period $F_1$. Accordingly, the desired voltage $V_1$ can be accurately applied to the liquid crystal element. At this time, as shown by the solid line 1204 in the graph of FIG. 12B, the desired transmissivity $T_1$ can be obtained at the end of the retention period $F_1$. In other words, the response of the liquid crystal element within the signal writing cycle can be realized, despite the fact that the liquid crystal element is in a constant charge state in most of the retention period.

Then, in a retention period $F_2$, the case where a desired voltage $V_2$ is lower than $V_1$ is shown. In that case also, as in the retention period $F_1$, a voltage $V_2'$ which is corrected from the desired voltage $V_2$ may be applied to the liquid crystal element at the beginning of the retention period $F_2$ so that the voltage applied to the liquid crystal element at the end of the retention period $F_2$ is close to the desired voltage $V_2$ in anticipation of gradual change in voltage applied to the liquid crystal element in the retention period $F_2$. Accordingly, as shown by the solid line 1204 in the graph of FIG. 12B, desired transmissivity $T_2$ can be obtained at the end of the retention period $F_2$.

Note that when $V_i$ is higher than $V_{i-1}$, like in the retention period $F_1$, the corrected voltage $V_i'$ is preferably corrected to be higher than a desired voltage $V_i$. Further, when $V_i$ is lower than $V_{i-1}$, like in the retention period $F_2$, the corrected voltage $V_i'$ is preferably corrected to be lower than the desired voltage $V_i$. A specific correction value can be derived by measuring response characteristics of the liquid crystal element in advance. As a method of realizing the overdriving in a device, a method in which a correction formula is formulated and included in a logic circuit, a method in which a correction value is stored in a memory as a lookup table and read as necessary, or the like can be used.

Note that there are several limitations on the actual realization of the overdriving in this embodiment as a device. For example, voltage correction has to be performed in the range of the rated voltage of a source driver. That is, if a desired voltage is originally high and an ideal correction voltage exceeds the rated voltage of the source driver, not all correction can be performed. Problems in such a case will be described with reference to FIGS. 12C and 12D.

Figure 12C:
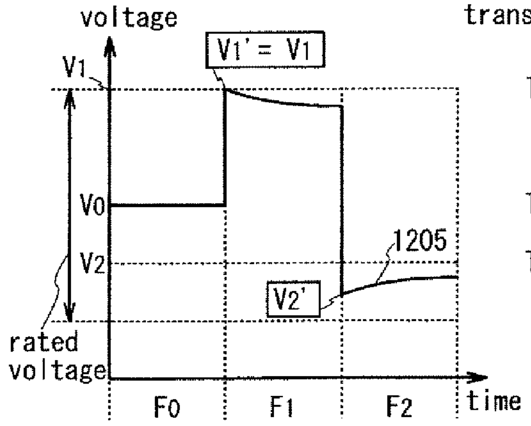
Figure 12D:
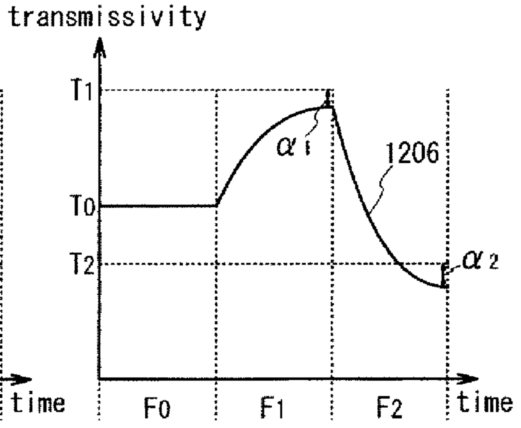

As in FIG. 12A, FIG. 12C is a graph in which change over time in voltage in one liquid crystal element is schematically illustrated as a solid line 1205 with the time as the horizontal axis and the voltage as the vertical axis. As in FIG. 12B, FIG. 12D is a graph in which change over time in transmissivity of one liquid crystal element is schematically illustrated as a solid line 1206 with the time as the horizontal axis and the transmissivity as the vertical axis. Note that other references are similar to those in FIGS. 12A and 12B; therefore, the description is not repeated. FIGS. 12C and 12D illustrate a state where sufficient correction is not performed because the correction voltage $V_1'$ for realizing the desired transmissivity $T_1$ in the retention period $F_1$ exceeds the rated voltage of the source driver, and thus $V_1'=V_1$ has to be given. At this time, the transmissivity at the end of the retention period $F_1$ is deviated from the desired transmissivity $T_1$ by the error $\alpha_1$. Note that the error $\alpha_1$ is increased only when the desired voltage is originally high; therefore, degradation of image quality due to occurrence of the error $\alpha_1$ is often in the allowable range. However, as the error $\alpha_1$ is increased, an error in the algorithm for voltage correction is also increased. In other words, in the algorithm for voltage correction, when it is assumed that the desired transmissivity is obtained at the end of the retention period, even though the error $\alpha_1$ is increased, the voltage correction is performed on the basis that the error $\alpha_1$ is small. Accordingly, the error is included in the correction in the next retention period $F_2$, and thus, an error $\alpha_2$ is also increased. Moreover, when the error $\alpha_2$ is increased, the following error $\alpha_3$ is further increased, for example, and the error is increased in a chain reaction manner, resulting in significant degradation of image quality.

In the overdriving in this embodiment, in order to prevent increase of errors in such a chain reaction manner, when the correction voltage $V_i'$ exceeds the rated voltage of the source driver in the retention period $F_i$, an error $\alpha_i$ at the end of the retention period $F_i$ is assumed, and the correction voltage in a retention period $F_{i+1}$ can be adjusted in consideration of the amount of the error $\alpha_i$. Accordingly, even when the error $\alpha_i$ is increased, the effect of the error $\alpha_i$ on the error $\alpha_{i+1}$ can be minimized, whereby increase of errors in a chain reaction manner can be prevented.

Figure 12E:
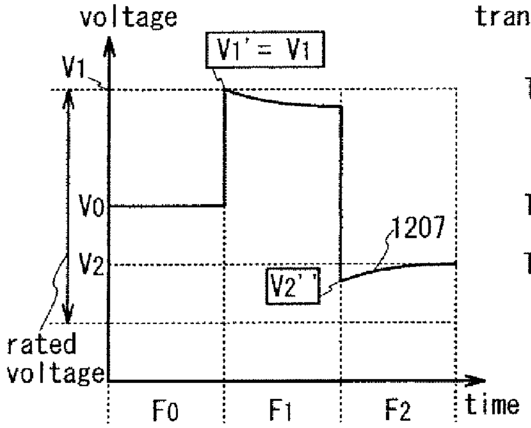
Figure 12F:
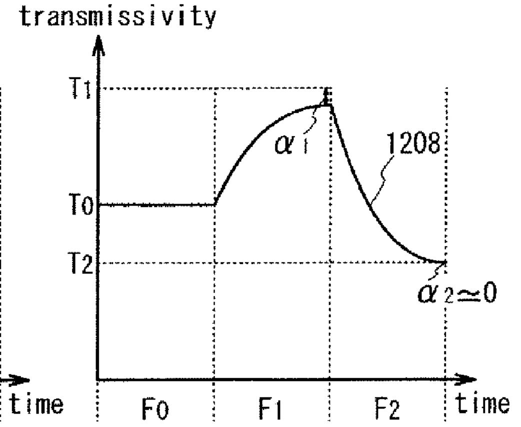

An example where the error $\alpha_2$ is minimized in the overdriving in this embodiment will be described with reference to FIGS. 12E and 12F. In a graph of FIG. 12E, a solid line 1207 represents change over time in voltage in the case where the correction voltage $V_2'$ in the graph of FIG. 12C is further adjusted to be a correction voltage $V_2''$. A graph of FIG. 12F illustrates change over time in transmissivity in the case where a voltage is corrected in accordance with the graph of FIG. 12E.

The solid line 1206 in the graph of FIG. 12D indicates that excessive correction is caused by the correction voltage $V_2'$. On the other hand, the solid line 1208 in the graph of FIG. 12F indicates that excessive correction is suppressed by the correction voltage $V_2''$ which is adjusted in consideration of the error $\alpha_1$ and the error $\alpha_2$ is minimized. Note that a specific correction value can be derived from measuring response characteristics of the liquid crystal element in advance. As a method of realizing the overdriving in the device, a method in which a correction formula is formulated and included in a logic circuit, a method in which a correction value is stored in a memory as a lookup table and read as necessary, or the like can be used. Moreover, such a method can be added separately from a portion for calculating a correction voltage $V_i'$ or included in the portion for calculating a correction voltage $V_i'$. Note that the amount of correction of a correction voltage $V_i''$ which is adjusted in consideration of an error $\alpha_{i-1}$ (the difference with the desired voltage $V_i$) is preferably smaller than that of $V_i'$. That is, $|V_i''-V_i|<|V_i'-V_i|$ is preferable.

Note that the error $\alpha_i$ which is caused because an ideal correction voltage exceeds the rated voltage of the source driver is increased as a signal writing cycle is shorter. This is because the response time of the liquid crystal element needs to be shorter as the signal writing cycle is shorter, and thus, the higher correction voltage is necessary. Further, as a result of increasing the correction voltage needed, the correction voltage exceeds the rated voltage of the source driver more frequently, whereby the large error 60 $_i$ occurs more frequently. Therefore, the overdriving in this embodiment is more effective as the signal writing cycle is shorter. Specifically, the overdriving in this embodiment is significantly effective in the case of performing the following driving methods, for example, the case where one original image is divided into a plurality of subimages and the plurality of subimages are sequentially displayed in one frame period, the case where motion of an image is detected from a plurality of images and an intermediate image of the plurality of images is generated and inserted between the plurality of images (so-called motion compensation double-frame rate driving), and the case where such driving methods are combined.

Note that a rated voltage of the source driver has the lower limit in addition to the upper limit described above. An example of the lower limit is the case where a voltage lower than the voltage 0 cannot be applied. At this time, since an ideal correction voltage cannot be applied as in the case of the upper limit described above, the error $\alpha_i$ is increased. However, in that case also, the error $\alpha_i$ at the end of the retention period $F_i$ is assumed, and the correction voltage in the retention period $F_{i+1}$ can be adjusted in consideration of the amount of the error $\alpha_i$ in a similar manner as the above method. Note that when a voltage (a negative voltage) lower than the voltage 0 can be applied as a rated voltage of the source driver, the negative voltage may be applied to the liquid crystal element as a correction voltage. Accordingly, the voltage applied to the liquid crystal element at the end of retention period $F_i$ can be adjusted to be close to the desired voltage $V_i$ in anticipation of change in potential due to a constant charge state.

In addition, in order to suppress degradation of the liquid crystal element, so-called inversion driving in which the polarity of a voltage applied to the liquid crystal element is periodically reversed can be performed in combination with the overdriving. That is, the overdriving in this embodiment includes, in its category, the case where the overdriving is performed at the same time as the inversion driving. For example, in the case where the length of the signal writing cycle is ½ of that of the input image signal cycle $T_{in}$, when the length of a cycle for reversing the polarity is approximately the same as that of the input image signal cycle $T_{in}$, two sets of writing of a positive signal and two sets of writing of a negative signal are alternately performed. The length of the cycle for reversing the polarity is made larger than that of the signal writing cycle in such a manner, whereby the frequency of charge and discharge of a pixel can be reduced, and thus power consumption can be reduced. Note that when the cycle for reversing the polarity is made too long, a defect sometimes occurs in which luminance difference due to the difference of polarity is recognized as a flicker; therefore, it is preferable that the length of the cycle for reversing the polarity is substantially the same as or smaller than that of the input image signal cycle $T_{in}$.

Embodiment 5

As another structure example and a driving method of a display device will be described. In this embodiment, a method will be described in which an image that compensates motion of an image (an input image) which is inputted from the outside of a display device is generated inside the display device based on a plurality of input images and the generated image (the generation image) and the input image are sequentially displayed. Note that an image for interpolating motion of an input image serves as a generation image, motion of moving images can be smooth, and degradation of quality of moving images because of afterimages or the like due to hold driving can be suppressed. Here, moving image interpolation will be described below.

Ideally, display of moving images is realized by controlling the luminance of each pixel in real time; however, individual control of pixels in real time has problems such as the enormous number of control circuits, space for wirings, and the enormous amount of data of input images, and thus is difficult to be realized. Therefore, at present, for display of moving images by a display device, a plurality of still images are sequentially displayed in a certain cycle so that display appears to be moving images. The cycle (in this embodiment, referred to as an input image signal cycle and represented by $T_{in}$) is standardized, and for example, 1/60 second in NTSC (National Television Standards Committee) and 1/50 second in PAL (Phase Alternating Line). Such a cycle does not cause a problem of moving image display in a CRT which is an impulse-type display device. However, in a hold-type display device, when moving images conforming to these standards are displayed as they are, a defect (hold blur) in which display is blurred because of afterimages or the like due to hold driving occurs.

Hold blur is recognized by the discrepancy between unconscious motion interpolation due to human eye tracking and hold-type display, and thus can be reduced by making the input image signal cycle shorter than that in the conventional standards (by making the control closer to individual control of pixels in real time). However, it is difficult to reduce the length of the input image signal cycle because the standard needs to be changed and the amount of data is further increased. Note that an image for interpolating motion of an input image is generated inside the display device based on a standardized input image signal, and display is performed while the generation image interpolates the input image, whereby hold blur can be reduced without change of the standard or increase of the amount of data. An operation such that an image signal is generated inside the display device based on an input image signal to interpolate motion of the input image is referred to as moving image interpolation.

Figure 13A:
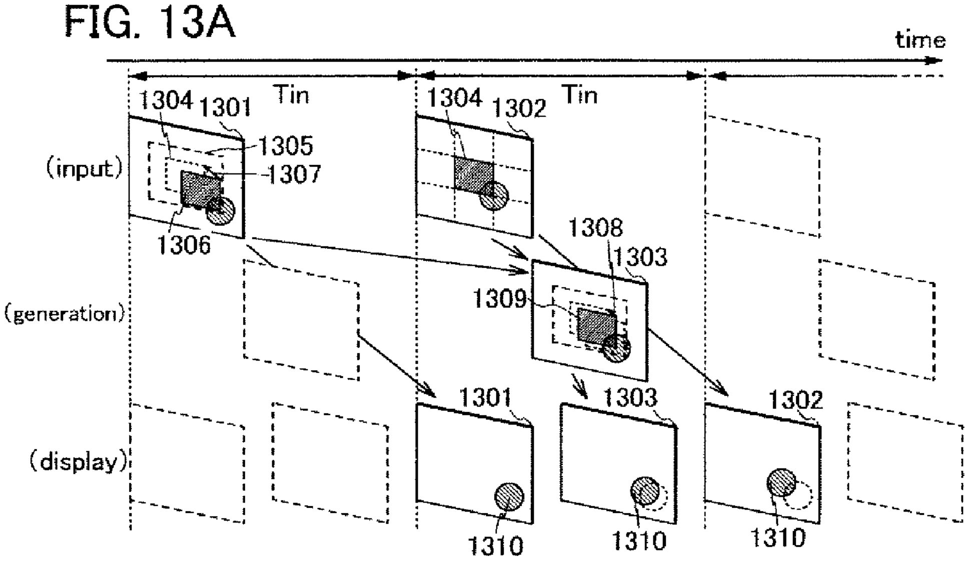
FIGS. 13A to 13C illustrate examples of operations of a semiconductor device.
Figure 13B:
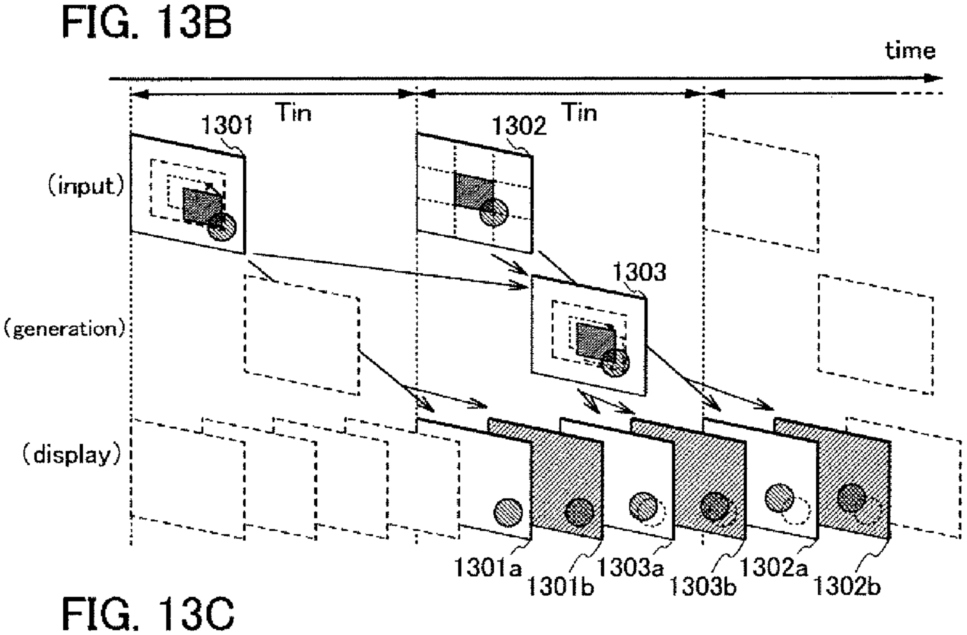

By a method for interpolating moving images in this embodiment, motion blur can be reduced. The method for interpolating moving images in this embodiment can include an image generation method and an image display method. Moreover, by using another image generation method and/or image display method for motion with a specific pattern, motion blur can be effectively reduced. FIGS. 13A and 13B each are a schematic diagram for illustrating an example of a method for interpolating moving images in this embodiment.

FIGS. 13A and 13B each illustrate the timing of treating each image using the position of the horizontal direction, with the time as the horizontal axis. A portion represented as "input" indicates the timing when an input image signal is inputted. Here, an image 1301 and 1302 are focused as two images that are temporally adjacent. An input image is inputted at an interval of the cycle T. Note that the length of one cycle $T_{in}$ is sometimes referred to as one frame or one frame period. A portion represented as "generation" indicates the timing when a new image is generated from the input image signal. Here, an image 1303 which is a generation image generated based on the images 1301 and 1302 is focused. A portion represented as "display" indicates the timing when an image is displayed in the display device. Note that images other than the focused images are only represented by dashed lines, and by treating such images in a manner similar to that of the focused image, the example of the method for interpolating moving images in this embodiment can be realized.

In the example of the method for interpolating moving images in this embodiment, as illustrated in FIG. 13A, a generation image which is generated based on two input images that are temporally adjacent is displayed in a period after one image is displayed until the other image is displayed, whereby moving image interpolation can be performed. At this time, a display cycle of the display image is preferably ½ of an input cycle of the input image. Note that the display cycle is not limited thereto and can be a variety of display cycles. For example, when the length of the display cycle is smaller than ½ of that of the input cycle, moving images can be displayed more smoothly. Alternatively, when the length of the display cycle is larger than ½ of that of the input cycle, power consumption can be reduced.

Note that here, an image is generated based on two input images that are temporally adjacent; however, the number of input images serving as a basis is not limited to two and can be other numbers. For example, when an image is generated based on three (may be more than three) input images that are temporally adjacent, a generation image with higher accuracy can be obtained as compared to the case where an image is generated based on two input images. Note that the display timing of the image 1301 is the same time as the input timing of the image 1302, that is, the display timing is one frame later than the input timing. However, the display timing in the method for interpolating moving images in this embodiment is not limited thereto and can be a variety of display timings. For example, the display timing can be delayed with respect to the input timing by more than one frame. Accordingly, the display timing of the image 1303 which is the generation image can be delayed, which allows enough time to generate the image 1303 and leads to reduction in power consumption and manufacturing costs. Note that when the display timing is delayed for a long time as compared to the input timing, a period for holding an input image is longer, and the memory capacity necessary for holding the input image is increased. Therefore, the display timing is preferably delayed with respect to the input timing by approximately one to two frames.

Here, an example of a specific generation method of the image 1303 which is generated based on the images 1301 and 1302 is described. It is necessary to detect motion in an input image in order to interpolate moving images. In this embodiment, a method called a block matching method can be used in order to detect motion in an input image. Note that this embodiment is not limited thereto, and a variety of methods (e.g., a method of obtaining the difference of image data or a method of using Fourier transformation) can be used.

In the block matching method, first, image data for one input image (here, image data of the image 1301) is stored in a data storage means (e.g., a memory circuit such as a semiconductor memory or a RAM). Then, an image in the next frame (here, the image 1302) is divided into a plurality of regions. Note that the divided regions can have the same rectangular shape as illustrated in FIG. 13A; however, they are not limited thereto and can have a variety of shapes (e.g., the shape or size varies depending on images). After that, in each divided region, the data is compared with the image data in the previous frame (here, the image data of the image 1301), which is stored in the data storage means, so as to search for a region where the image data is similar thereto. The example of FIG. 13A illustrates that the image 1301 is searched for a region where data is similar to that of a region 1304 in the image 1302, and a region 1306 is found. Note that a search range is preferably limited when the image 1301 is searched. In the example of FIG. 13A, a region 1305 which is approximately four times larger than the region 1304 is set as the search range. By making the search range larger than this, detection accuracy can be increased even in a moving image with high-speed motion. Note that search in an excessively wide range needs an enormous amount of time, which makes it difficult to realize detection of motion. Accordingly, the region 1305 has preferably approximately two to six times larger than the area of the region 1304.

After that, the difference of the position between the searched region 1306 and the region 1304 in the image 1302 is obtained as a motion vector 1307. The motion vector 1307 represents motion of image data in the region 1304 in one frame period. Then, in order to generate an image showing an intermediate state of motion, an image generation vector 1308 obtained by changing the size of the motion vector without changing the direction thereof is generated, and image data included in the region 1306 of the image 1301 is moved in accordance with the image generation vector 1308, whereby image data in a region 1309 of the image 1303 is generated. By performing a series of processings on the entire region of the image 1302, the image 1303 can be generated. Then, by sequentially displaying the input image 1301, the generation image 1303, and the input image 1302, moving images can be interpolated. Note that the position of an object 1310 in the image is different (i.e., the object is moved) in the images 1301 and 1302. In the generated image 1303, the object is located at the midpoint between the images 1301 and 1302. By displaying such images, motion of moving images can be smooth, and blur of moving images due to afterimages or the like can be reduced.

Note that the size of the image generation vector 1308 can be determined in accordance with the display timing of the image 1303. In the example of FIG. 13A, since the display timing of the image 1303 is the midpoint (½) between the display timings of the images 1301 and 1302, the size of the image generation vector 1308 is ½ of that of the motion vector 1307. Alternatively, for example, when the display timing is at the first ⅓ of the cycle $T_{in}$, the size of the image generation vector 1308 can be ⅓; and when the display timing is at the latter ⅓ of the cycle $T_{in}$, the size can be ⅔.

Note that when a new image is generated by moving a plurality of region having different motion vectors in such a manner, a portion where one region is already moved to a region that is a destination for another region or a portion to which any region is not moved sometimes occur (i.e., overlap or blank sometimes occurs). For such portions, data can be compensated. As a method for compensating an overlap portion, a method where overlap data are averaged; a method where data is arranged in order of priority according to the direction of motion vectors or the like, and high-priority data is used as data in a generation image; or a method where one of color and brightness is arranged in order of priority and the other is averaged can be used, for example. As a method for compensating a blank portion, a method where image data for the portion of the image 1301 or the image 1302 is used as data in a generation image without modification, a method where image data for the portion of the image 1301 or the image 1302 is averaged, or the like can be used. Then, the generated image 1303 is displayed in accordance with the size of the image generation vector 1308, whereby motion of moving images can be smooth, and degradation of quality of moving images because of afterimages or the like due to hold driving can be suppressed.

In another example of the method for interpolating moving images in this embodiment, as illustrated in FIG. 13B, when a generation image which is generated based on two input images that are temporally adjacent is displayed in a period after one image is displayed until the other image is displayed, each display image is divided into a plurality of subimages to be displayed, whereby moving image can be interpolated. This case can have advantages of displaying a dark image at regular intervals (advantages when a display method comes closer to impulse-type display) in addition to advantages of a shorter image display cycle. That is, blur of moving images due to afterimages or the like can further be reduced as compared to the case where the length of the image display cycle is just made to ½ of that of the image input cycle.

In the example of FIG. 13B, "input" and "generation" can be similar to the processings in the example of FIG. 13A; therefore, the description is not repeated. For "display" in the example of FIG. 13B, one input image and/or one generation image can be divided into a plurality of subimages to be displayed. Specifically, as illustrated in FIG. 13B, the image 1301 is divided into images 1301*a* and 1301*b* and the images 1301*a* and 1301*b* are sequentially displayed so as to make the human eye perceive that the image 1301 is displayed; the image 1303 is divided into images 1303*a* and 1303*b* and the images 1303*a* and 1303*b* are sequentially displayed so as to make the human eye perceive that the image 1303 is displayed; and the image 1302 is divided into images 1302*a* and 1302*b* and the images 1302*a* and 1302*b* are sequentially displayed so as to make the human eye perceive that the image 1302 is displayed.

That is, a display method can be closer to impulse-type display while the image perceived by the human eye is similar to that in the example of FIG. 13A, whereby blur of moving images due to afterimages or the like can further be reduced. Note that the number of division of subimages is two in FIG. 13B; however, it is not limited thereto and can be other numbers. Moreover, subimages are displayed at regular intervals (½) in FIG. 13B; however, the timing of displaying subimages is not limited thereto and can be a variety of timings. For example, when the timing of displaying dark subimages (1301*b*, 1302*b*, and 1303*b*) is made earlier (specifically, the timing at ¼ to ½), a display method can be much closer to impulse-type display, whereby blur of moving images due to afterimages or the like can further be reduced. Alternatively, when the timing of displaying dark subimages is delayed (specifically, the timing at ½ to ¾), the length of a period for displaying a bright image can be increased, whereby display efficiency can be increased, and power consumption can be reduced.

Figure 13C:
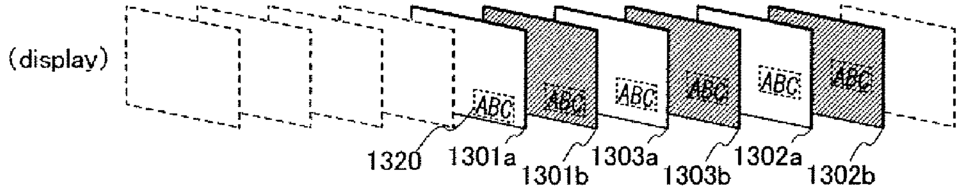

Another example of the method for interpolating moving images in this embodiment is an example in which the shape of an object moved in an image is detected and different processings are performed depending on the shape of the moving object. FIG. 13C illustrates the display timing as in the example of FIG. 13B and the case where moving characters (also referred to as scrolling texts, subtitles, captions, or the like) are displayed. Note that since "input" and "generation" may be similar to those in FIG. 13B, they are not shown in FIG. 13C.

The amount of blur of moving images by hold driving sometimes varies depending on properties of a moving object. In particular, blur is often recognized remarkably when characters are moved. This is because the eye follows moving characters to read the characters, and thus hold blur is likely to occur. Further, since characters often have clear outlines, blur due to hold blur is further emphasized in some cases. That is, determining whether an object moved in an image is a character and perform a special processing when the object is the character is effective in reducing in hold blur.

Specifically, when edge detection, pattern detection, and/or the like is/are performed on an object moved in an image and the object is determined to be a character, motion compensation is performed even on subimages generated by dividing one image so that an intermediate state of motion is displayed, whereby motion can be smooth. In the case where the object is determined not to be a character, when subimages are generated by dividing one image as illustrated in FIG. 13B, the subimages can be displayed without changing the position of the moving object. The example of FIG. 13C illustrates the case where a region 1320 determined to be characters is moved upward, and the position of the region 1320 is different between the images 1301*a* and 1301*b*, Similarly, the position of the region 1320 is different between the images 1303*a* and 1303*b*, and between the images 1302*a* and 1302*b*. Accordingly, motion of characters for which hold blur is particularly likely to be recognized can be smoother than that by normal motion compensation double-frame rate driving, whereby blur of moving images due to afterimages or the like can further be reduced.

Note that it is effective to combine the example illustrated in FIG. 13C in this embodiment with text detection for peak luminance control. This is because a circuit, algorithm, and/or the like for detecting a text in order to precisely control the peak luminance can be shared with a text detection means to reduce hold blur in this embodiment. Accordingly, even when peak luminance control and reduction in hold blue are performed at the same time, they can be realized without a major addition to the structure and/or operation of the display device.

Embodiment 6

In this embodiment, a structure and an operation of a pixel which can be applied to a liquid crystal display device will be described.

Figure 14A:
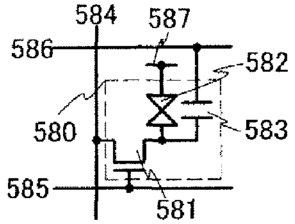
FIGS. 14A to 14G illustrate examples of operations and structures of semiconductor devices.

FIG. 14A illustrates an example of a pixel structure which can be applied to a liquid crystal display device. A pixel 580 includes a transistor 581, a liquid crystal element 582, and a capacitor 583. A gate of the transistor 581 is electrically connected to a wiring 585. A first terminal of the transistor 581 is electrically connected to a wiring 584. A second terminal of the transistor 581 is electrically connected to a first terminal of the liquid crystal element 582. A second terminal of the liquid crystal element 582 is electrically connected to a wiring 587. A first terminal of the capacitor 593 is electrically connected to the first terminal of the liquid crystal element 582. A second terminal of the capacitor 583 is electrically connected to a wiring 586. Note that a first terminal of a transistor is one of a source and a drain, and a second terminal of the transistor is the other of the source and the drain. That is, when the first terminal of the transistor is the source, the second terminal of the transistor is the drain. Similarly, when the first terminal of the transistor is the drain, the second terminal of the transistor is the source.

The wiring 584 can function as a signal line. The signal line is a wiring for transmitting a signal voltage, which is inputted from the outside of the pixel, to the pixel 580. The wiring 585 can function as a scan line. The scan line is a wiring for controlling on and off of the transistor 581. The wiring 586 can function as a capacitor line. The capacitor line is a wiring for applying a predetermined voltage to the second terminal of the capacitor 583. The transistor 581 can function as a switch. The capacitor 583 can function as a storage capacitor. The storage capacitor is a capacitor with which the signal voltage continues to be applied to the liquid crystal element 582 even when the switch is off. The wiring 587 can function as a counter electrode. The counter electrode is a wiring for applying a predetermined voltage to the second terminal of the liquid crystal element 582. Note that a function of each wiring is not limited thereto, and each wiring can have a variety of functions. For example, by changing a voltage applied to the capacitor line, a voltage applied to the liquid crystal element can be adjusted. Note that the transistor 581 can be a p-channel transistor or an n-channel transistor because it merely functions as a switch.

Figure 14B:
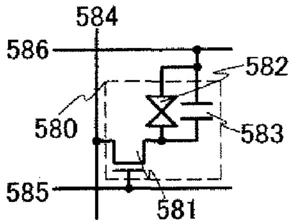

FIG. 14B illustrates an example of a pixel structure which can be applied to the liquid crystal display device. The example of the pixel structure illustrated in FIG. 14B is the same as that in FIG. 14A except that the wiring 587 is omitted and the second terminal of the liquid crystal element 582 and the second terminal of the capacitor 583 are electrically connected to each other. The example of the pixel structure in FIG. 14B can be particularly applied to the case of using a horizontal electric field mode (including an IPS mode and FFS mode) liquid crystal element. This is because in the horizontal electric field mode liquid crystal element, the second terminal of the liquid crystal element 582 and the second terminal of the capacitor 583 can be formed over one substrate, and thus it is easy to electrically connect the second terminal of the liquid crystal element 582 and the second terminal of the capacitor 583. With the pixel structure in FIG. 14B, the wiring 587 can be omitted, whereby a manufacturing process can be simplified, and manufacturing costs can be reduced.

Figure 14C:
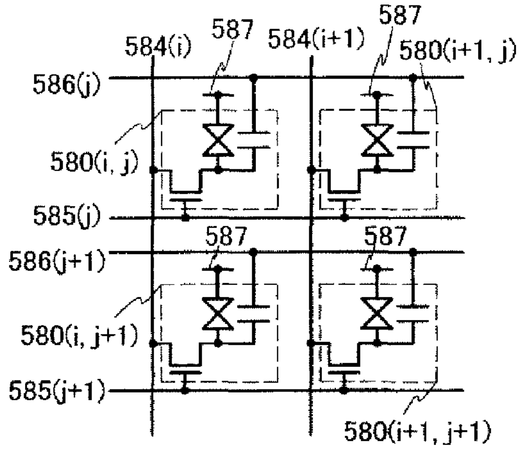

A plurality of pixel structures illustrated in FIG. 14A or FIG. 14B can be arranged in matrix. Accordingly, a display portion of a liquid crystal display device is formed, and a variety of images can be displayed. FIG. 14C illustrates a circuit configuration in the case where a plurality of pixel structures illustrated in FIG. 14A are arranged in matrix. FIG. 14C is the circuit diagram illustrating four pixels among a plurality of pixels included in the display portion. A pixel arranged in i row and j column (each of i and j is a natural number) is represented as a pixel 580(*i, j*), and a wiring 584(*i*), a wiring 585(*j*), and a wiring 586(*j*) are electrically connected to the pixel 580(*i, j*). Similarly, a wiring 584(*i*+1), the wiring 585(*j*), and the wiring 586(*j*) are electrically connected to a pixel 580(*i*+1, *j*). Similarly, the wiring 584(*i*), a wiring 585 (*j*+1), and a wiring 586(*j*+1) are electrically connected to a pixel 580(*i, j*+1). Similarly, the wiring 584(*i*+1), the wiring 585(*j*+1), and the wiring 586(*j*+1) are electrically connected to a pixel 580(*i*+1, *j*+1). Note that each wiring can be used in common with a plurality of pixels in the same row or the same column. In the pixel structure illustrated in FIG. 14C, the wiring 587 is a counter electrode, which is used by all the pixels in common; therefore, the wiring 587 is not indicated by the natural number i or j. Further, since the pixel structure in FIG. 14B can also be used in this embodiment, the wiring 587 is not essential even in a structure where the wiring 587 is described, and can be omitted when another wiring serves as the wiring 587, for example.

Figure 14D:
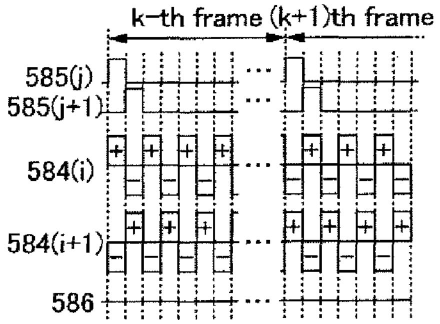

The pixel structure in FIG. 14C can be driven by a variety of driving methods. In particular, when the pixels are driven by a method called alternating-current driving, degradation (burn-in) of the liquid crystal element can be suppressed. FIG. 14D is a timing chart of voltages applied to each wiring in the pixel structure in FIG. 14C in the case where dot inversion driving which is a kind of alternating-current driving is performed. By the dot inversion driving, flickers seen when the alternating-current driving is performed can be suppressed.

In the pixel structure in FIG. 14C, a switch in a pixel electrically connected to the wiring 585(*j*) is brought into a selection state (an on state) in a j-th gate selection period in one frame period, and into a non-selection state (an off state) in the other periods. Then, a (j+1)th gate selection period is provided after the j-th gate selection period. By performing sequential scanning in such a manner, all the pixels are sequentially brought into a selection state within one frame period. In the timing chart of FIG. 14D, when a voltage is at high level, the switch in the pixel is brought into a selection state; when a voltage is at low level, the switch is brought into a non-selection state. Note that this is the case where the transistors in the pixels are n-channel transistors. In the case of using p-channel transistors, the relation between the voltage and the selection state is opposite to that in the case of using n-channel transistors.

In the timing chart illustrated in FIG. 14D, in the j-th gate selection period in a k-th frame (k is a natural number), a positive signal voltage is applied to the wiring 584(*i*) used as a signal line, and a negative signal voltage is applied to the wiring 584(*i*+1). Then, in the (j+1)th gate selection period in the k-th frame, a negative signal voltage is applied to the wiring 584(*i*), and a positive signal voltage is applied to the wiring 584(*i*+1). After that, signals whose polarity is reversed in each gate selection period are alternately supplied to the signal line. Thus, in the k-th frame, the positive signal voltage is applied to the pixels 580(*i, j*) and 580(*i*+1, *j*+1), and the negative signal voltage is applied to the pixels 580(*i*+1, *j*) and 580(*i, j*+1). Then, in a (k+1)th frame, a signal voltage whose polarity is opposite to that of the signal voltage written in the k-th frame is written to each pixel. Thus, in the (k+1)th frame, the positive signal voltage is applied to the pixels 580(*i*+1, *j*) and 580(*i, j*+1), and the negative signal voltage is applied to the pixels 580(*i, j*) and 580(*i*+1, *j*+1). In such a manner, the dot inversion driving is a driving method in which signal voltages whose polarity is different between adjacent pixels are applied in one frame and the polarity of the voltage signal for the pixel is reversed in each frame. By the dot inversion driving, flickers seen when the entire or part of an image to be displayed is uniform can be suppressed while degradation of the liquid crystal element is suppressed. Note that voltages applied to all the wirings 586 including the wirings 586(*j*) and 586(*j*+1) can be a fixed voltage. Moreover, only the polarity of the signal voltages for the wirings 584 is shown in the timing chart, the signal voltages can actually have a variety of values in the polarity shown. Here, the case where the polarity is reversed per dot (per pixel) is described; however, this embodiment is not limited thereto, and the polarity can be reversed per a plurality of pixels. For example, the polarity of signal voltages to be written is reversed per two gate selection periods, whereby power consumed by writing the signal voltages can be reduced. Alternatively, the polarity may be reversed per column (source line inversion) or per row (gate line inversion).

Figure 14E:
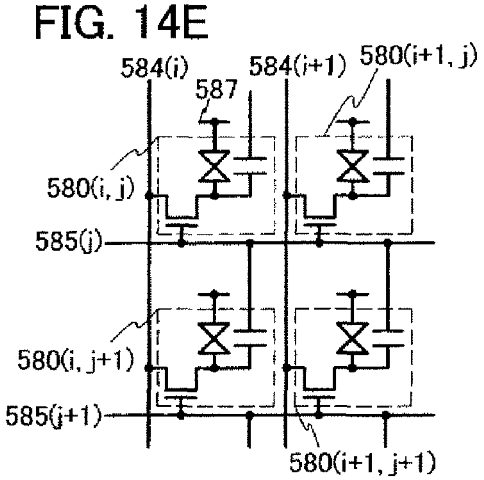

Note that a fixed voltage may be applied to the second terminal of the capacitor 583 in the pixel 580 in one frame period. Since a voltage applied to the wiring 585 used as a scan line is at low level in most of one frame period, which means that a substantially constant voltage is applied to the wiring 585; therefore, the second terminal of the capacitor 583 in the pixel 580 may be connected to the wiring 585. FIG. 14E illustrates an example of a pixel structure which can be applied to the liquid crystal display device. Compared to the pixel structure in FIG. 14C, a feature of the pixel structure in FIG. 14E is that the wiring 586 is omitted and the second terminal of the capacitor 583 in the pixel 580 and the wiring 585 in the previous row are electrically connected to each other. Specifically, in the range illustrated in FIG. 14E, the second terminals of the capacitors 583 in the pixels 580(*i, j*+1) and 580(*i*+1, *j*+1) are electrically connected to the wiring 585(*j*). By electrically connecting the second terminal of the capacitor 583 in the pixel 580 and the wiring 585 in the previous row in such a manner, the wiring 586 can be omitted, so that the aperture ratio of the pixel can be increased. Note that the second terminal of the capacitor 583 may be connected to the wiring 585 in another row instead of in the previous row. Further, the pixel structure in FIG. 14E can be driven by a similar driving method to that in the pixel structure in FIG. 14C.

Figure 14F:
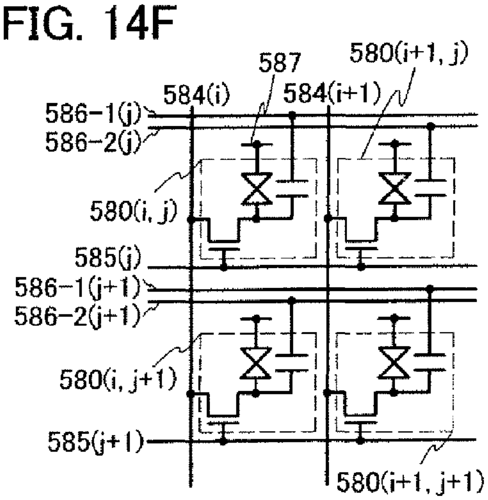

Note that a voltage applied to the wiring 584 used as a signal line can be made lower by using the capacitor 583 and the wiring electrically connected to the second terminal of the capacitor 583. A pixel structure and a driving method in that case will be described with reference to FIGS. 14F and 14G. Compared to the pixel structure in FIG. 14A, a feature of the pixel structure in FIG. 14F is that two wirings 586 are provided per pixel row, and in adjacent pixels, one wiring is electrically connected to every other second terminal of the capacitors 583 and the other wiring is electrically connected to the remaining every other second terminal of the capacitors 583. Two wirings 586 are referred to as a wiring 586-1 and a wiring 586-2. Specifically, in the range illustrated in FIG. 14F, the second terminal of the capacitor 583 in the pixel 580(*i, j*) is electrically connected to a wiring 586-1(*j*); the second terminal of the capacitor 583 in the pixel 580(*i*+1, *j*) is electrically connected to a wiring 586-2(*j*); the second terminal of the capacitor 583 in the pixel 580(*i, j*+1) is electrically connected to a wiring 586-2(*i*+1); and the second terminal of the capacitor 583 in the pixel 580(*i*+1, *j*+1) is electrically connected to a wiring 586-1(*j*+1).

Figure 14G:
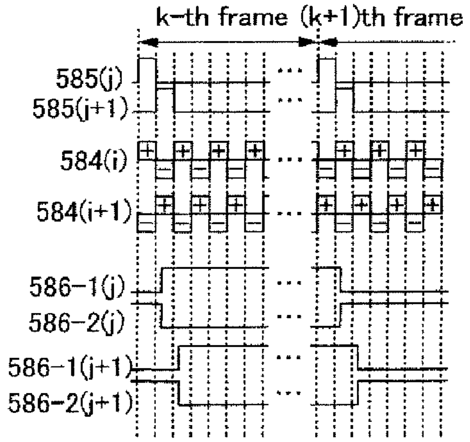

For example, when a positive signal voltage is written to the pixel 580(*i, j*) in the k-th frame as illustrated in FIG. 14G, the wiring 586-1(*j*) becomes low level, and is changed to high level after the j-th gate selection period. Then, the wiring 586-1(*j*) is kept at high level in one frame period, and after a negative signal voltage is written in the j-th gate selection period in the (k+1)th frame, the wiring 586-1(*j*) is changed to high level. In such a manner, a voltage of the wiring which is electrically connected to the second terminal of the capacitor 583 is changed to the positive direction after a positive signal voltage is written to the pixel, whereby a voltage applied to the liquid crystal element can be changed to the positive direction by a predetermined amount. That is, a signal voltage written to the pixel can be reduced accordingly, so that power consumed by signal writing can be reduced. Note that when a negative signal voltage is written in the j-th gate selection period, a voltage of the wiring which is electrically connected to the second terminal of the capacitor 583 is changed to the negative direction after a negative signal voltage is written to the pixel. Accordingly, a voltage applied to the liquid crystal element can be changed to the negative direction by a predetermined amount, and the signal voltage written to the pixel can be reduced as in the ease of the positive polarity. In other words, as for the wiring which is electrically connected to the second terminal of the capacitor 583, different wirings are preferably used for a pixel to which a positive signal voltage is applied and a pixel to which a negative signal voltage is applied in the same row in one frame. FIG. 14F illustrates the example in which the wiring 586-1 is electrically connected to the pixel to which a positive signal voltage is applied in the k-th frame, and the wiring 586-2 is electrically connected to the pixel to which a negative signal voltage is applied in the k-th frame. Note that this is just an example, and for example, in the case of using a driving method in which pixels to which a positive signal voltage is applied and pixels to which a negative signal voltage is applied are arranged every two pixels, the wirings 586-1 and 586-2 are preferably electrically connected to every alternate two pixels accordingly. Furthermore, in the case where signal voltages of the same polarity are written in all the pixels in one row (gate line inversion), one wiring 586 may be provided per row. In other words, in the pixel structure in FIG. 14C, the driving method where a signal voltage written to a pixel is reduced as described with reference to FIGS. 14F and 14G can be used.

Figure 15A:
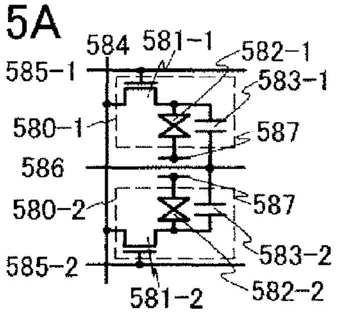
FIGS. 15A to 15H illustrate examples of operations and structures of semiconductor devices.
Figure 15B:
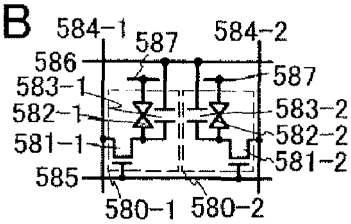

Next, a pixel structure and a driving method which are preferably employed particularly in the case where a liquid crystal element employs a vertical alignment (VA) mode typified by an MVA mode and a PVA mode. The VA mode has advantages such as no rubbing step in manufacture, little light leakage at the time of black display, and low driving voltage, but has a problem in that the image quality is degraded (the viewing angle is narrower) when a screen is seen from an oblique angle. In order to increase the viewing angle in the VA mode, a pixel structure where one pixel includes a plurality of subpixels as illustrated in FIGS. 15A and 15B is effective. Pixel structures illustrated in FIGS. 15A and 15B are examples of the case where the pixel 580 includes two subpixels (a subpixel 580-1 and a subpixel 580-2). Note that the number of subpixels in one pixel is not limited to two and can be other numbers. The viewing angle can be further increased as the number of subpixels is increased. A plurality of subpixels can have the same circuit configuration; here, all the subpixels have the circuit configuration illustrated in FIG. 14A. The first subpixel 580-1 includes a transistor 581-1, a liquid crystal element 582-1, and a capacitor 583-1. The connection relation is the same as that in the circuit configuration in FIG. 14A. Similarly, the second subpixel 580-2 includes a transistor 581-2, a liquid crystal element 582-2, and a capacitor 583-2. The connection relation is the same as that in the circuit configuration in FIG. 14A.

The pixel structure in FIG. 15A includes, for two subpixels forming one pixel, two wirings 585 (a wiring 585-1 and a wiring 585-2) used as scan lines, one wiring 584 used as a signal line, and one wiring 586 used as a capacitor line. When the signal line and the capacitor line are shared with two subpixels in such a manner, the aperture ratio can be increased. Further, since a signal line driver circuit can be simplified, manufacturing costs can be reduced. Moreover, since the number of connections between a liquid crystal panel and a driver circuit IC can be reduced, the yield can be increased. The pixel structure in FIG. 15B includes, for two subpixels forming one pixel, one wiring 585 used as a scan line, two wirings 584 (a wiring 584-1 and a wiring 584-2) used as signal lines, and one wiring 586 used as a capacitor line. When the scan line and the capacitor line are shared with two subpixels in such a manner, the aperture ratio can be increased. Further, since the total number of scan lines can be reduced, one gate line selection period can be sufficiently long even in a high-definition liquid crystal panel, and an appropriate signal voltage can be written in each pixel.

Figure 15C:
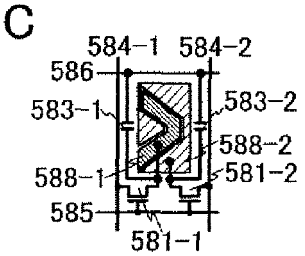
Figure 15D:
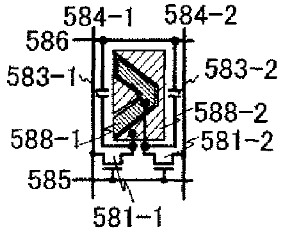

FIGS. 15C and 15D illustrate an example in which the liquid crystal element in the pixel structure in FIG. 15B is replaced with the shape of a pixel electrode and electrical connections of each element are schematically shown. In FIGS. 15C and 15D, an electrode 588-1 represents a first pixel electrode, and an electrode 588-2 represents a second pixel electrode. In FIG. 15C, the first pixel electrode 588-1 corresponds to a first terminal of the liquid crystal element 582-1 in FIG. 15B, and the second pixel electrode 588-2 corresponds to a first terminal of the liquid crystal element 582-2 in FIG. 15B. That is, the first pixel electrode 588-1 is electrically connected to one of a source and a drain of the transistor 581-1, and the second pixel electrode 588-2 is electrically connected to one of a source and a drain of the transistor 581-2. In FIG. 15D, the connection relation between the pixel electrode and the transistor is opposite to that in FIG. 15C. That is, the first pixel electrode 588-1 is electrically connected to one of the source and the drain of the transistor 581-2, and the second pixel electrode 588-2 is electrically connected to one of the source and the drain of the transistor 581-1.

Figure 15E:
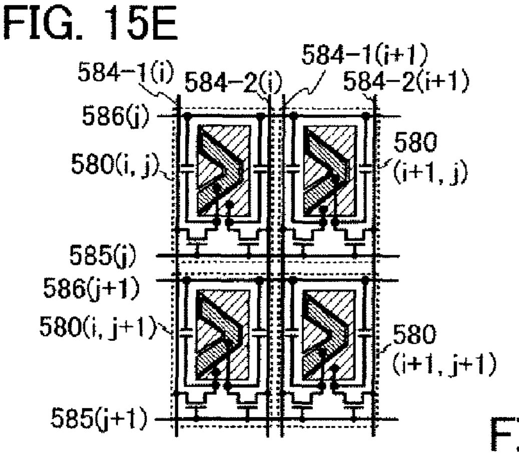
Figure 15F:
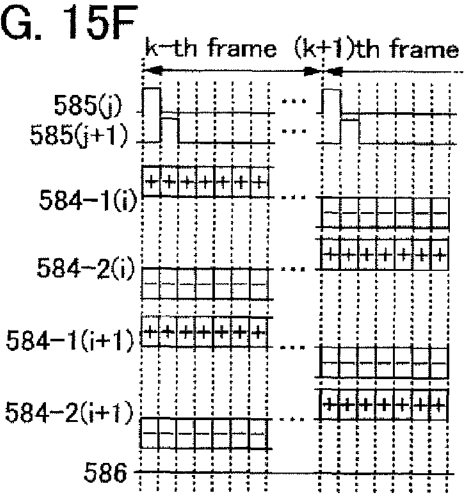

By arranging a plurality of pixel structures as illustrated in FIG. 15C or FIG. 15D in matrix, an extraordinary effect can be obtained. FIGS. 15E and 15F illustrate an example of such a pixel structure and driving method. In the pixel structure in FIG. 15E, a portion corresponding to the pixels 580(*i, j*) and 580(*i*+1, *j*+1) has the structure illustrated in FIG. 15C, and a portion corresponding to the pixels 580(*i*+1, *j*) and 580(*i, j*+1) has the structure illustrated in FIG. 15D. When this structure is driven as shown in the timing chart of FIG. 15F, a positive signal voltage is written to the first pixel electrode in the pixel 580(*i, j*) and the second pixel electrode in the pixel 580(*i*+1, *j*), and a negative signal voltage is written to the second pixel electrode in the pixel 580(*i, j*) and the first pixel electrode in the pixel 580(*i*+1, *j*). Then, in the (j+1)th gate selection period in the k-th frame, a positive signal voltage is written to the second pixel electrode in the pixel 580(*i, j*+1) and the first pixel electrode in the pixel 580(*i*+1, *j*+1), and a negative signal voltage is written to the first pixel electrode in the pixel 580(*i, j*+1) and the second pixel electrode in the pixel 580(*i*+1, *j*+1). In the (k+1)th frame, the polarity of the signal voltage is reversed in each pixel. Accordingly, the polarity of the voltage applied to the signal line can be the same in one frame period while driving corresponding to dot inversion driving is realized in the pixel structure including subpixels, whereby power consumed by writing the signal voltages to the pixels can be drastically reduced. Note that voltages applied to all the wirings 586 including the wirings 586(*j*) and 586(*j*+1) can be a fixed voltage.

Figure 15G:
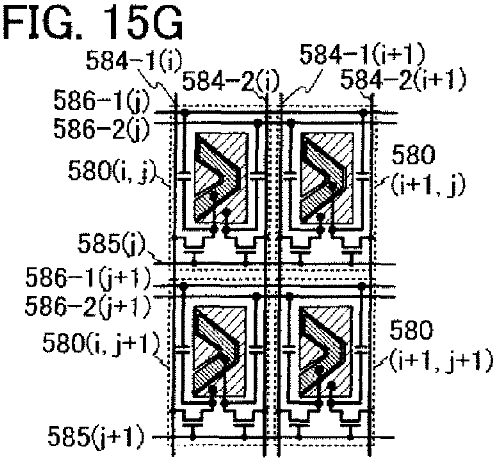
Figure 15H:
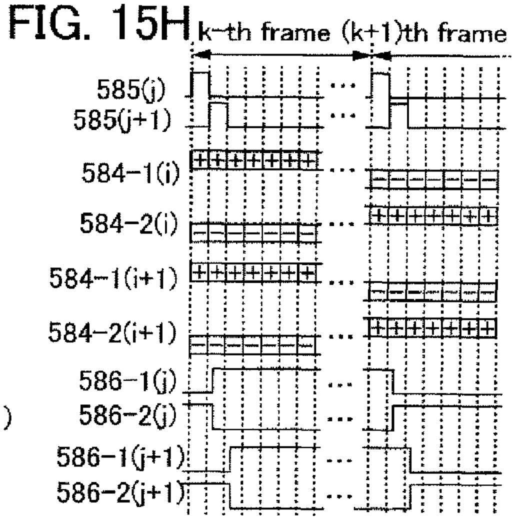

Further, by a pixel structure and a driving method illustrated in FIGS. 15G and 15H, the level of the signal voltage written to a pixel can be reduced. In the structure, a plurality of subpixels included in each pixel are electrically connected to respective capacitor lines. That is, according to the pixel structure and the driving method illustrated in FIGS. 15G and 15H, one capacitor line is shared with subpixels in one row, to which signal voltages of the same polarity are written in one frame; and subpixels to which signal voltages of the different polarities are written in one frame use different capacitor lines in one row. Then, when writing in each row is finished, voltages of the capacitor lines are changed to the positive direction in the subpixels to which a positive signal voltage is written, and changed to the negative direction in the subpixels to which a negative signal voltage is written; thus, the level of the signal voltage written to the pixel can be reduced. Specifically, two wirings 586 (the wirings 586-1 and 586-2) used as capacitor lines are provided per row. The first pixel electrode in the pixel 580(*i, j*) and the wiring 586-1(*j*) are electrically connected through the capacitor. The second pixel electrode in the pixel 580(*i, j*) and the wiring 586-2(*j*) are electrically connected through the capacitor. The first pixel electrode in the pixel 580(*i*+1, *j*) and the wiring 586-2(*j*) are electrically connected through the capacitor. The second pixel electrode in the pixel 580(*i*+1, *j*) and the wiring 586-1(*j*) are electrically connected through the capacitor. The first pixel electrode in the pixel 580(*i, j*+1) and the wiring 586-2(*j*+1) are electrically connected through the capacitor. The second pixel electrode in the pixel 580(*i, j*+1) and the wiring 586-1(*j*+1) are electrically connected through the capacitor. The first pixel electrode in the pixel 580(*i*+1, *j*+1) and the wiring 586-1(*j*+1) are electrically connected through the capacitor. The second pixel electrode in the pixel 580(*i*+1, *j*+1) and the wiring 586-2(*j*+1) are electrically connected through the capacitor. Note that this is just an example, and for example, in the case of using a driving method in which pixels to which a positive signal voltage is applied and pixels to which a negative signal voltage is applied are arranged every two pixels, the wirings 586-1 and 586-2 are preferably electrically connected to every alternate two pixels accordingly. Furthermore, in the case where signal voltages of the same polarity are written in all the pixels in one row (gate line inversion), one wiring 586 may be provided per row. In other words, in the pixel structure in FIG. 15E, the driving method where a signal voltage written to a pixel is reduced as described with reference to FIGS. 15G and 15H can be used.

Embodiment 7

In this embodiment, structures of transistors will be described. Transistors can be broadly classified according to materials used for semiconductor layers included in the transistors. The materials used for semiconductor layers can be classified into two categories: a silicon based material that contains silicon as its main component, and a non-silicon based material that does not contain silicon as its main component. Examples of the silicon based material are amorphous silicon, microcrystalline silicon, polysilicon, and single crystalline silicon. Examples of the non-silicon based material are compound semiconductors such as gallium arsenide (GaAs) and oxide semiconductors such as zinc oxide (ZnO).

The use of amorphous silicon (a-Si:H) or microcrystalline silicon for semiconductor layers of transistors has advantages of high uniformity of characteristics of the transistors and low manufacturing costs, and is particularly effective in manufacturing transistors over a large substrate with a diagonal of more than 20 inches. An example of a structure of a capacitor and a structure of a transistor in which amorphous silicon or microcrystalline silicon is used for a semiconductor layer will be described below.

Figure 16A:
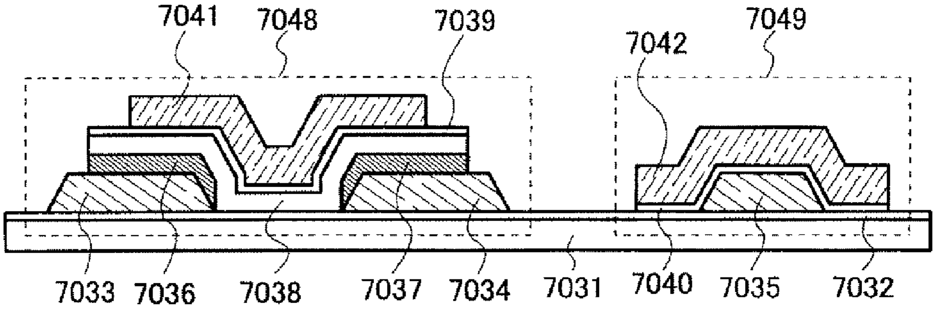
FIGS. 16A to 16D illustrate examples of structures of transistors which can be included in a semiconductor device.

FIG. 16A illustrates cross-sectional structures of a top-gate transistor and a capacitor.

A first insulating film (an insulating film 7032) is formed over a substrate 7031. The first insulating film can have a function of a base film that can prevent impurities from the substrate side from adversely affecting a semiconductor layer and changing characteristics of the transistor. As the first insulating film, a single layer or a stacked layer of a silicon oxide film, a silicon nitride film, a silicon oxynitride film ($SiO_xN_y$), or the like can be used. In particular, the silicon nitride film is dense and has high barrier properties, so that the first insulating film preferably contains silicon nitride. Note that the first insulating film is not necessarily formed. When the first insulating film is not formed, reduction in the number of steps and manufacturing costs and increase in yield can be realized.

A first conductive layer (a conductive layer 7033, a conductive layer 7034, and a conductive layer 7035) is formed over the first insulating film. The conductive layer 7033 includes a portion functioning as one of a source and a drain of a transistor 7048. The conductive layer 7034 includes a portion functioning as the other of the source and the drain of the transistor 7048. The conductive layer 7035 includes a portion functioning as a first electrode of a capacitor 7049. As the first conductive layer, Ti, Mo, Ta, Cr, W, Al, Nd, Cu, Ag, Au, Pt, Nb, Si, Zn, Fe, Ba, Ge, or the like; or an alloy of these elements can be used. Alternatively, a stacked layer of such elements (including the alloy thereof) can be used.

A first semiconductor layer (a semiconductor layer 7036 and a semiconductor layer 7037) is formed over the conductive layers 7033 and 7034. The semiconductor layer 7036 includes a portion functioning as one of the source and the drain. The semiconductor layer 7037 includes a portion functioning as the other of the source and the drain. As the first semiconductor layer, silicon including phosphorus or the like can be used, for example.

A second semiconductor layer (a semiconductor layer 7038) is formed over the first insulating film and between the conductive layer 7033 and the conductive layer 7034. Part of the semiconductor layer 7038 extends over the conductive layers 7033 and 7034. The semiconductor layer 7038 includes a portion functioning as a channel region of the transistor 7048. As the second semiconductor layer, a semiconductor layer having no crystallinity such as amorphous silicon (a-Si:H) layer, a semiconductor layer such as a microcrystalline silicon (μ—Si:H) layer, or the like can be used.

A second insulating film (an insulating film 7039 and an insulating film 7040) is formed so as to cover at least the semiconductor layer 7038 and the conductive layer 7035. The second insulating film functions as a gate insulating film. As the second insulating film, a single layer or a stacked layer of a silicon oxide film, a silicon nitride film, a silicon oxynitride film ($SiO_xN_y$), or the like can be used.

Note that for a portion of the second insulating film, which is in contact with the second semiconductor layer, a silicon oxide film is preferably used. This is because the trap level at the interface between the second semiconductor layer and the second insulating film can be reduced.

When the second insulating film is in contact with Mo, a silicon oxide film is preferably used for a portion of the second insulating film, which is in contact with Mo. This is because the silicon oxide film does not oxidize Mo.

A second conductive layer (a conductive layer 7041 and a conductive layer 7042) is formed over the second insulating film. The conductive layer 7041 includes a portion functioning as a gate electrode of the transistor 7048. The conductive layer 7042 functions as a second electrode of the capacitor 7049 or a wiring. As the second conductive layer, Ti, Mo, Ta, Cr, W, Al, Nd, Cu, Ag, Au, Pt, Nb, Si, Zn, Fe, Ba, Ge, or the like; or an alloy of these elements can be used. Alternatively, a stacked layer of such elements (including the alloy thereof) can be used.

Note that in steps after the second conductive layer is formed, a variety of insulating films or conductive films may be fowled.

Figure 16B:
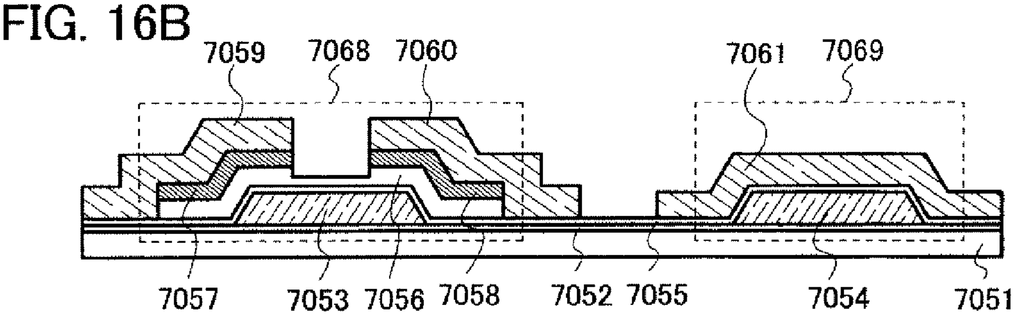

FIG. 16B illustrates cross-sectional structures of an inverted staggered (bottom gate) transistor and a capacitor. In particular, the transistor illustrated in FIG. 16B has a channel-etched structure.

A first insulating film (an insulating film 7052) is formed over a substrate 7051. The first insulating film can have a function of a base film that can prevent impurities from the substrate side from adversely affecting a semiconductor layer and changing characteristics of the transistor. As the first insulating film, a single layer or a stacked layer of a silicon oxide film, a silicon nitride film, a silicon oxynitride film ($SiO_xN_y$), or the like can be used. Since the silicon nitride film is dense and has high barrier properties, the first insulating film preferably contains silicon nitride. Note that the first insulating film is not necessarily formed. When the first insulating film is not formed, reduction in the number of steps and manufacturing costs and increase in yield can be realized.

A first conductive layer (a conductive layer 7053 and a conductive layer 7054) is formed over the first insulating film. The conductive layer 7053 includes a portion functioning as a gate electrode of a transistor 7068. The conductive layer 7054 includes a portion functioning as a first electrode of a capacitor 7069. As the first conductive layer, Ti, Mo, Ta, Cr, W, Al, Nd, Cu, Ag, Au, Pt, Nb, Si, Zn, Fe, Ba, Ge, or the like; or an alloy of these elements can be used. Alternatively, a stacked layer of these elements (including the alloy thereof) can be used.

A second insulating film (an insulating film 7055) is formed so as to cover at least the first conductive layer. The second insulating film functions as a gate insulating film. As the second insulating film, a single layer or a stacked layer of a silicon oxide film, a silicon nitride film, a silicon oxynitride film ($SiO_xN_y$), or the like can be used.

Note that as a portion of the second insulating film, which is in contact with a semiconductor layer, a silicon oxide film is preferably used. This is because the trap level at the interface between the semiconductor layer and the second insulating film can be reduced.

When the second insulating film is in contact with Mo, a silicon oxide film is preferably used as a portion of the second insulating film, which is in contact with Mo. This is because the silicon oxide film does not oxidize Mo.

A first semiconductor layer (a semiconductor layer 7056) is formed in part of a portion over the second insulating film, which overlaps with the first conductive layer, by a photolithography method, an inkjet method, a printing method, or the like. Part of the semiconductor layer 7056 extends to a portion over the second insulating film, which does not overlap with the first conductive layer. The semiconductor layer 7056 includes a portion functioning as a channel region of the transistor 7068. As the semiconductor layer 7056, a semiconductor layer having no crystallinity such as amorphous silicon (a-Si:H) layer, a semiconductor layer such as a microcrystalline silicon (t-Si:H) layer, or the like can be used.

A second semiconductor layer (a semiconductor layer 7057 and a semiconductor layer 7058) is formed over part of the first semiconductor layer. The semiconductor layer 7057 includes a portion functioning as one of a source and a drain. The semiconductor layer 7058 includes a portion functioning as the other of the source and the drain. As the second semiconductor layer, silicon including phosphorus or the like can be used, for example.

A second conductive layer (a conductive layer 7059, a conductive layer 7060, and a conductive layer 7061) is formed over the second semiconductor layer and the second insulating film. The conductive layer 7059 includes a portion functioning as one of the source and the drain of the transistor 7068. The conductive layer 7060 includes a portion functioning as the other of the source and the drain of the transistor 7068. The conductive layer 7061 includes a portion functioning as a second electrode of the capacitor 7069. As the second conductive layer, Ti, Mo, Ta, Cr, W, Al, Nd, Cu, Ag, Au, Pt, Nb, Si, Zn, Fe, Ba, Ge, or the like; or an alloy of these elements can be used. Alternatively, a stacked layer of these elements (including the alloy thereof) can be used.

Note that in steps after the second conductive layer is formed, a variety of insulating films or conductive films may be formed.

Note that in steps of manufacturing a channel-etched transistor, the first semiconductor layer and the second semiconductor layer can be continuously forr red. Further, the first semiconductor layer and the second semiconductor layer can be formed using the same mask.

After the second conductive layer is formed, part of the second semiconductor layer is removed using the second conductive layer as a mask or using a mask used for the second conductive layer, whereby the channel region of the transistor can be formed. Accordingly, it is not necessary to use an additional mask that is used only for removing part of the second semiconductor layer; thus, a manufacturing process can be simplified, and manufacturing costs can be reduced. Here, the first semiconductor layer below a region where the second semiconductor layer is removed serves as the channel region of the transistor.

Figure 16C:
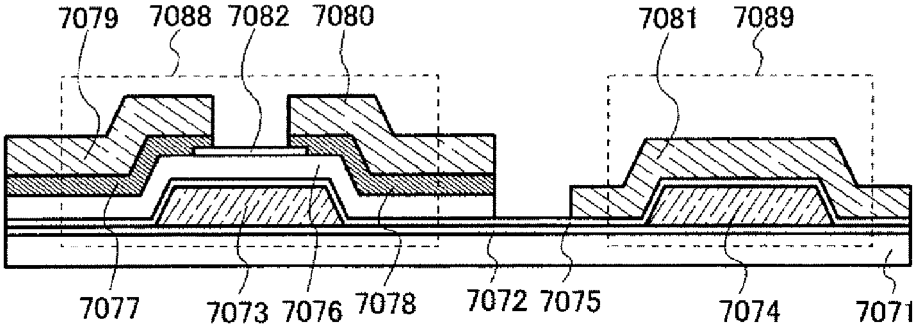

FIG. 16C illustrates cross-sectional structures of an inverted staggered (bottom gate) transistor and a capacitor. In particular, the transistor illustrated in FIG. 16C has a channel protection (channel stop) structure.

A first insulating film (an insulating film 7072) is formed over a substrate 7071. The first insulating film can have a function of a base film that can prevent impurities from the substrate side from adversely affecting a semiconductor layer and changing characteristics of the transistor. As the first insulating film, a single layer or a stacked layer of a silicon oxide film, a silicon nitride film, a silicon oxynitride film ($SiO_xN_y$), or the like can be used. Since the silicon nitride film is dense and has high barrier properties, the first insulating film preferably contains silicon nitride. Note that the first insulating film is not necessarily formed. When the first insulating film is not formed, reduction in the number of steps and manufacturing costs and increase in yield can be realized.

A first conductive layer (a conductive layer 7073 and a conductive layer 7074) is formed over the first insulating film. The conductive layer 7073 includes a portion functioning as a gate electrode of a transistor 7088. The conductive layer 7074 includes a portion functioning as a first electrode of a capacitor 7089. As the first conductive layer, Ti, Mo, Ta, Cr, W, Al, Nd, Cu, Ag, Au, Pt, Nb, Si, Zn, Fe, Ba, Ge, or the like; or an alloy of these elements can be used. Alternatively, a stacked layer of these elements (including the alloy thereof) can be used.

A second insulating film (an insulating film 7075) is formed so as to cover at least the first conductive layer. The second insulating film functions as a gate insulating film. As the second insulating film, a single layer or a stacked layer of a silicon oxide film, a silicon nitride film, a silicon oxynitride film ($SiO_xN_y$), or the like can be used.

As a portion of the second insulating film, which is in contact with a semiconductor layer, a silicon oxide film is preferably used, This is because the trap level at the interface between the semiconductor layer and the second insulating film can be reduced.

When the second insulating film is in contact with Mo, a silicon oxide film is preferably used as a portion of the second insulating film, which is in contact with Mo. This is because the silicon oxide film does not oxidize Mo.

A first semiconductor layer (a semiconductor layer 7076) is formed in a portion over the second insulating film, which overlaps with the first conductive layer, by a photolithography method, an inkjet method, a printing method, or the like. Part of the semiconductor layer 7078 extends to a portion over the second insulating film, which does not overlap with the first conductive layer. The semiconductor layer 7076 includes a portion functioning as a channel region of the transistor 7088. As the semiconductor layer 7076, a semiconductor layer having no crystallinity, such as amorphous silicon (a-Si:H) layer, a semiconductor layer such as a microcrystalline silicon (μ-Si:H) layer, or the like can be used.

A third insulating film (an insulating film 7082) is formed over part of the first semiconductor layer. The insulating film 7082 has a function of preventing the channel region of the transistor 7088 from being removed by etching. That is, the insulating film 7082 functions as a channel protection film (an etch stop film). As the third insulating film, a single layer or a stacked layer of a silicon oxide film, a silicon nitride film, a silicon oxynitride film ($SiO_xN_y$), or the like can be used.

A second semiconductor layer (a semiconductor layer 7077 and a semiconductor layer 7078) is formed over part of the first semiconductor layer and part of the third insulating film. The semiconductor layer 7077 includes a portion functioning as one of a source and a drain. The semiconductor layer 7078 includes a portion functioning as the other of the source and the drain. As the second semiconductor layer, silicon including phosphorus or the like can be used, for example.

A second conductive layer (a conductive layer 7079, a conductive layer 7080, and a conductive layer 7081) is formed over the second semiconductor layer. The conductive layer 7079 includes a portion functioning as one of the source and the drain of the transistor 7088. The conductive layer 7080 includes a portion functioning as the other of the source and the drain of the transistor 7088. The conductive layer 7081 includes a portion functioning as a second electrode of the capacitor 7089. As the second conductive layer, Ti, Mo, Ta, Cr, W, Al, Nd, Cu, Ag, Au, Pt, Nb, Si, Zn, Fe, Ba, Ge, or the like; or an alloy of these elements can be used. Alternatively, a stacked layer of these elements (including the alloy thereof) can be used.

Note that in steps after the second conductive layer is formed, a variety of insulating films or conductive films may be formed.

The use of polysilicon for semiconductor layers of transistors has advantages of high mobility of the transistors and low manufacturing costs. Moreover, since little deterioration in characteristics over time occurs, a high reliable device can be obtained. An example of a structure of a capacitor and a structure of a transistor in which polysilicon is used for a semiconductor layer will be described below.

Figure 16D:
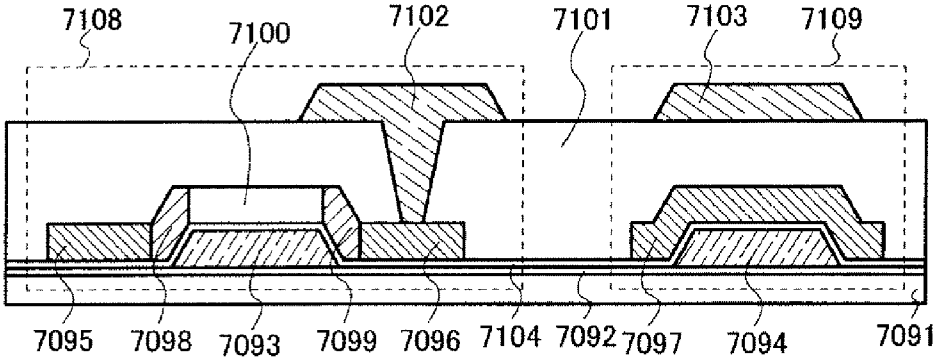

FIG. 16D illustrates cross-sectional structures of a bottom gate transistor and a capacitor.

A first insulating film (an insulating film 7092) is formed over a substrate 7091. The first insulating film can have a function of a base film that can prevent impurities from the substrate side from adversely affecting a semiconductor layer and changing characteristics of the transistor. As the first insulating film, a single layer or a stacked layer of a silicon oxide film, a silicon nitride film, a silicon oxynitride film ($SiO_xN_y$), or the like can be used. Since the silicon nitride film is dense and has high barrier properties, the first insulating film preferably contains silicon nitride. Note that the first insulating film is not necessarily formed. When the first insulating film is not formed, reduction in the number of steps and manufacturing costs and increase in yield can be realized.

A first conductive layer (a conductive layer 7093 and a conductive layer 7094) is formed over the first insulating film. The conductive layer 7093 includes a portion functioning as a gate electrode of a transistor 7108. The conductive layer 7094 includes a portion functioning as a first electrode of a capacitor 7109. As the first conductive layer, Ti, Mo, Ta, Cr, W, Al, Nd, Cu, Ag, Au, Pt, Nb, Si, Zn, Fe, Ba, Ge, or the like; or an alloy of these elements can be used. Alternatively, a stacked layer of these elements (including the alloy thereof) can be used.

A second insulating film (an insulating film 7104) is formed so as to cover at least the first conductive layer. The second insulating film functions as a gate insulating film. As the second insulating film, a single layer or a stacked layer of a silicon oxide film, a silicon nitride film, a silicon oxynitride film ($SiO_xN_y$), or the like can be used.

As a portion of the second insulating film, which is in contact with a semiconductor layer, a silicon oxide film is preferably used. This is because the trap level at the interface between the semiconductor layer and the second insulating film can be reduced.

When the second insulating film is in contact with Mo, a silicon oxide film is preferably used as a portion of the second insulating film, which is in contact with Mo. This is because the silicon oxide film does not oxidize Mo.

A semiconductor layer is formed in part of a portion over the second insulating film, which overlaps with the first conductive layer, by a photolithography method, an inkjet method, a printing method, or the like. Part of the semiconductor layer extends to a portion over the second insulating film, which does not overlap with the first conductive layer. The semiconductor layer includes a channel formation region (a channel formation region 7100), a lightly doped drain (LDD) region (an LDD region 7098 and an LDD region 7099), and an impurity region (an impurity region 7095, an impurity region 7096, and an impurity region 7097). The channel formation region 7100 functions as a channel formation region of the transistor 7108. The LDD regions 7098 and 7099 function as LDD regions of the transistor 7108. Note that the formation of the LDD regions 7098 and 7099 can prevent high electric fields from being applied to the drain of the transistor, so that the reliability of the transistor can be improved. Note that the LDD region is not necessarily fowled. In that case, a manufacturing process can be simplified, whereby manufacturing costs can be reduced. The impurity region 7095 includes a portion functioning as one of a source and a drain of the transistor 7108. The impurity region 7096 includes a portion functioning as the other of the source and the drain of the transistor 7108. The impurity region 7097 includes a portion functioning as a second electrode of the capacitor 7109.

A contact hole is selectively formed in part of a third insulating film (an insulating film 7101). The insulating film 7101 function as an interlayer insulating film. As the third insulating film, an inorganic material (e.g., silicon oxide, silicon nitride, or silicon oxynitride), an organic compound material having a low dielectric constant (e.g., a photosensitive or non-photosensitive organic resin material), or the like can be used. Alternatively, a material including siloxane may be used. Note that siloxane has a skeleton structure formed by a bond of silicon (Si) and oxygen (O). As a substituent, an organic group (e.g., an alkyl group or aromatic hydrocarbon) or a fluoro group may be used. The organic group may contain a fluoro group.

A second conductive layer (a conductive layer 7102 and a conductive layer 7103) is formed over the third insulating film. The conductive layer 7102 is electrically connected to the source or the drain of the transistor 7108 through the contact hole formed in the third insulating film. Therefore, the conductive layer 7102 includes a portion functioning as the source or the drain of the transistor 7108. When the conductive layer 7103 and the conductive layer 7094 are electrically connected in a portion not illustrated, the conductive layer 7103 includes a portion functioning as the first electrode of the capacitor 7109. Alternatively, when the conductive layer 7103 is electrically connected to the impurity region 7097 in a portion not illustrated, the conductive layer 7103 includes a portion functioning as the second electrode of the capacitor 7109. Further alternatively, when the conductive layer 7103 is not electrically connected to the conductive layer 7094 and the impurity region 7097, a capacitor other than the capacitor 7109 is formed. In this capacitor, the conductive layer 7103, the impurity region 7097, and the insulating film 7101 are used as a first electrode, a second electrode, and an insulating film, respectively. Note that as the second conductive layer, Ti, Mo, Ta, Cr, W, Al, Nd, Cu, Ag, Au, Pt, Nb, Si, Zn, Fe, Ba, Ge, or the like; or an alloy of these elements can be used. Alternatively, a stacked layer of these elements (including the alloy thereof) can be used.

Note that in steps after the second conductive layer is formed, a variety of insulating films or conductive films may be formed.

Note that the transistor in which polysilicon is used for a semiconductor layer can have a top gate structure.

Embodiment 8

In this embodiment, examples of electronic devices will be described.

FIGS. 17A to 17H and FIGS. 18A to 18D illustrate electronic devices. These electronic devices can each include a housing 5000, a display portion 5001, a speaker 5003, an LED lamp 5004, an operation key 5005, a connecting terminal 5006, a sensor 5007 (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared rays), a microphone 5008, and the like.

Figure 17A:
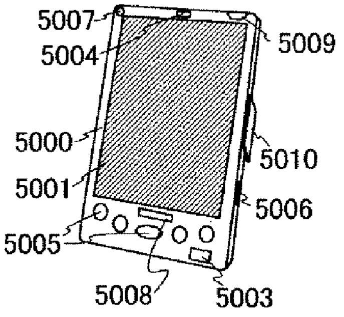
FIGS. 17A to 17H illustrate examples of semiconductor devices.
Figure 17B:
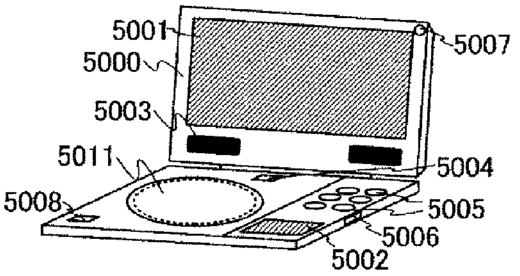
Figure 17C:
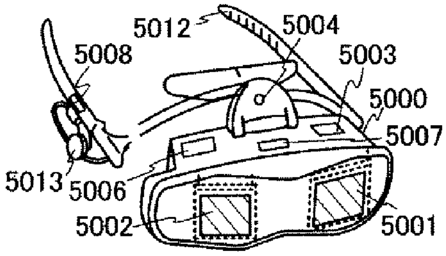
Figure 17D:
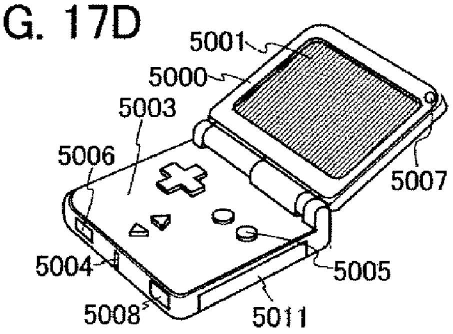
Figure 17E:
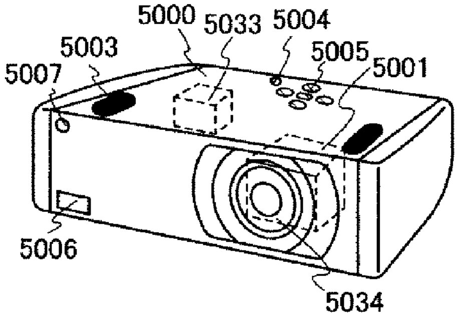
Figure 17F:
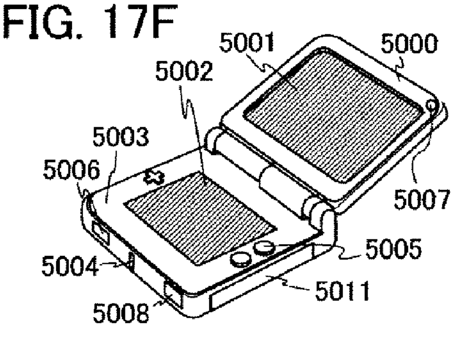
Figure 17G:
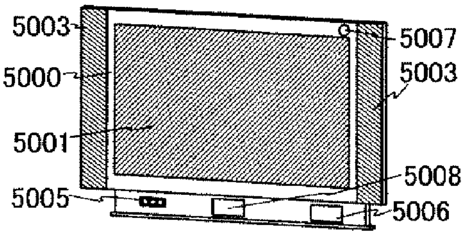
Figure 17H:
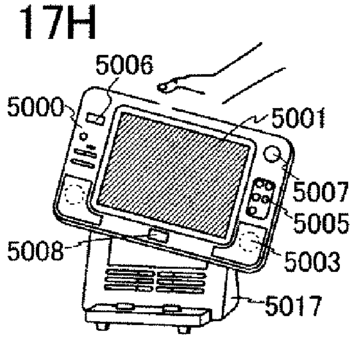
Figure 18A:
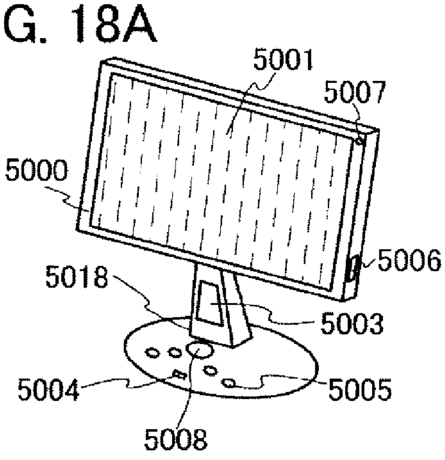
FIGS. 18A to 18H illustrate examples of semiconductor devices.
Figure 18B:
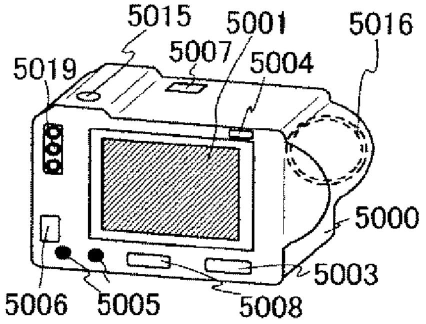
Figure 18C:
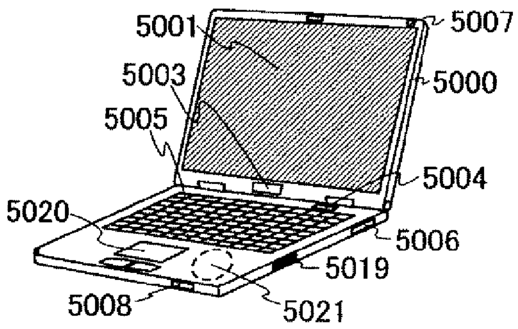
Figure 18D:
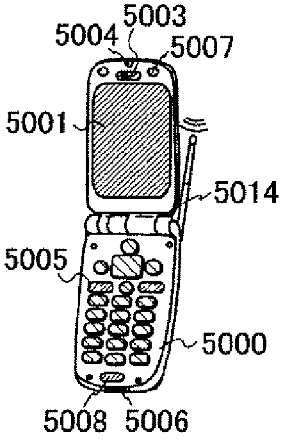

FIG. 17A illustrates a mobile computer which can include a switch 5009, an infrared port 5010, and the like in addition to the above objects. FIG. 17B illustrates a portable image reproducing device (e.g., a DVD reproducing device) provided with a memory medium, which can include a second display portion 5002, a memory medium reading portion 5011, and the like in addition to the above objects. FIG. 17C illustrates a goggle-type display which can include the second display portion 5002, a supporting portion 5012, an earphone 5013, and the like in addition to the above objects. FIG. 17D illustrates a portable game machine which can include the memory medium reading portion 5011 and the like in addition to the above objects. FIG. 17E illustrates a projector which can include a light source 5033, a projecting lens 5034, and the like in addition to the above objects. FIG. 17F illustrates a portable game machine which can include the second display portion 5002, the memory medium reading portion 5011, and the like in addition to the above objects. FIG. 17G illustrates a television receiver which can include a tuner, an image processing portion, and the like in addition to the above objects. FIG. 17H illustrates a portable television receiver which can include a charger 5017 which can transmit and receive signals and the like in addition to the above objects. FIG. 18A illustrates a display which can include a supporting board 5018 and the like in addition to the above objects. FIG. 18B illustrates a camera which can include an external connecting port 5019, a shutter button 5015, an image receiver portion 5016, and the like in addition to the above objects. FIG. 18C illustrates a computer which can include a pointing device 5020, the external connecting port 5019, a reader/writer 5021, and the like in addition to the above objects. FIG. 18D illustrates a mobile phone which can include an antenna 5014, a tuner of one-segment partial reception service for mobile phones and mobile terminals ("1seg"), and the like in addition to the above objects.

The electronic devices illustrated in FIGS. 17A to 17H and FIGS. 18A to 18D can have a variety of functions, for example, a function of displaying a variety of information (a still image, a moving image, a text image, and the like) on a display portion, a touch panel function, a function of displaying a calendar, date, time, and the like, a function of controlling processing with a variety of software (programs), a wireless communication function, a function of being connected to a variety of computer networks with a wireless communication function, a function of transmitting and receiving a variety of data with a wireless communication function, and a function of reading program or data stored in a memory medium and displaying the program or data on a display portion. Further, the electronic device including a plurality of display portions can have a function of displaying image information mainly on one display portion while displaying text information on another display portion, a function of displaying a three-dimensional image by displaying images where parallax is considered on a plurality of display portions, or the like. Furthermore, the electronic device including an image receiver portion can have a function of shooting a still image, a function of shooting a moving image, a function of automatically or manually correcting a shot image, a function of storing a shot image in a memory medium (an external memory medium or a memory medium incorporated in the camera), a function of displaying a shot image on the display portion, or the like. Note that functions which can be provided for the electronic devices illustrated in FIGS. 17A to 17H and FIGS. 18A to 18D are not limited thereto, and the electronic devices can have a variety of functions.

The electronic devices described in this embodiment each include the display portion for displaying some sort of information. In the electronic device in this embodiment, the image quality when still images and moving images are displayed can be improved the contrast ratio can be increased; the viewing angle can be increased; no flicker occurs; the response speed is increased; power consumption can be reduced; or manufacturing costs can be reduced.

Next, application examples of a semiconductor device will be described.

Figure 18E:
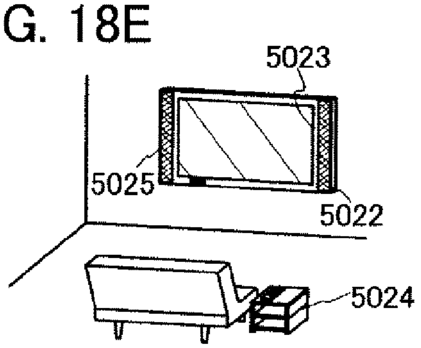

FIG. 18E illustrates an example in which a semiconductor device is provided so as to be integrated with a building. FIG. 18E illustrates a housing 5022, a display portion 5023, a remote controller device 5024 which is an operation portion, a speaker 5025, and the like. The semiconductor device is integrated with the building as a hung-on-wall type and can be provided without a large space for provision.

Figure 18F:
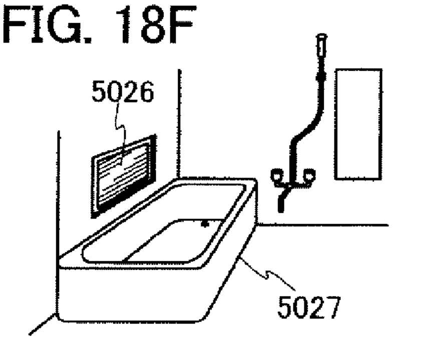

FIG. 18F illustrates another example in which a semiconductor device is provided so as to be integrated within a building. The display panel 5026 is integrated with a prefabricated bath 5027, so that a person who takes a bath can watch the display panel 5026.

Note that although this embodiment gives the wall and the prefabricated bath as examples of the building, this embodiment is not limited thereto and the semiconductor device can be provided in a variety of buildings.

Next, examples in which the semiconductor device is provided so as to be integrated with a moving body will be described.

Figure 18G:
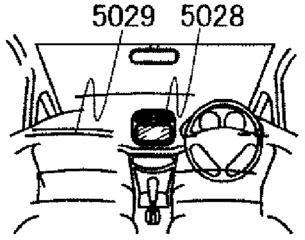

FIG. 18G illustrates an example in which the semiconductor device is provided in a vehicle. A display panel 5028 is provided in a body 5029 of the vehicle and can display information input from the operation of the body or the outside of the body on demand. Note that the display panel 5028 may have a navigation function.

Figure 18H:
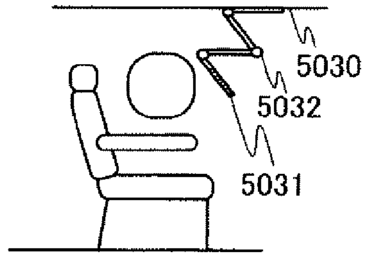

FIG. 18H illustrates an example in which the semiconductor device is provided so as to be integrated with a passenger airplane. FIG. 18H illustrates a usage pattern when a display panel 5031 is provided on a ceiling 5030 above a seat in the passenger airplane. The display panel 5031 is integrated with the ceiling 5030 through a hinge portion 5032, and a passenger can watch the display panel 5031 by extending and contracting the hinge portion 5032. The display panel 5031 has a function of displaying information when operated by the passenger.

Note that although this embodiment gives the body of the vehicle and the body of the plane as examples of the moving body, this embodiment is not limited thereto. The semiconductor device can be provided to a variety of moving bodies such as a two-wheeled motor vehicle, a four-wheeled vehicle (including a car, bus, and the like), a train (including a monorail, a railway, and the like), and a ship.

This application is based on Japanese Patent Application serial no. 2008-135320 filed with Japan Patent Office on May 23, 2008, the entire contents of which are hereby incorporated by reference.

What is claimed is:

1. A display device comprising a plurality of pixels, wherein in each pixel, a plurality of subframe periods are provided in one frame period, and a gray level of the pixel is expressed in accordance with a time integration level of instantaneous luminances expressed in the plurality of subframe periods, wherein when an average value of gray level data of an original image is larger than a predetermined value, a first black display is performed in the plurality of pixels in one of the plurality of subframe periods, wherein when the average value of the gray level data of the original image is smaller than the predetermined value, a second black display is performed in the plurality of pixels in the one of the plurality of subframe periods, and wherein the second black display includes a black portion and a brightness portion.

2. The display device according to claim 1, wherein the time integration level is increased with respect to the gray level data by power law.

3. The display device according to claim 1, wherein the average value of the gray level data of the original image is obtained by averaging gray levels of some of pixels among the plurality of pixels.

4. The display device according to claim 1, wherein the display device is a liquid crystal display device.

5. The display device according to claim 1, wherein the display device is incorporated into one electronic device selected from the group consisting of a mobile computer, a portable image reproducing device, a goggle-type display, a portable game machine, a projector, a television receiver, a portable television receiver, a camera, a computer, and a mobile phone.

6. The display device according to claim 1, wherein the plurality of subframe periods are equal in length.

7. A display device comprising a plurality of pixels, wherein a first subframe period and a second subframe period are provided in one frame period, and a gray level of the pixel is expressed in accordance with a time integration level of a first instantaneous luminance expressed in the first subframe period and a second instantaneous luminance expressed in the second subframe period, wherein when an average value of gray level data of an original image is larger than a predetermined value, a first black display is performed in the plurality of pixels in the second subframe period, wherein when the average value of the gray level data of the original image is smaller than the predetermined value, a second black display is performed in the plurality of pixels in the second subframe period, and wherein the second black display includes a black portion and a brightness portion.

8. The display device according to claim 7, wherein the display device is a liquid crystal display device.

9. The display device according to claim 7, wherein the display device is incorporated into one electronic device selected from the group consisting of a mobile computer, a portable image reproducing device, a goggle-type display, a portable game machine, a projector, a television receiver, a portable television receiver, a camera, a computer, and a mobile phone.

10. The display device according to claim 7, wherein the first subframe period and the second subframe period are equal in length.

11. A display device comprising:

an image feature amount detection portion for detecting gray level data distribution of gray level data of an original image;

a scale factor determination portion for determining a scale factor in accordance with the gray level data distribution detected by the image feature amount detection portion;

a gray level data conversion portion for converting the gray level data of the original image into gray level data of a first subimage and gray level data of a second subimage in accordance with the scale factor determined by the scale factor determination portion; and a display portion for displaying the first subimage and the second subimage, wherein when an average value of the gray level data of the original image is larger than a predetermined value, the second subimage is a black display, and wherein when the average value of the gray level data of the original image is smaller than the redetermined value the second subimage includes a black portion and a brightness portion.

12. The display device according to claim 11, further comprising a display control portion that converts the gray level data converted by the gray level data conversion portion into a signal for display, and generates a display control signal for controlling the display portion.

13. The display device according to claim 11, wherein the image feature amount detection portion comprising:

a gray level data distribution generation portion for reading and classifying the gray level data of the original image and generating the gray level data distribution;

a memory for storing the gray level data distribution generated by the gray level data distribution generation portion; and an image feature amount calculation portion having a function of reading the gray level data distribution stored in the memory and calculating the image feature amount, and a function of resetting the memory.

14. The display device according to claim 11, wherein the image feature amount detection portion comprising:

a first memory for reading a plurality of data of the original image;

a text region detection portion for detecting a text region in the display portion from the plurality of data stored in the first memory, and writing information on the detected text region to a second memory;

a gray level data distribution generation portion for reading and classifying the gray level data stored in the first memory and generating the gray level data distribution;

the second memory for storing the gray level data distribution generated by the gray level data distribution generation portion; and an image feature amount calculation portion having a function of reading the gray level data distribution stored in the second memory and calculating the image feature amount, and a function of resetting the second memory.

15. The display device according to claim 11, wherein the display device is a liquid crystal display device.

16. The display device according to claim 11, wherein the display device is incorporated into one electronic device selected from the group consisting of a mobile computer, a portable image reproducing device, a goggle-type display, a portable game machine, a projector, a television receiver, a portable television receiver, a camera, a computer, and a mobile phone.

* * * * *